United States Patent
Koga

(10) Patent No.: US 11,698,517 B2
(45) Date of Patent: Jul. 11, 2023

(54) ZOOM LENS, LENS BARREL, AND IMAGING APPARATUS

(71) Applicant: Ricoh Company, Ltd., Tokyo (JP)

(72) Inventor: Tomoya Koga, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 99 days.

(21) Appl. No.: 17/189,386

(22) Filed: Mar. 2, 2021

(65) Prior Publication Data

US 2021/0278644 A1    Sep. 9, 2021

(30) Foreign Application Priority Data

Mar. 3, 2020    (JP) .................................. 2020-035447
Apr. 2, 2020    (JP) .................................. 2020-066776
Feb. 12, 2021    (JP) .................................. 2021-020788

(51) Int. Cl.
    *G02B 15/14*    (2006.01)
    *G02B 15/16*    (2006.01)

(52) U.S. Cl.
    CPC . *G02B 15/145121* (2019.08); *G02B 15/1461* (2019.08); *G02B 15/16* (2013.01)

(58) Field of Classification Search
    None
    See application file for complete search history.

(56) References Cited

U.S. PATENT DOCUMENTS

| 2015/0043087 A1 | 2/2015 | Sudoh |
| 2017/0003486 A1 | 1/2017 | Inoue |
| 2017/0052344 A1* | 2/2017 | Obikane ......... G02B 15/145111 |
| 2019/0041607 A1* | 2/2019 | Bito ......................... G02B 9/62 |
| 2019/0361209 A1* | 11/2019 | Machida ........ G02B 15/144105 |
| 2019/0377168 A1* | 12/2019 | Umeda ................ G02B 27/646 |
| 2020/0174269 A1 | 6/2020 | Sudoh et al. |
| 2020/0292797 A1 | 9/2020 | Nakayama et al. |
| 2020/0301117 A1 | 9/2020 | Koga |
| 2021/0278642 A1 | 9/2021 | Koga |

FOREIGN PATENT DOCUMENTS

| JP | 2015-036691 | 2/2015 |
| JP | 2017-015930 | 1/2017 |
| JP | 2020-086357 | 6/2020 |
| JP | 2020-154286 | 9/2020 |
| JP | 2020-154288 | 9/2020 |
| JP | 2021-140140 A | 9/2021 |
| JP | 2021-192088 A | 12/2021 |

* cited by examiner

*Primary Examiner* — Darryl J Collins
(74) *Attorney, Agent, or Firm* — Xsensus LLP

(57) ABSTRACT

A zoom lens includes a first lens group having a positive refractive power, a second lens group having a negative refractive power, and a rear group, sequentially from an object side. Intervals between lens groups varies when changing magnification. A lens group having a highest negative refractive power among a lens group having a negative refractive power in the rear group is a focusing lens group GF configured to move toward an image side when focusing from infinity to a close range. A lens group GFF having a positive refractive power and arranged adjacent to an object side of the focusing lens group GF among a lens group having a positive refractive power included in the rear group includes a positive lens component L1 positioned on a most image side, which includes a positive lens L1P having a refractive index NdL1P, and a conditional expression (1) 1.85<NdL1P is satisfied.

20 Claims, 72 Drawing Sheets

ZOOM LENS, LENS BARREL, AND IMAGING APPARATUS

CROSS-REFERENCE TO RELATED APPLICATIONS

The present application claims priority under 35 U.S.C. § 119 to Japanese Patent Application No. 2020-035447, filed on Mar. 3, 2020, Japanese Patent Application No. 2020-066776, filed on Apr. 2, 2020, and Japanese Patent Application No. 2021-020788, filed on Feb. 12, 2021. The contents of which are incorporated herein by reference in their entirety.

BACKGROUND OF THE INVENTION

1. Field of the Invention

The present invention relates to a zoom lens, a lens barrel, and an imaging apparatus.

2. Description of the Related Art

Conventionally, various types of zoom lens for digital cameras have been known. Particularly, as a telephoto side zoom lens, a focal length of which is expanded, a zoom type of a positive lead in which lenses are arranged in order of a positive lens, a negative lens, and a rear group sequentially from a most object side is used, and it is necessary to be a compact lens having a high optical performance in a full-zoom imaging distance range. Moreover, to achieve a high-speed autofocus action, an inner focus type has been known in which an inner lens group is moved rather than moving heavy weight front elements, to reduce the weight of the focusing lens group. Particularly, a rear focusing method in which a light-weighted lens group easy to reduce the outer diameter of a lens positioned close to an imaging surface is used as a focusing lens group has been used in many cases in recent years.

However, in the conventional rear focusing method, because the variation in field curvature is significant on a side of the short focal length end, and the variation in spherical aberration or coma aberration is significant on a side of the long focal length end, there has been a problem that an image quality is degraded according to variation in imaging distance. Particularly, lenses for the purpose of a high speed AF are often constituted of the small number of lenses to further reduce the weight of the focusing lens group. Naturally, as the number of lenses decreases, the more difficult it is to suppress variations of aberration according to the imaging distance. Furthermore, there also is a method of using a glass material of low specific gravity to reduce the weight of the focusing lens, but because glass materials of low specific gravity generally often have a low refractive index, the effect of suppressing aberration variation is lowered.

In Japanese Unexamined Patent Application Publication No. 2017-015930, a zoom lens having a five-group zoom lens structure that includes, sequentially from an object side, a first lens group having positive refractive power, a second lens group having negative refractive power, a third lens group having positive refractive power, a fourth lens group having positive refractive power, and a fifth lens group having negative refractive power, or a six-group zoom lens structure that includes, sequentially from an object side, a first lens group having a positive refractive power, a second lens group having a negative refractive power, a third lens group having a positive refractive power, a fourth lens group having a positive refractive power, a fifth lens group having a negative refractive power, and a sixth lens group having a negative refractive power is disclosed. This zoom lens moves the fifth lens group having a negative refractive power toward an image side when focusing (the fifth lens group constitutes the focusing lens).

However, the zoom lens of Japanese Unexamined Patent Application Publication No. 2017-015930 has a scope for improvement from the viewpoint of suppressing aberration variation with a change in an imaging distance (for example, suppressing variation of field curvature at a short focal length end, and suppressing variation of spherical aberration and coma aberration at a long focal length end).

The present invention is achieved in view of the above problem, and it is an object of the present invention to provide a zoom lens, a lens barrel, and an imaging apparatus that are capable of suppressing aberration variation with a change in an imaging distance.

SUMMARY OF THE INVENTION

A zoom lens includes a first lens group, a second lens group, and a rear group, sequentially from an object side. The first lens group has a positive refractive power. The second lens group has a negative refractive power. Intervals between adjacent lens groups are configured to vary when changing magnification from a short focal length end to a long focal length end. The rear group includes at least one lens group having a negative refractive power, and at least one lens group having a positive refractive power. The lens group having a highest negative refractive power among the at least one lens group having the negative refractive power included in the rear group is a focusing lens group GF configured to move toward an image side when focusing from infinity to a close range. A lens group GFF having a positive refractive power and arranged adjacent to an object side of the focusing lens group GF among the at least one lens group having the positive refractive power included in the rear group includes a positive lens component L1 positioned on a most image side. The positive lens component L1 includes a positive lens L1P, and a conditional expression (1) $1.85 < NdL1P$, where NdL1P: a refractive index of the positive lens L1P, is satisfied.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
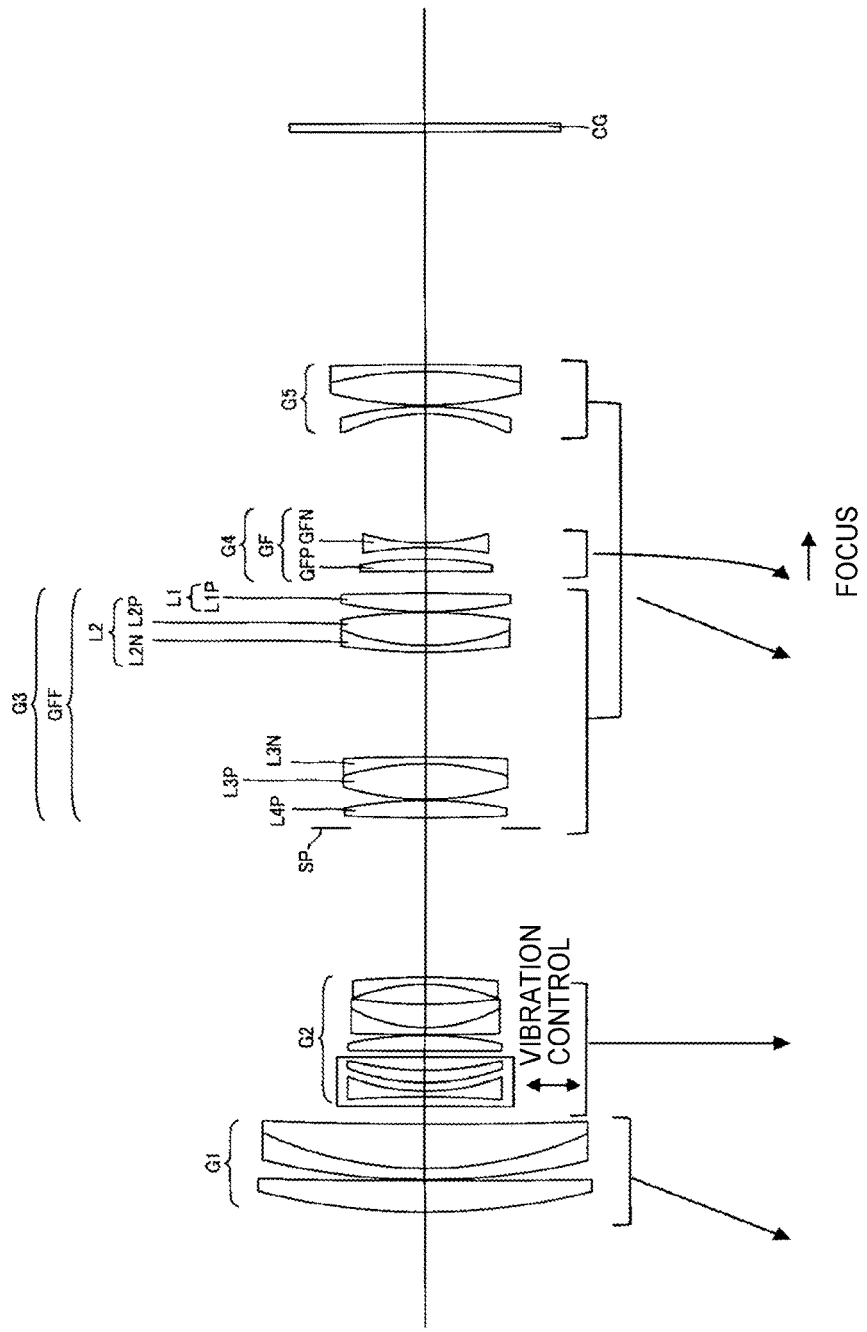
FIG. 1 is a diagram illustrating a moving trajectory of a zoom lens of a numerical example 1, and a configuration of a vibration-proof lens group and a focus lens group.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a zoom lens, a lens barrel, and an imaging apparatus that are capable of suppressing aberration variation with a change in an imaging distance.

First, terms in the present specification are defined. "Lens component" in the present specification signifies a lens having only two refractive surfaces to be in contact with air in a normal optical path on an object side surface and an image side surface and, for example, a simple lens or a cemented lens corresponds to the "lens component". "Vibration control" in the present specification signifies prevention of image blurring caused by shaking of a lens when imaging, and "vibration-proof lens" in the present specification signifies a lens that is driven to prevent image blurring caused by shaking of a lens when imaging.

FIG. 1 is a diagram illustrating a moving trajectory of a zoom lens of a numerical example 1, and a configuration of a vibration-proof lens group and a focus lens group.

The zoom lens of the numerical example 1 includes, sequentially from an object side, a first lens group G1 having a positive refractive power, a second lens group G2 having a negative refractive power, a third lens group G3 having a positive refractive power, a fourth lens group G4 having a negative refractive power, and a fifth lens group G5 having a positive refractive power. The third lens group G3, the fourth lens group G4, and the fifth lens group G5 constitute a "rear group". Between the second lens group G2 and the third lens group G3 (right before the third lens group G3), a diaphragm SP for light amount adjustment that moves with the third lens group G3 is arranged. Between the fifth lens group G5 and an imaging surface, a plane parallel plate CG is arranged. The plane parallel plate CG has functions of a lowpass filter, an infrared-ray cut filter, a cover glass of an imaging device, and the like.

When changing magnification from a short focal length end to a long focal length end, the first lens group G1, the third lens group G3, the fourth lens group G4, and the fifth lens group G5 move toward the object side relative to the imaging surface (stick out), and the second lens group G2 is fixed to the imaging surface. By arranging the third lens group G3 and the fifth lens group G5 to move along the same trajectory, the simplification of a mechanical structure is achieved. By thus varying intervals between the adjacent lens groups, the magnification is changed.

The fourth lens group G4 is a lens group having the highest negative refractive power in the rear group, and constitutes a focusing lens group GF that moves toward an image side when focusing from infinity to a close range. The focusing lens group GF includes one positive lens GFP and one negative lens GFN (other lenses may be included also). The positive lens GFP may be a positive lens having the lowest Abbe number among positive lenses included in the focusing lens group GF. The negative lens GFN may be a negative lens having the highest Abbe number among negative lenses included in the focusing lens group GF.

The third lens group G3 constitutes a lens group GFF having a positive refractive power arranged adjacent to an object side of the focusing lens group GF (the fourth lens group G4) out of the lens groups having a positive refractive power included in the rear group. The lens group GFF having a positive refractive power includes a positive lens component L1 positioned closest to the image side, and a positive lens component L2 positioned adjacent to the object side of the positive lens component L1. The positive lens component L1 includes a positive lens L1P. The positive lens component L2 includes a cemented lens of a negative lens L2N and a positive lens L2P.

On the object side of the negative lens L2N, a negative lens L3N, a positive lens L3P, and a positive lens L4P are arranged sequentially from the image side, and the negative lens L3N and the positive lens L3P are joined. Accordingly, the lens group GFF can include the positive lens L4P, the positive lens L3P, the negative lens L3N, the negative lens L2N, the positive lens L2P, and the positive lens L1P sequentially from the object side. By applying a structure in which the lenses are thus arranged symmetrically, aberration correction can be performed further effectively when changing magnification or changing an imaging distance.

A part (the first and the second lenses out of six lenses in this example) of the second lens group G2 is a vibration-proof lens group that enables image blurring by moving in a perpendicular direction to the optical axis at the time of image blurring correction.

Figure 2:
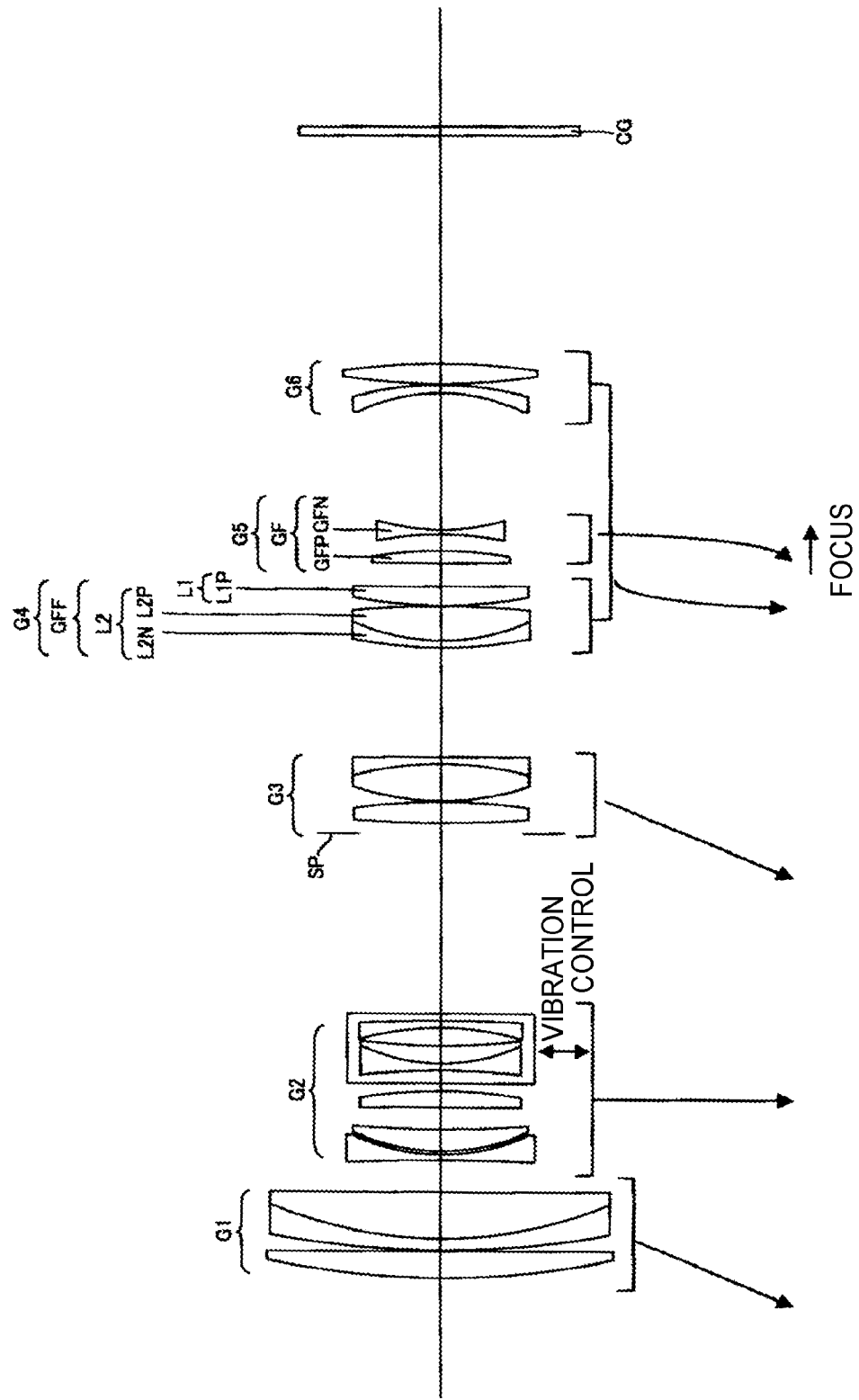
FIG. 2 is a diagram illustrating a moving trajectory of the zoom lens of a numerical example 2, and a structure of the vibration-proof lens group and the focus lens group.

FIG. 2 is a diagram illustrating a moving trajectory of the zoom lens of a numerical example 2, and a structure of the vibration-proof lens group and the focus lens group.

The zoom lens of the numerical example 2 includes, sequentially from an object side, the first lens group G1 having a positive refractive power, the second lens group G2 having a negative refractive power, the third lens group G3 having a positive refractive power, the fourth lens group G4 having a positive refractive power, the fifth lens group G5 having a negative refractive power, and a sixth lens group G6 having a positive refractive power. The third lens group G3, the fourth lens group G4, the fifth lens group G5, and the sixth lens group G6 constitute a "rear group". Between the second lens group G2 and the third lens group G3 (right before the third lens group G3), the diaphragm SP for light amount adjustment that moves with the third lens group G3 is arranged. Between the sixth lens group G6 and an imaging surface, the plane parallel plate CG is arranged.

When changing magnification from a short focal length end to a long focal length end, the first lens group G1, the third lens group G3, the fourth lens group G4, the fifth lens group G5, and the sixth lens group G6 move toward the object side relative to the imaging surface (stick out), and the second lens group G2 is fixed to the imaging surface. By arranging the fourth lens group G4 and the sixth lens group G6 to move along the same trajectory, the simplification of a mechanical structure is achieved. By thus varying intervals between the adjacent lens groups, the magnification is changed.

The fifth lens group G5 is a lens group having the highest negative refractive power in the rear group, and constitutes a focusing lens group GF that moves toward an image side when focusing from infinity to a close range. The focusing lens group GF includes one positive lens GFP and one negative lens GFN (other lenses may be included also). The positive lens GFP may be a positive lens having the lowest Abbe number among positive lenses included in the focusing lens group GF. The negative lens GFN may be a negative lens having the highest Abbe number among negative lenses included in the focusing lens group GF.

The fourth lens group G4 constitutes a lens group GFF having a positive refractive power arranged adjacent to an object side of the focusing lens group GF (the fifth lens group G5) out of the lens groups having a positive refractive power included in the rear group. The lens group GFF having a positive refractive power includes the positive lens component L1 positioned closest to the image side, and the positive lens component L2 positioned adjacent to the object side of the positive lens component L1. The positive lens component L1 includes the positive lens L1P. The positive lens component L2 includes a cemented lens of the negative lens L2N and the positive lens L2P.

A part (the fourth to the sixth lenses out of six lenses in this example) of the second lens group G2 is a vibration-proof lens group that enables image blurring by moving in a perpendicular direction to the optical axis at the time of image blurring correction.

Figure 3:
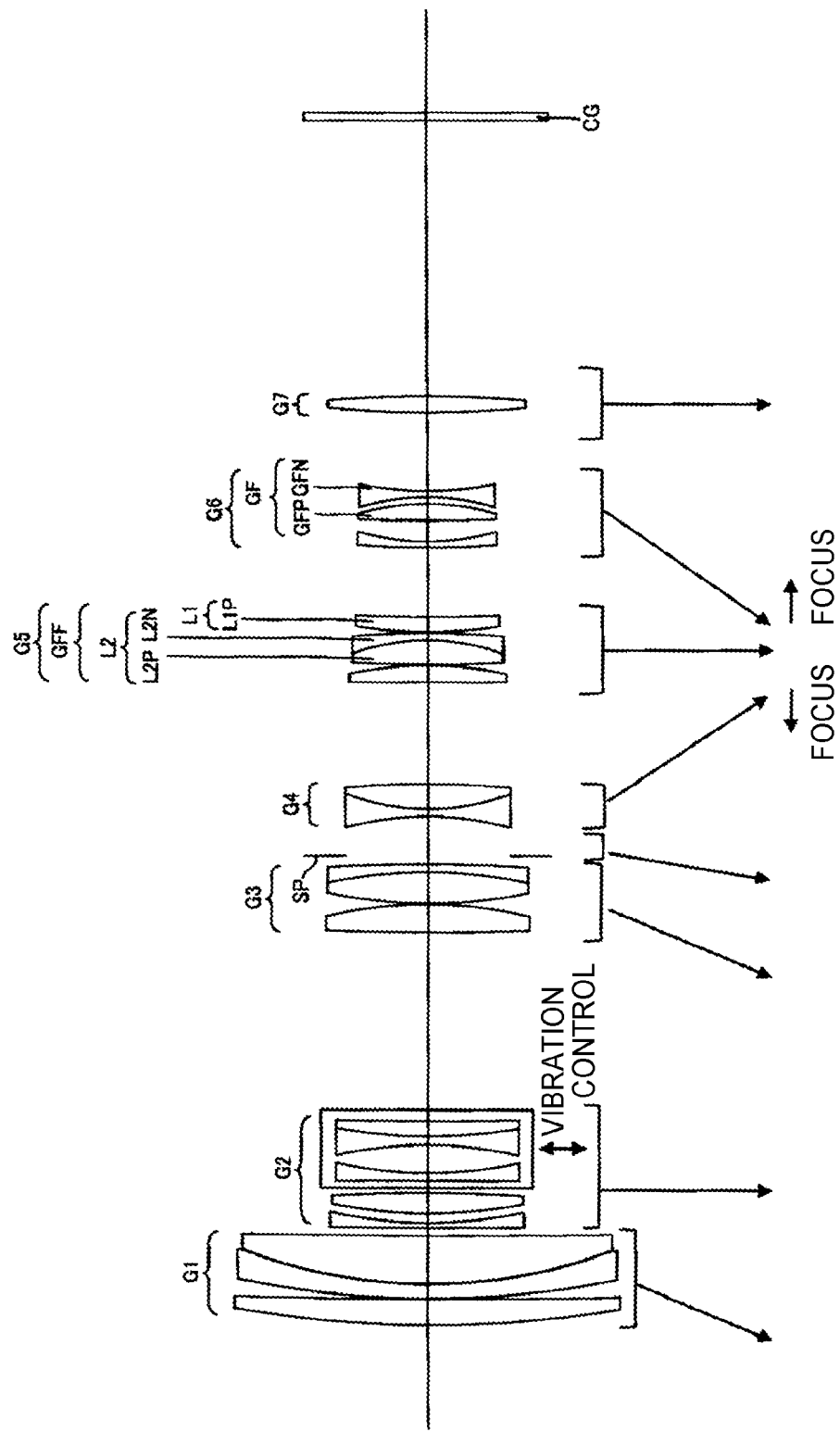
FIG. 3 is a diagram illustrating a moving trajectory of the zoom lens of a numerical example 3, and a structure of the vibration-proof lens group and the focus lens group.

FIG. 3 is a diagram illustrating a moving trajectory of the zoom lens of a numerical example 3, and a structure of the vibration-proof lens group and the focus lens group.

The zoom lens of the numerical example 3 includes, sequentially from an object side, the first lens group G1 having a positive refractive power, the second lens group G2 having a negative refractive power, the third lens group G3 having a positive refractive power, the fourth lens group G4 having a negative refractive power, the fifth lens group G5 having a positive refractive power, the sixth lens group G6 having a negative refractive power, and a seventh lens group G7 having a positive refractive power. The third lens group G3, the fourth lens group G4, the fifth lens group G5, the sixth lens group G6, and the seventh lens group G7 constitute a "rear group". Between the third lens group G3 and the fourth lens group G4, the diaphragm SP for light amount adjustment that moves independently from the respective lens groups is arranged. Between the seventh lens group G7 and an imaging surface, the plane parallel plate CG is arranged.

When changing magnification from a short focal length end to a long focal length end, the first lens group G1, the third lens group G3, the sixth lens group G6, and the diaphragm SP move toward the object side relative to the imaging surface (stick out), the fourth lens group G4 moves toward the image side relative to the imaging surface, and the second lens group G2, the fifth lens group G5, and the seventh lens group G7 are fixed to the imaging surface. By thus varying intervals between the adjacent lens groups, the magnification is changed.

The sixth lens group G6 is a lens group having the highest negative refractive power in the rear group, and constitutes a focusing lens group GF that moves toward an image side when focusing from infinity to a close range. Moreover, the fourth lens group G4 constitutes the focusing lens that moves toward the object side when focusing from infinity to a close range. By adopting a double focusing system as described, aberration correction can be performed further effectively when changing an imaging distance. The focusing lens group GF (the sixth lens group G6) includes the one positive lens GFP and the one negative lens GFN (one negative lens is included besides). The positive lens GFP may be a positive lens having the lowest Abbe number among positive lenses included in the focusing lens group GF. The negative lens GFN may be a negative lens having the highest Abbe number among negative lenses included in the focusing lens group GF.

The fifth lens group G5 constitutes a lens group GFF having a positive refractive power arranged adjacent to an object side of the focusing lens group GF (the sixth lens group G6) out of the lens groups having a positive refractive power included in the rear group. The lens group GFF having a positive refractive power includes the positive lens component L1 positioned closest to the image side, and the positive lens component L2 positioned adjacent to the object side of the positive lens component L1. The positive lens component L1 includes the positive lens L1P. The positive lens component L2 includes a cemented lens of the positive lens L2P and the negative lens L2N.

A part (the third to the fifth lenses out of five lenses in this example) of the second lens group G2 is a vibration-proof lens group that enables image blurring by moving in a perpendicular direction to the optical axis at the time of image blurring correction.

Figure 4:
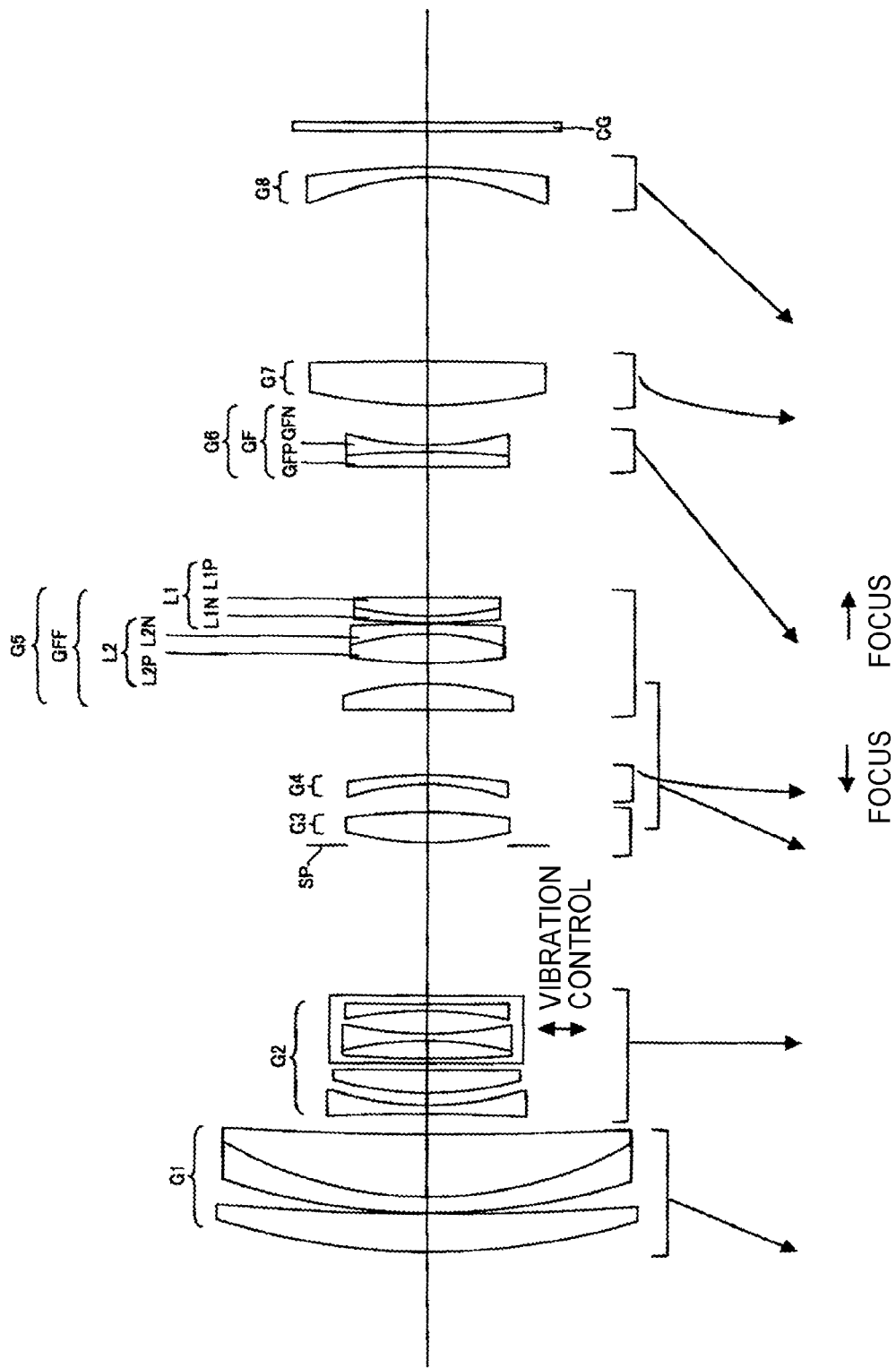
FIG. 4 is a diagram illustrating a moving trajectory of the zoom lens of a numerical example 4, and a structure of the vibration-proof lens group and the focus lens group.

FIG. 4 is a diagram illustrating a moving trajectory of the zoom lens of a numerical example 4, and a structure of the vibration-proof lens group and the focus lens group.

The zoom lens of the numerical example 4 includes, sequentially from an object side, the first lens group G1 having a positive refractive power, the second lens group G2 having a negative refractive power, the third lens group G3 having a positive refractive power, the fourth lens group G4 having a negative refractive power, the fifth lens group G5 having a positive refractive power, a sixth lens group G6 having a negative refractive power, the seventh lens group having a positive refractive power, and an eighth lens group G8 having a negative refractive power. The third lens group G3, the fourth lens group G4, the fifth lens group G5, and the sixth lens group G6, the seventh lens group G7, and the eighth lens group G8 constitute a "rear group". Between the second lens group G2 and the third lens group G3 (right before the third lens group G3), the diaphragm SP for light amount adjustment that moves with the third lens group G3 is arranged. Between the eighth lens group G8 and an imaging surface, the plane parallel plate CG is arranged.

When changing magnification from a short focal length end to a long focal length end, the first lens group G1, the third lens group G3, the fourth lens group G4, the fifth lens group G5, the sixth lens group G6, the seventh lens group G7, and the eighth lens group G8 move toward the object side relative to the imaging surface (stick out), and the second lens group G2 is fixed to the imaging surface. By arranging the third lens group G3 and the fifth lens group G5 to move along the same trajectory, the simplification of a mechanical structure is achieved. By thus varying intervals between the adjacent lens groups, the magnification is changed.

The sixth lens group G6 is a lens group having the highest negative refractive power in the rear group, and constitutes a focusing lens group GF that moves toward an image side when focusing from infinity to a close range. Moreover, the fourth lens group constitutes a focusing lens group that moves toward the object side when focusing from infinity to a close range. By adopting a double focusing system as described, aberration correction can be performed further effectively when changing an imaging distance. The focusing lens group GF (the sixth lens group G6) includes a cemented lens of the one positive lens GFP and the one negative lens GFN (other lenses may be included also). The positive lens GFP may be a positive lens having the lowest Abbe number among positive lenses included in the focusing lens group GF. The negative lens GFN may be a negative lens having the highest Abbe number among negative lenses included in the focusing lens group GF.

The fifth lens group G5 constitutes a lens group GFF having a positive refractive power arranged adjacent to an object side of the focusing lens group GF (the sixth lens group G6) out of the lens groups having a positive refractive power included in the rear group. The lens group GFF having a positive refractive power includes the positive lens component L1 positioned closest to the image side, and the positive lens component L2 positioned adjacent to the object side of the positive lens component L1. The positive lens component L1 includes a cemented lens of the negative lens L1N and the positive lens L1P. The positive lens component L2 includes a cemented lens of the positive lens L2P and the negative lens L2N.

A part (the third to the fifth lenses out of five lenses in this example) of the second lens group G2 is a vibration-proof lens group that enables image blurring by moving in a perpendicular direction to the optical axis at the time of image blurring correction.

Figure 5:
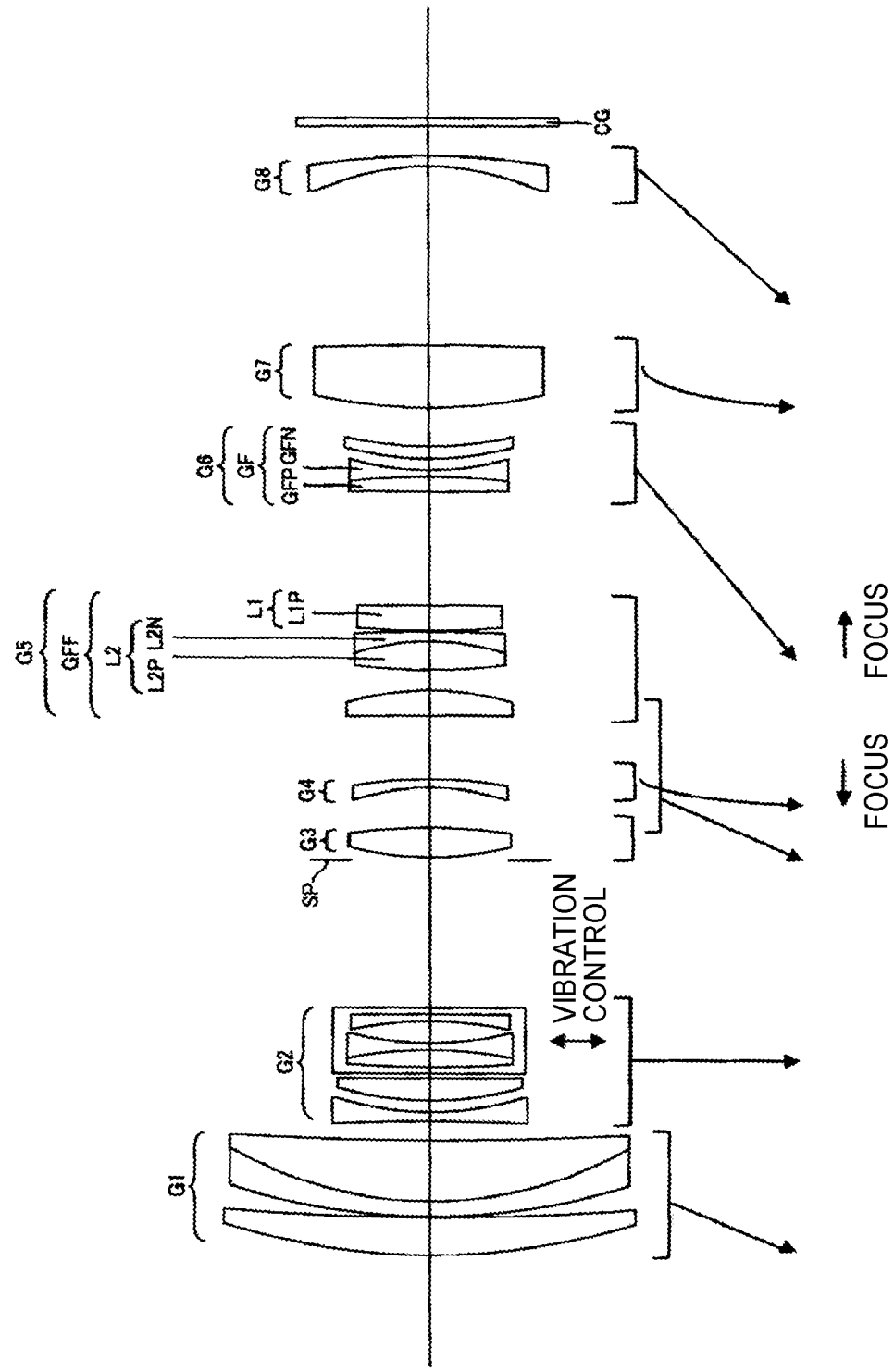
FIG. 5 is a diagram illustrating a moving trajectory of the zoom lens of a numerical example 5, and a structure of the vibration-proof lens group and the focus lens group.

FIG. 5 is a diagram illustrating a moving trajectory of the zoom lens of a numerical example 5, and a structure of the vibration-proof lens group and the focus lens group.

The zoom lens of the numerical example 5 includes, sequentially from an object side, the first lens group G1 having a positive refractive power, the second lens group G2 having a negative refractive power, the third lens group G3 having a positive refractive power, the fourth lens group G4 having a negative refractive power, the fifth lens group G5 having a positive refractive power, the sixth lens group G6 having a negative refractive power, the seventh lens group having a positive refractive power, and the eighth lens group G8 having a negative refractive power. The third lens group G3, the fourth lens group G4, the fifth lens group G5, the sixth lens group G6, the seventh lens group G7, and the eighth lens group G8 constitute a "rear group". Between the second lens group G2 and the third lens group G3 (right before the third lens group G3), the diaphragm SP for light amount adjustment that moves with the third lens group G3 is arranged. Between the eighth lens group G8 and an imaging surface, the plane parallel plate CG is arranged.

When changing magnification from a short focal length end to a long focal length end, the first lens group G1, the third lens group G3, the fourth lens group G4, the fifth lens group G5, the sixth lens group G6, the seventh lens group G7, and the eighth lens group G8 move toward the object side relative to the imaging surface (stick out), and the second lens group G2 is fixed to the imaging surface. By arranging the third lens group G3 and the fifth lens group G5 to move along the same trajectory, the simplification of a mechanical structure is achieved. By thus varying intervals between the adjacent lens groups, the magnification is changed.

The sixth lens group G6 is a lens group having the highest negative refractive power in the rear group, and constitutes a focusing lens group GF that moves toward an image side when focusing from infinity to a close range. Moreover, the fourth lens group constitutes a focusing lens group that moves toward the object side when focusing from infinity to a close range. By adopting a double focusing system as described, aberration correction can be performed further effectively when changing an imaging distance. The focusing lens group GF (the sixth lens group G6) includes a cemented lens of the one positive lens GFP and the one negative lens GFN (another positive lens is included besides). The positive lens GFP may be a positive lens having the lowest Abbe number among positive lenses included in the focusing lens group GF. The negative lens GFN may be a negative lens having the highest Abbe number among negative lenses included in the focusing lens group GF.

The fifth lens group G5 constitutes a lens group GFF having a positive refractive power arranged adjacent to an object side of the focusing lens group GF (the sixth lens group G6) out of the lens groups having a positive refractive power included in the rear group. The lens group GFF having a positive refractive power includes the positive lens component L1 positioned closest to the image side, and the negative lens component L2 positioned adjacent to the object side of the positive lens component L1. The positive lens component L1 includes the positive lens L1P. The positive lens component L2 includes a cemented lens of the positive lens L2P and the negative lens L2N.

A part (the third to the fifth lenses out of five lenses in this example) of the second lens group G2 is a vibration-proof lens group that enables image blurring by moving in a perpendicular direction to the optical axis at the time of image blurring correction.

Figure 6:
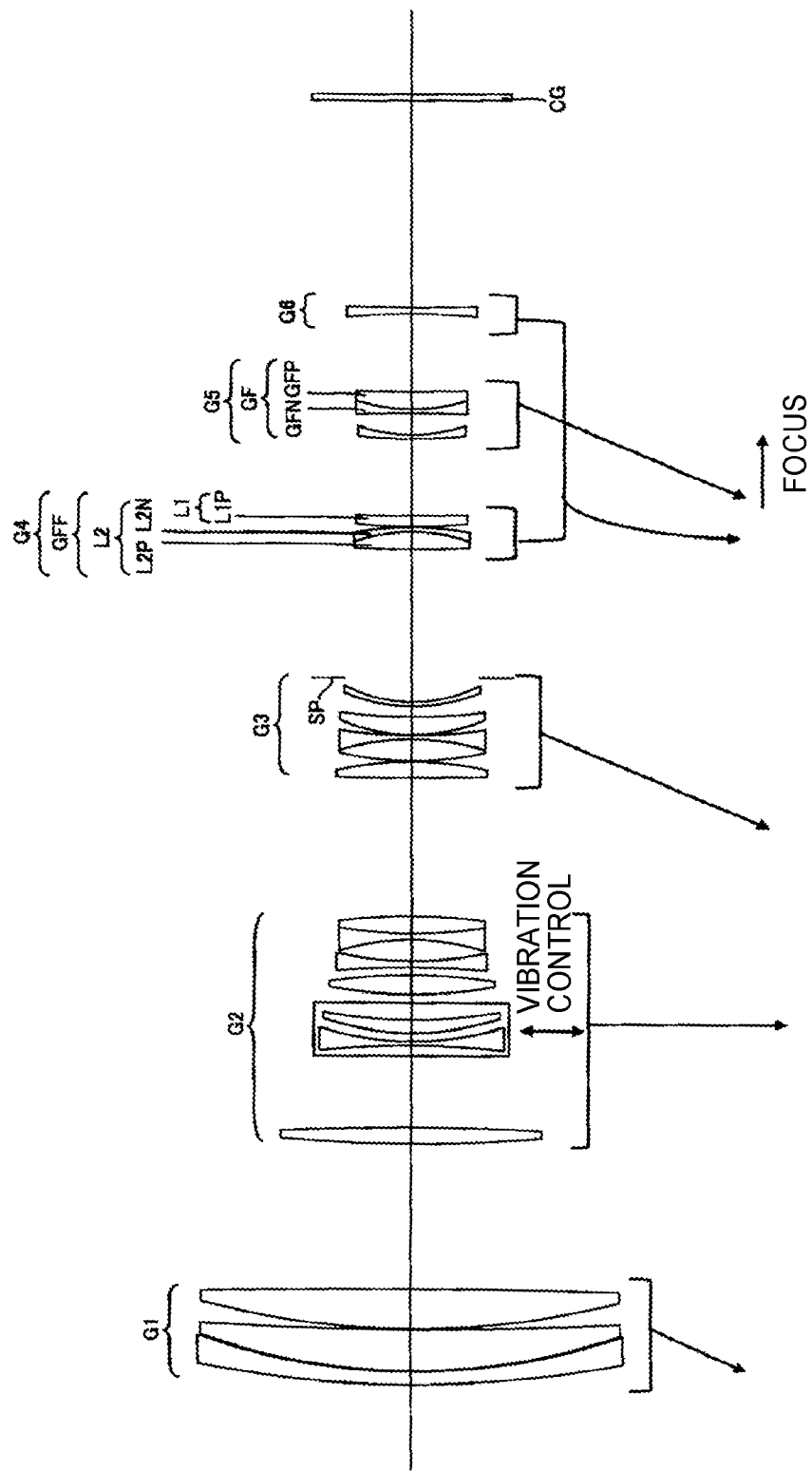
FIG. 6 is a diagram illustrating a moving trajectory of the zoom lens of a numerical example 6, and a structure of the vibration-proof lens group and the focus lens group.

FIG. 6 is a diagram illustrating a moving trajectory of the zoom lens of a numerical example 6, and a structure of the vibration-proof lens group and the focus lens group.

The zoom lens of the numerical example 6 includes, sequentially from an object side, the first lens group G1 having a positive refractive power, the second lens group G2 having a negative refractive power, the third lens group G3 having a positive refractive power, the fourth lens group G4 having a positive refractive power, the fifth lens group G5 having a negative refractive power, and the sixth lens group G6 having a negative refractive power. The third lens group G3, the fourth lens group G4, the fifth lens group G5, and the sixth lens group G6 constitute a "rear group". Between the third lens group G3 and the fourth lens group G4 (right after the third lens group G3), the diaphragm SP for light amount adjustment that moves with the third lens group G3 is arranged. Between the sixth lens group G6 and an imaging surface, the plane parallel plate CG is arranged.

When changing magnification from a short focal length end to a long focal length end, the first lens group G1, the third lens group G3, the fourth lens group G4, the fifth lens group G5, and the sixth lens group G6 move toward the object side relative to the imaging surface (stick out), and the second lens group G2 is fixed to the imaging surface. By arranging the fourth lens group G4 and the sixth lens group G6 to move along the same trajectory, the simplification of a mechanical structure is achieved. By thus varying intervals between the adjacent lens groups, the magnification is changed.

The fifth lens group G5 is a lens group having the highest negative refractive power in the rear group, and constitutes a focusing lens group GF that moves toward an image side when focusing from infinity to a close range. The focusing lens group GF includes a cemented lens of the one negative lens GFN and the one positive lens GFP (another negative lens is included besides). The negative lens GFN may be a negative lens having the highest Abbe number among negative lenses included in the focusing lens group GF. The positive lens GFP may be a positive lens having the lowest Abbe number among positive lenses included in the focusing lens group GF.

The fourth lens group G4 constitutes a lens group GFF having a positive refractive power arranged adjacent to an object side of the focusing lens group GF (the fifth lens group G5) out of the lens groups having a positive refractive power included in the rear group. The lens group GFF having a positive refractive power includes the positive lens component L1 positioned closest to the image side, and the positive lens component L2 positioned adjacent to the object side of the positive lens component L1. The positive lens component L1 includes the positive lens L1P. The positive lens component L2 includes a cemented lens of the positive lens L2P and the negative lens L2N.

A part (the second, and the third lenses out of seven lenses in this example) of the second lens group G2 is a vibration-proof lens group that enables image blurring by moving in a perpendicular direction to the optical axis at the time of image blurring correction.

Figure 7:
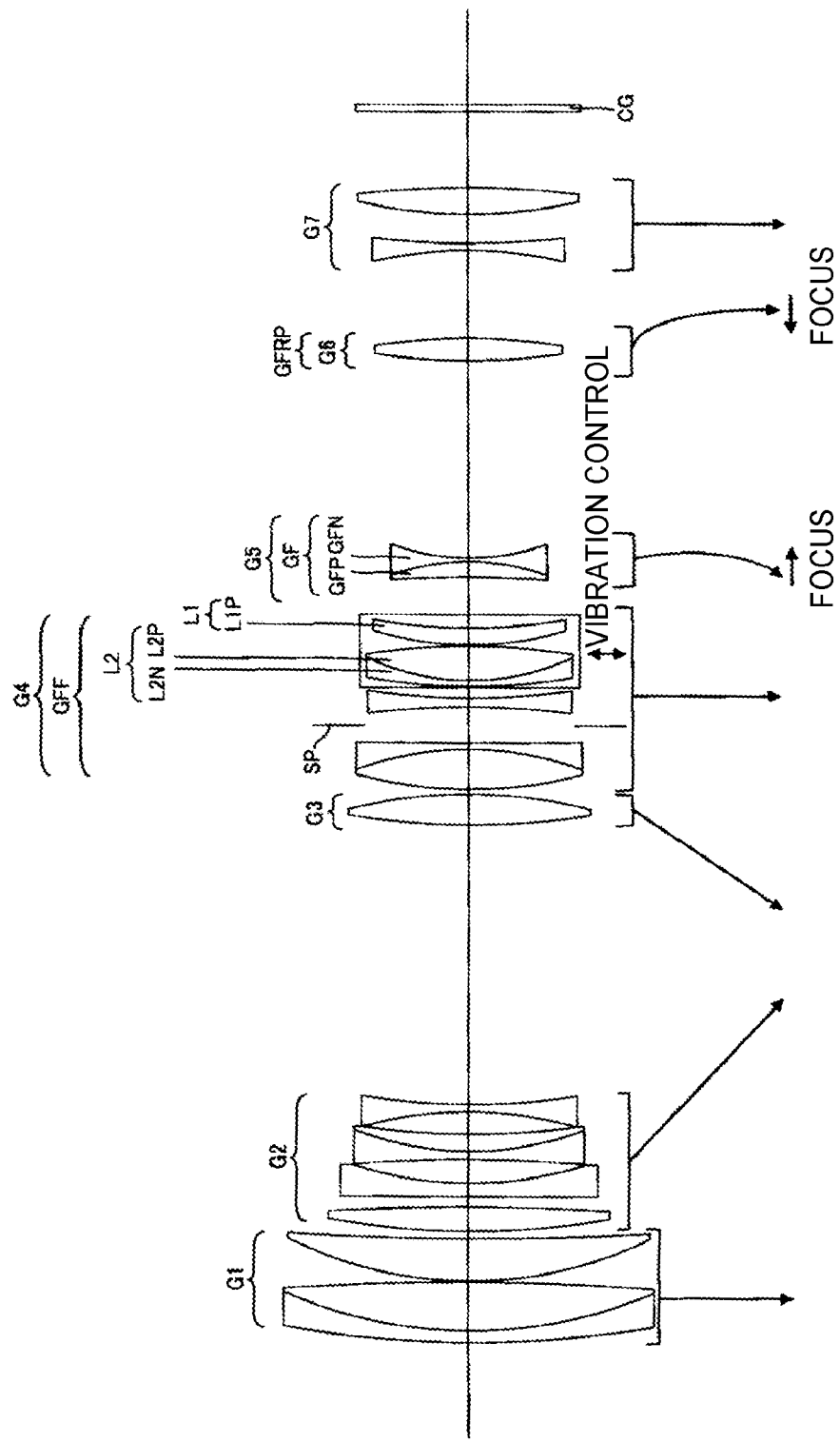
FIG. 7 is a diagram illustrating a moving trajectory of the zoom lens of a numerical example 7, and a structure of the vibration-proof lens group and the focus lens group.

FIG. 7 is a diagram illustrating a moving trajectory of the zoom lens of a numerical example 7, and a structure of the vibration-proof lens group and the focus lens group.

The zoom lens of the numerical example 7 includes, sequentially from an object side, the first lens group G1 having a positive refractive power, the second lens group G2 having a negative refractive power, the third lens group G3 having a positive refractive power, the fourth lens group G4 having a positive refractive power, the fifth lens group G5 having a negative refractive power, the sixth lens group G6 having a positive refractive power, and the seventh lens group having a negative refractive power. The third lens group G3, the fourth lens group G4, the fifth lens group G5, the sixth lens group G6, and the seventh lens group G7 constitute a "rear group". Between the second lens and the third lens of the fourth lens group G4, the diaphragm SP for light amount adjustment that moves with the fourth lens group G4 is arranged. Between the seventh lens group G7 and an imaging surface, the plane parallel plate CG is arranged.

When changing magnification from a short focal length end to a long focal length end, the third lens group G3 and the sixth lens group G6 move toward the object side relative to the imaging surface (stick out), and the second lens group G2 moves toward the image side relative to the imaging surface, and the fifth lens group G5 and the sixth lens group G6 move to change an interval to a lens group adjacent thereto, and the first lens group G1, the fourth lens group G4, and the seventh lens group G7 are fixed to the imaging surface. By thus varying intervals between the adjacent lens groups, the magnification is changed.

The fifth lens group G5 is a lens group having the highest negative refractive power in the rear group, and constitutes a focusing lens group GF that moves toward an image side when focusing from infinity to a close range. Moreover, the sixth lens group G6 constitutes a focusing lens group GFRP that is a lens group having a positive refractive power arranged closest to the object side among the lens groups positioned on the image side relative to the focusing lens group GF, and that moves toward the object side when focusing from infinity to a close range. By adopting a double focusing system as described, aberration correction can be performed further effectively when changing an imaging distance. The focusing lens group GF (the fifth lens group G5) includes a cemented lens of the one positive lens GFP and the one negative lens GFN (other lenses may be included also). The positive lens GFP may be a positive lens having the lowest Abbe number among positive lenses included in the focusing lens group GF. The negative lens GFN may be a negative lens having the highest Abbe number among negative lenses included in the focusing lens group GF. The focusing lens group GFRP (the sixth lens group G6) includes one positive lens (positive lens 61G described later).

The fourth lens group G4 constitutes a lens group GFF having a positive refractive power arranged adjacent to an object side of the focusing lens group GF (the fifth lens group G5) out of the lens groups having a positive refractive power included in the rear group. The lens group GFF having a positive refractive power includes the positive lens component L1 positioned closest to the image side, and the positive lens component L2 positioned adjacent to the object side of the positive lens component L1. The positive lens component L1 includes the positive lens L1P. The positive lens component L2 includes a cemented lens of the negative lens L2N and the positive lens L2P.

A part (the fourth to the sixth lenses out of six lenses in this example) of the fourth lens group G4 is a vibration-proof lens group that enables image blurring by moving in a perpendicular direction to the optical axis at the time of image blurring correction.

The present inventors found that it is important that not only (in addition to) selection of a glass material of a focusing lens group itself and a structure of the lens group, but also selection of a glass material of a lens group adjacent to the focusing lens group and a structure of the lens group are important to effectively suppress variations of aberration occurring according to an imaging distance, as a consequence of diligent study, and have achieved the present invention.

Generally, glass materials having a low refractive index are mostly low dispersion materials, and those are effective for the chromatic aberration correction, but are disadvantageous for correction of a spherical aberration and a field curvature because of the low refractive index.

In the present embodiment, by using a lens group having the highest negative refractive power in the rear group as the focusing lens group GF, and by arranging the lens group GFF having a positive refractive power on an object side of the focusing lens group GF and using a material having a high refractive index for the positive lens L1P of the positive lens component L1 positioned on the most image side in this lens group GFF having a positive refractive power, the effect of correcting an aberration by caused by a change of an imaging distance is improved.

Particularly, because the most imaging surface of the lens group GFF having a positive refractive power is closest to the focusing lens group GF, and is a position at which a pupil diameter is largest, it is preferable that the positive lens L1P of a high refractive index material be used at this position. In this connection, in the zoom lens of Japanese Unexamined Patent Application Publication No. 2017-015930 described above, for all of the positive lenses used in the fourth lens group arranged adjacent to the object side of the fifth lens group, which is the focusing lens group, ones having a relatively low refractive index are used.

In summary, the zoom lens of the present embodiment includes, sequentially from an object side, the first lens group G1 having a positive refractive power, the second lens group G2 having a negative refractive power, and the rear group, and intervals between the lens groups adjacent to each other change when changing magnification from a short focal length end to a long focal length end. The rear group includes, at least one lens group having a negative refractive power, and at least one lens group having a positive refractive power. Out of the lens groups having a negative refractive power included in the rear group, the lens group having the highest negative refractive power is used as the focusing lens group GF that moves toward the image side when focusing from infinity to a close range. Out of the lens groups having a positive refractive power included in the rear group, the lens group GFF having a positive refractive power arranged adjacent to the object side of the focusing lens group GF includes the positive lens component L1 positioned closest to the image side, and the positive lens component L1 includes the positive lens L1P.

The zoom lens of the present embodiment has the lens structure described above as a precondition, and is preferable to satisfy following Conditional Expression (1), and is more preferable to satisfy following Conditional Expressions (1'), (1''), (1''').

$$1.85 < NdL1P \tag{1}$$

$$1.87 < NdL1P \tag{1'}$$

$$1.88 < NdL1P \tag{1''}$$

$$1.9 < NdL1P \tag{1'''}$$

where
NdL1P: refractive index of the positive lens L1P.

By satisfying Conditional Expression (1), spherical aberration, coma aberration, astigmatism, and the like can be well corrected. Moreover, a field curvature at a short focal length end, and spherical aberration and coma aberration at a long focal length end when changing an imaging distance can be well corrected. This effect can be produced more significantly by satisfying Conditional Expressions (1'), (1''), (1''').

When a lower limit of Conditional Expression (1) is exceeded, it becomes difficult to correct spherical aberration, coma aberration, astigmatism, and the like. Particularly, the field curvature at the short focal length end and the spherical aberration and the coma aberration at the long focal length end when changing an imaging distance are degraded.

The zoom lens of the present embodiment is preferable to satisfy following Conditional Expression (2), and is more preferable to satisfy following Conditional Expressions (2'), (2'').

$$25 < vdL1P \tag{2}$$

$$27 < vdL1P \tag{2'}$$

$$29 < vdL1P \tag{2''}$$

where
vdL1P: Abbe number of the positive lens L1P.

By satisfying Conditional Expression (2), variations in axial chromatic aberration caused by zooming or focusing can be suppressed. This effect can be produced more significantly by satisfying Conditional Expressions (2'), (2'').

When a lower limit of Conditional Expression (2) is exceeded, variations in axial chromatic aberration caused by zooming or focusing increase.

The zoom lens of the present embodiment is preferable to satisfy following Conditional Expression (3), and is more preferable to satisfy following Conditional Expression (3').

$$-5 < fGFF/fGF < -0.7 \quad (3)$$

$$-3 < fGFF/fGF < -0.7 \quad (3')$$

where
fGFF: focal length of the lens group GFF having a positive refractive power
fGF: focal length of the focusing lens group GF.

By satisfying Conditional Expression (3), a focusing travel distance of the focusing lens GF can be suppressed, to achieve high speed AF. Moreover, a field curvature at a short focal length end, and spherical aberration and coma aberration at a long focal length end when changing an imaging distance can be well corrected. This effect can be produced more significantly by satisfying Conditional Expression (3').

When an upper limit of Conditional Expressions (3), (3') is exceeded, the refractive power of the focusing lens group GF becomes too low, to increase the focusing travel distance, and it becomes difficult to achieve the high speed AF. Furthermore, the positive refractive power of the lens group GFF becomes too high, and the field curvature at the short focal length end and the spherical aberration and the coma aberration at the long focal length end when changing an imaging distance are degraded.

When a lower limit of Conditional Expression (3) is exceeded, the refractive power of the focusing lens group GF becomes too high, and the field curvature at the short focal length end and the spherical aberration and the coma aberration at the long focal length end when changing an imaging distance are degraded.

The zoom lens of the present embodiment includes the positive or negative lens component L2 positioned adjacent to the object side of the positive lens component L1, and the lens component L2 includes the cemented lens of the negative lens L2N and the positive lens L2P. In this case, the zoom lens of the present embodiment is preferable to satisfy following Conditional Expression (4), and is more preferable to satisfy following Conditional Expression (4').

$$1.0 < NdL2N/NdL2P < 1.6 \quad (4)$$

$$1.05 < NdL2N/NdL2P < 1.4 \quad (4')$$

where
NdL2N: refractive index of the negative lens L2N
NdL2P: refractive index of the positive lens L2P.

By satisfying Conditional Expression (4), spherical aberration can be corrected appropriately. This effect can be produced more significantly by satisfying Conditional Expression (4').

When an upper limit of Conditional Expression (4) is exceeded, the refractive index of the negative lens L2N become too high compared to the refractive index of the positive lens L2P, and the spherical aberration is excessively corrected.

When a lower limit of Conditional Expression (4) is exceeded, the refractive index of the negative lens L2N become too low compared to the refractive index of the positive lens L2P, and not sufficiently corrected.

The zoom lens of the present embodiment includes the positive or negative lens component L2 positioned adjacent to the object side of the positive lens component L1, and the lens component L2 includes the cemented lens of the negative lens L2N and the positive lens L2P. In this case, the zoom lens of the present embodiment is preferable to satisfy following Conditional Expression (5), and is more preferable to satisfy following Conditional Expression (5').

$$0.2 < vdL2N/vdL2P < 0.7 \quad (5)$$

$$0.2 < vdL2N/vdL2P < 0.5 \quad (5')$$

where
vdL2P: Abbe number of the positive lens L2P
vdL2N: Abbe number of the negative lens L2N.

By satisfying Conditional Expression (5), chromatic aberration can be corrected appropriately. This effect can be produced more significantly by satisfying Conditional Expression (5').

When an upper limit of Conditional Expression (5) is exceeded, a difference between the Abbe numbers between the positive lens L2P and the negative lens L2N becomes too small, and the chromatic aberration is not sufficiently corrected.

When a lower limit of Conditional Expressions (5), (5') is exceeded, a difference between the Abbe numbers of the positive lens L2P and the negative lens L2N becomes too large, and the chromatic aberration is excessively corrected.

The zoom lens of the present embodiment is preferable to satisfy following Conditional Expression (6), and is more preferable to satisfy following Conditional Expression (6').

$$0.5 < fL1/fGFF < 5 \quad (6)$$

$$1 < fL1/fGFF < 3 \quad (6')$$

where
fL1: focal length of the positive lens component L1
fGFF: focal length of the lens group GFF having a positive refractive power.

By satisfying Conditional Expression (6), a field curvature at a short focal length end, and spherical aberration and coma aberration at a long focal length end when changing an imaging distance can be well corrected. This effect can be produced more significantly by satisfying Conditional Expression (6').

When an upper limit of Conditional Expression (6) is exceeded, the refractive power of the positive lens component L1 becomes too low, and aberration occurring in the focusing lens group GF is not sufficiently corrected, and a field curvature at a short focal length end and spherical aberration and coma aberration at a long focal length end when changing an imaging distance are degraded.

When a lower limit of Conditional Expression (6) is exceeded, the refractive power of the positive lens component L1 becomes too high, and the aberration occurring in the focusing lens group GF is excessively corrected and, therefore, the field curvature at the short focal length end and the spherical aberration and the coma aberration at the long focal length end when changing an imaging distance are degraded.

The zoom lens of the present embodiment is preferable to satisfy following Conditional Expression (7), and is more preferable to satisfy following Conditional Expression (7').

$$0.5 < |fL2|/fL1 < 20 \quad (7)$$

$$0.6 < |fL2|/fL1 < 10 \quad (7')$$

where
fL1: focal length of the positive lens component L1
fL2: focal length of the lens component L2.

By satisfying Conditional Expression (7), spherical aberration, coma aberration, a field curvature, and chromatic aberration when changing an imaging distance can be well corrected. This effect can be produced more significantly by satisfying Conditional Expression (7').

When an upper limit of Conditional Expression (7) is exceeded, the refractive power of the positive lens component L1 becomes too high, and the spherical aberration, the coma aberration, and the field curvature when changing an imaging distance vary (are degraded).

When a lower limit of Conditional Expression (7) is exceeded, the refractive power of the lens component L2 becomes too high, and the spherical aberration, the coma aberration, and the chromatic aberration when changing an imaging distance vary (are degraded).

The zoom lens of the present embodiment is preferable to satisfy following Conditional Expression (8), and is more preferable to satisfy following Conditional Expression (8').

$$0.1 < TLT/fT < 0.95 \quad (8)$$

$$0.3 < TLT/fT < 0.92 \quad (8')$$

where
TLT: total lens length when focusing on infinity at a long focal length end
fT: focal length of an entire system when focusing on infinity at a long focal length end.

By satisfying Conditional Expression (8), the entire lens system can be downsized, and spherical aberration and coma aberration at a long focal length end can be well corrected. This effect can be produced more significantly by satisfying Conditional Expression (8').

When an upper limit of Conditional Expression (8) is exceeded, the size of the entire lens system increases.

When a lower limit of Conditional Expression (8) is exceeded, the spherical aberration and coma aberration mostly at a long focal length end are degraded.

The zoom lens of the present embodiment is preferable to satisfy following Conditional Expression (9), and is more preferable to satisfy following Conditional Expression (9').

$$0.1 < f1/fT < 1 \quad (9)$$

$$0.3 < f1/fT < 0.7 \quad (9')$$

where
f1: focal length of the first lens group G1
fT: focal length of the entire system when focusing on infinity at a long focal length end.

By satisfying Conditional Expression (9), the entire lens system can be downsized, and spherical aberration and coma aberration mostly at a long focal length end can be well corrected. This effect can be produced more significantly by satisfying Conditional Expression (9').

When an upper limit of Conditional Expression (9) is exceeded, the size of the entire lens system increases.

When a lower limit of Conditional Expression (9) is exceeded, the spherical aberration and the coma aberration mostly at a long focal length end are degraded.

The zoom lens of the present embodiment is preferable to satisfy following Conditional Expression (10), and is more preferable to satisfy following Conditional Expression (10').

$$0.3 < f2/fGF < 3.0 \quad (10)$$

$$0.4 < f2/fGF < 2.5 \quad (10')$$

where
f2: focal length of the second lens group G2
fGF: focal length of the focusing lens group GF.

By satisfying Conditional Expression (10), aberration variation caused by changing an imaging distance and aberration variation while zooming can be suppressed. Particularly, spherical aberration and coma aberration at a long focal length end, and astigmatism at a short focal length end can be well corrected. This effect can be produced more significantly by satisfying Conditional Expression (10').

When an upper limit of Conditional Expression (10) is exceeded, the refractive power of the focusing lens group GF becomes too high compared to the second lens group G2, and aberration variation caused by a change in an imaging distance becomes large. Particularly, it becomes difficult to correct spherical aberration and a coma aberration at a long focal length end.

When a lower limit of Conditional Expression (10) is exceeded, the refractive power of the second lens group G2 becomes too high compared to the focusing lens group GF, and aberration variation while zooming becomes large. Particularly, it becomes difficult to correct the astigmatism at a short focal length end and the spherical aberration at a long focal length end.

The zoom lens of the present embodiment is preferable to satisfy following Conditional Expression (11), and is more preferable to satisfy following Conditional Expression (11').

$$-8 < f1/f2 < -2 \quad (11)$$

$$-7 < f1/f2 < -2.7 \quad (11')$$

where
f1: focal length of the first lens group G1
f2: focal length of the second lens group G2.

By satisfying Conditional Expression (11), aberration variation while zooming can be suppressed, and spherical aberration and coma aberration at a long focal length end can be well corrected. Moreover, the entire lens system can be downsized. This effect can be produced more significantly by satisfying Conditional Expression (11').

When an upper limit of Conditional Expression (11) is exceeded, the refractive power of the first lens group G1 becomes too high compared to the second lens group G2, and it becomes difficult to correct the spherical aberration and the coma aberration at a long focal length end.

When a lower limit of Conditional Expression (11) is exceeded, the refractive power of the second lens group G2 becomes too high compared to the first lens group G1, and aberration variation while zooming becomes large. Moreover, the size of the entire lens system increases.

In the zoom lens of the present embodiment, a position in an optical axis direction of the first lens group G1 or the second lens group G2 is fixed when changing magnification from a short focal length end to a long focal length end. If the first lens group G1 and the second lens group G2 moves while zooming, it is to be a cause of an eccentric error, and is to be a cause of coma aberration mostly at a long focal length end. By including the first lens group G1 and the second lens group G2 in a fixed group while zooming, the eccentric error can be suppressed, and the coma aberration and the like mostly at a long focal length end can be well corrected.

In the zoom lens of the present embodiment, the focusing lens group GF includes at least one negative lens. In this case, the zoom lens of the present embodiment is preferable to satisfy following Conditional Expression (12), and is more preferable to satisfy following Conditional Expression (12').

$$35 < vdGFN \quad (12)$$

$$37 < vdGFN \quad (12')$$

where vdGFN: Abbe number of the negative lens GFN having the highest Abbe number among negative lenses included in the focusing lens group GF.

By satisfying Conditional Expression (12), axial chromatic aberration caused by zooming or focusing can be suppressed. This effect can be produced more significantly by satisfying Conditional Expression (12').

When a lower limit of Conditional Expression (12) is exceeded, variation of the axial chromatic aberration caused by zooming or focusing becomes large.

In the zoom lens of the present embodiment, the focusing lens group GF includes at least one negative lens and at least one positive lens. In this case, the zoom lens of the present embodiment is preferable to satisfy following Conditional Expression (13), and is more preferable to satisfy following Conditional Expression (13').

$$-10 < fGFP/fGFN < -0.5 \qquad (13)$$

$$-4 < fGFP/fGFN < -0.6 \qquad (13')$$

where fGFP: focal length of the positive lens GFP having the lowest Abbe number among positive lenses included in the focusing lens group GF fGFN: focal length of the negative lens GFN having the highest Abbe number among negative lenses included in the focusing lens GF.

By satisfying Conditional Expression (13), a field curvature at a short focal length end, and spherical aberration, coma aberration, and chromatic aberration at a long focal length end when changing imaging distance can be well corrected. Moreover, by reducing a focusing travel distance of the focusing lens group GF, high speed AF can be implemented. This effect can be produced more significantly by satisfying Conditional Expression (13').

When an upper limit of Conditional Expression (13) is exceeded, the refractive power of the negative lens GFN becomes too low, to increase a focusing travel distance of the focusing lens GF, and high speed AF becomes difficult to be implemented. Moreover, the refractive power of the positive lens GFP becomes too high, and the field curvature at a short focal length end the spherical aberration and the coma aberration at a long focal length end when changing an imaging distance are degraded.

When a lower limit of Conditional Expression (13) is exceeded, the refractive power of the negative lens GFN becomes too high, and a field curvature at a short focal length end and spherical aberration, coma aberration, and chromatic aberration at a long focal length end when changing an imaging distance are degraded.

In the zoom lens of the present embodiment, the focusing lens group GF includes at least one negative lens and at least one positive lens. In this case, the zoom lens of the present embodiment is preferable to satisfy following Conditional Expression (14), and is more preferable to satisfy following Conditional Expression (14').

$$0.2 < vdGFP/vdGFN < 0.7 \qquad (14)$$

$$0.3 < vdGFP/vdGFN < 0.6 \qquad (14')$$

where vdGFP: Abbe number of the positive lens GFP having the lowest Abbe number among positive lenses included in the focusing lens group GF vdGFN: Abbe number of the negative lens GFN having the highest Abbe number among negative lenses included in the focusing lens group GF.

By satisfying Conditional Expression (14), chromatic aberration can be corrected appropriately. This effect can be produced more significantly by satisfying Conditional Expression (14').

When an upper limit of Conditional Expression (14) is exceeded, a difference between Abbe numbers of the positive lens GFP and the negative lens GFN becomes too small, and the chromatic aberration is not sufficiently corrected.

When a lower limit of Conditional Expression (14) is exceeded, a difference between Abbe numbers of the positive lens GFP and the negative lens GFN becomes too large, and the chromatic aberration is excessively corrected.

The zoom lens of the present embodiment includes at least one lens group that is positioned on an image side relative to the focusing lens group GF. Because the pupil diameter is smaller on the image side relative to the focusing lens group GF, it is less prone to be affected by the spherical aberration or the coma aberration. Therefore, the lens group on the image side relative to the focusing lens group GF can be dedicated to correction of a field curvature, chromatic aberration of magnification, and the like.

The zoom lens of the present embodiment includes at least one lens group that is positioned on the image side relative to the focusing lens group GF. In this case, the zoom lens of the present embodiment is preferable to satisfy following Conditional Expression (15), and is more preferable to satisfy following Conditional Expression (15').

$$0.1 < TLT/DGFRT < 0.5 \qquad (15)$$

$$0.1 < TLT/DGFRT < 0.4 \qquad (15')$$

where

TLT: total lens length when focusing on infinity at a long focal length end

DGFRT: distance on an optical axis from a refractive surface on the most image side of the lens group GFF having a positive refractive power to a refractive surface of the most object side of the lens group on the image side relative to the focusing lens group GF when focusing on infinity at a long focal length end.

By satisfying Conditional Expression (15), aberration variation caused by a change in an imaging distance can be suppressed. Particularly, a field curvature at a short focal length end, and spherical aberration at a short focal length end and coma aberration can be well corrected. Moreover, by reducing a focusing travel distance of the focusing lens group GF, high speed AF can be implemented. This effect can be produced more significantly by satisfying Conditional Expression (15').

When an upper limit of Conditional Expression (15) is exceeded, the total lens length at a long focal distance end becomes too long. If the total lens length is forced to be reduced, the refractive power of the focusing lens group GF has to be increased, resulting in an increase of aberration variation by a change in an imaging distance. Particularly, correction of a field curvature at a short focal length end and spherical aberration and coma aberration at a long focal length end becomes difficult.

When a lower limit of Conditional Expressions (15), (15') is exceeded, a focusing travel distance of the focusing lens group GF becomes too large, and implementation of high speed AF becomes difficult.

The zoom lens of the present embodiment includes at least one lens group that is positioned on the image side relative to the focusing lens group GF. In this case, the zoom lens of the present embodiment is preferable to satisfy following Conditional Expression (16), and is more preferable to satisfy following Conditional Expression (16').

$$|fGFRT|/fGF<-1.5 \quad (16)$$

$$-1000<|fGFRT|/fGF<-2 \quad (16')$$

where
fGFRT: combined focal length of the lens group on the image side relative to the focusing lens group GF when focusing on infinity at a long focal length end
fGF: focal length of the focusing lens group GF.

By satisfying Conditional Expression (16), aberration variation caused by a change in an imaging distance can be well corrected. Particularly, spherical aberration and coma aberration at a long focal length end can be well corrected. This effect can be produced more significantly by satisfying Conditional Expression (16'). Furthermore, by satisfying Conditional Expression (16'), aberration variation while zooming or when changing an imaging distance can be well corrected. Particularly, coma aberration that is off-axis aberration and a field curvature can be well corrected.

When an upper limit of Conditional Expression (16) is exceeded, the refractive power of the lens group on the image side relative to the focusing lens group GF becomes too high, and aberration variation while zooming or when changing an imaging distance becomes large. Particularly, correction of coma aberration, which is off-axis aberration, and a field curvature becomes difficult.

When a lower limit of Conditional Expression (16') is exceeded, the refractive power of the focusing lens group GF becomes too high, and aberration variation when changing an imaging distance becomes large. Particularly, correction of spherical aberration and coma aberration at a long focal length end becomes difficult.

In the zoom lens of the present embodiment, it is preferable that intervals between the focusing lens group GF and the lens groups positioned in front and behind and the focusing lens group GF adjacent thereto change when changing magnification from a short focal length end to a long focal length end. The focusing lens group GF also plays a role of a compensator while zooming, and because the pupil diameter of the focusing lens group GF is small, an influence on spherical aberration is small, and thereby enabling to suppress variation in a field curvature during zooming effectively.

The zoom lens of the present embodiment is preferable to satisfy following Conditional Expression (17), and is more preferable to satisfy following Conditional Expression (17').

$$3.0<|(1-M\_GFT^2)\times M\_GFRT^2| \quad (17)$$

$$3.5<|(1-M\_GFT^2)\times M\_GFRT^2| \quad (17')$$

where
M_GFT: lateral magnification of the focusing lens group GF when focusing on infinity at a long focal length end
M_GFRT: combined lateral magnification of all of the lens groups arranged on the image side relative to the focusing lens group when focusing on infinity at a long focal length end (M_GFRT=1 when the focusing lens GF is position on the most image side).

Conditional Expression (17), (17') define a focusing sensitivity of the focusing lens group GF, and by satisfying Conditional Expression (17), maximum imaging magnification can be obtained, a focusing travel distance of the focusing lens group GF is reduced to enable high speed AF, and downsizing of the entire lens system can be achieved. This effect can be produced more significantly by satisfying Conditional Expression (17').

When a lower limit of Conditional Expression (17) is exceeded, the focusing sensitivity of the focusing lens group GF becomes too low, and a shortest imaging distance increases, to lower the maximum imaging magnification. Or, the focusing travel distance of the focusing lens group GF increases to lower the AF speed, and the total length of the lenses increases.

The first lens group G1 is preferable to include one negative lens and two positive lenses. On the long focal length end side (telephoto side), aberration is enlarged, and particularly, spherical aberration, coma aberration, and chromatic aberration are augmented. For a positive lens in the first lens group G1, a low-refractive low dispersion material is used for correction of chromatic aberration. In this case, if only one positive lens is used, spherical aberration and coma aberration increase and, consequently, it becomes difficult to extend a focal length on the long focal length end side (telephoto side). Therefore, it is preferable to include at least two positive lenses in the first lens group GF. Moreover, to cancel aberration occurring in a positive lens, it is preferable to include at least one negative lens in the first lens group G1.

In the zoom lens of the present embodiment, the first lens group G1 includes at least one negative lens. In this case, the zoom lens of the present embodiment is preferable to satisfy following Conditional Expression (18), and is more preferable to satisfy following Conditional Expression (18').

$$-10<f1/fN<-0.7 \quad (18)$$

$$-3.3<f1/fN<-0.8 \quad (18')$$

where
f1: focal length of the first lens group G1
fN: focal length of a negative lens having the highest refractive power among negative lenses included in the first lens group G1.

By satisfying Conditional Expression (18), spherical aberration, coma aberration, and chromatic aberration can be well corrected. This effect can be produced more significantly by satisfying Conditional Expression (18').

When an upper limit of Conditional Expression (18) is exceeded, the power of the negative lens having the highest refractive power among the negative lenses included in the first lens group G1 becomes too low, and correction of spherical aberration, coma aberration, and chromatic aberration becomes difficult.

When a lower limit of Conditional Expression (18) is exceeded, the power of the negative lens having the highest refractive power among the negative lenses included in the first lens group G1 becomes too high, and correction of spherical aberration, coma aberration, astigmatism, and chromatic aberration in the entire zoom area becomes difficult.

The zoom lens of the present embodiment is preferable to satisfy following Conditional Expression (19), and is more preferable to satisfy following Conditional Expression (19').

$$0.3<f1/(fw\times ft)^{1/2}<3 \quad (19)$$

$$0.7<f1/(fw\times ft)^{1/2}<1.5 \quad (19')$$

where
f1: focal length of the first lens group G1
fw: focal length of the entire system when focusing on infinity at a short focal length end
ft: focal length of the entire system when focusing on infinity at a long focal length end.

By satisfying Conditional Expression (19), a desirable magnification ratio can be obtained, and the entire lens system can be downsized. Moreover, particularly on the long focal length end side (telephoto side), spherical aberration, coma aberration, astigmatism, axial chromatic aberration, chromatic aberration of magnification, and the like can be well corrected. This effect can be produced more significantly by satisfying Conditional Expression (19').

When an upper limit of Conditional Expression (19) is exceeded, the power of the first lens group G1 becomes too low, and the magnification ratio decreases, or the size of the entire lens system increases.

When a lower limit of Conditional Expression (19) is exceeded, the refractive power of the first lens group G1 becomes too high, and correction of spherical aberration, coma aberration, astigmatism, axial chromatic aberration, chromatic aberration of magnification, and the like becomes difficult particularly on the long focal length end side (telephoto side).

The zoom lens of the present embodiment is preferable to satisfy following Conditional Expression (20).

$$0.1 < (D12T - D12W)/f1 < 10 \quad (20)$$

where
f1: focal length of the first lens group G1
D12T: distance on an optical axis from a refractive surface on the most image side of the first lens group G1 to a refractive surface on the most object side of the second lens group G2 when focusing on infinity at a long focal length end
D12W: distance on an optical axis from a refractive surface on the most image side of the first lens group G1 to a refractive surface on the most object side of the second lens group G2 when focusing on infinity at a short focal length end.

By satisfying Conditional Expression (20), a sufficient magnification ratio can be obtained, while downsizing the entire lens system. Moreover, various kinds of aberration variation while zooming can be well corrected.

When an upper limit of Conditional Expression (20) is exceeded, an amount of variation in interval between the first lens group G1 and the second lens group G2 when changing magnification is too large, and the interval between the first lens group G1 and the second lens group G2 becomes too large on the long focal length end side (telephoto side), to increase the size of the entire lens system.

When a lower limit of Conditional Expression (20) is exceeded, the amount of variation in interval between the first lens group G1 and the second lens group G2 when changing magnification is too small, and the magnification ratio becomes small (not obtained). Moreover, if a desirable magnification ratio is forced be obtained, it becomes necessary to increase the refractive power of the first lens group G1 and the second lens group G2, and various kinds of aberration variation while zooming become large.

The zoom lens of the present embodiment is preferable to satisfy following Conditional Expression (21).

$$-10 < (D2RW - D2RT)/f2 < -0.1 \quad (21)$$

where
f2: focal length of the second lens group G2
D2RW: distance on an optical axis from a refractive surface on the most image side of the second lens group G2 to a refractive surface on the most object side of the rear group when focusing on infinity at a short focal length end
D2RT: distance on an optical axis from a refractive surface on the most image side of the second lens group G2 to a refractive surface on the most object side of the rear group when focusing on infinity at a long focal length end.

By satisfying Conditional Expression (21), a sufficient magnification ratio can be obtained, while downsizing the entire lens system. Moreover, various kinds of aberration variation while zooming can be well corrected.

When an upper limit of Conditional Expression (21) is exceeded, an interval between the second lens group G2 and the rear group becomes too large on the short focal length end side (wide angle side), to increase the size of the entire lens system.

When a lower limit of Conditional Expression (21) is exceeded, an amount of variation in interval between the second lens group G2 and the rear group when changing magnification is too small, and the magnification ratio becomes small (not obtained). Moreover, if a desirable magnification ratio is forced be obtained, it becomes necessary to increase the refractive power of the second lens group G2 or the rear group (the third lens group G3), and various kinds of aberration variation while zooming become large.

The zoom lens of the present embodiment is preferable to satisfy following Conditional Expression (22), and is more preferable to satisfy following Conditional Expression (22').

$$0.3 < (ft/fw)/(M2T/M2W) < 2 \quad (22)$$

$$0.5 < (ft/fw)/(M2T/M2W) < 1.7 \quad (22')$$

where
ft: focal length of the entire system when focusing on infinity at a long focal length end
fw: focal length of the entire system when focusing on infinity at a short focal length end
M2T: lateral magnification of the second lens group G2 when focusing on infinity at a long focal length end
M2W: lateral magnification of the second lens group G2 when focusing on infinity at a short focal length end.

Conditional Expressions (22), (22') define a magnification burden on the second lens group G2. By satisfying Conditional Expression (22), spherical aberration, coma aberration, astigmatism variation, and the like can be well corrected while acquiring a desired magnification ratio. This effect can be produced more significantly by satisfying Conditional Expression (22').

When an upper limit of Conditional Expression (22) is exceeded, the magnification burden of the second lens group G2 decreases, and it is necessary to increase the refractive power of the other lens groups to acquire a desired magnification ratio. Therefore, correction of spherical aberration, coma aberration, astigmatism variation, and the like when zooming becomes difficult.

When a lower limit of Conditional Expression (22) is exceeded, the magnification burden of the second lens group G2 increases, and correction of spherical aberration, coma aberration, astigmatism variation, and the like when zooming becomes difficult.

In the zoom lens of the present embodiment, image blurring in a captured image caused by hand-held camera shake and the like can be corrected by including a vibration-proof lens group. When shake at the same angle occurs, because image blurring becomes larger as a focal length increases, it is more preferable that image blurring can be corrected more in a lens having a long focal length on a long focal length end side (telephoto side). However, when the size of a vibration-proof lens group unit increases, it affects the size of the lens to be large. Moreover, when the weight of the vibration-proof lens group itself increases, a compact and light-weighted structure is desired for the vibration-proof lens group to drive the heavy vibration-proof lens group.

Furthermore, the vibration-proof lens group is preferable to be included in the lens group, a position in an optical axis direction of which is fixed when changing magnification (the second lens group G2 or the fourth lens group G4 in the example of the present embodiment). Generally, for the vibration-proof lens group includes a driving mechanism (including mechanical parts, a magnet, a coil, an electrical component, and the like. Hereinafter, referred to as "vibration-proof driving mechanism") to move in a direction substantially perpendicular to the optical axis is arranged on an outer rim of a lens to be driven, and if it is structured to move the vibration-proof lens group while zooming, a zoom movement mechanism and a lens barrel are further necessary in the outer rim direction, to increase a lens outer diameter. However, by fixing the lens group including the vibration-proof lens group when changing magnification as in the zoom lens of the present embodiment, increase in size toward the outer rim direction of the zoom movement mechanism and the lens barrel can be prevented.

A zoom lens system of the present embodiment includes the vibration-proof lens group on the object side relative to the focusing lens group GF. In this case, the zoom lens of the present embodiment is preferable to satisfy following Conditional Expression (23), and is more preferable to satisfy following Conditional Expression (23').

$$0.9<|(1-M\_VT)\times M\_VRT|<4.5 \tag{23}$$

$$1.7<|(1-M\_VT)\times M\_VRT|<4.2 \tag{23'}$$

where
M_VT: lateral magnification of the vibration-proof lens when focusing on infinity at a long focal length end
M_VRT: combined lateral magnification of all of the lens groups on the image side relative to the vibration-proof lens when focusing on infinity at a long focal length end.

By satisfying Conditional Expression (23), a desired vibration control effect can be acquired, while well correcting eccentric aberration at the time of vibration control driving. Moreover, downsizing of the vibration-proof lens group, and by extension a vibration-control driving unit is possible. This effect can be produced more significantly by satisfying Conditional Expression (23').

When an upper limit of Conditional Expression (23) is exceeded, the refractive power of the vibration-proof lens group becomes too high, and the eccentric aberration at the time of vibration control driving increases.

When a lower limit of Conditional Expression (23) is exceeded, a vibration control sensitivity of the vibration-proof lens group becomes too low, and a desired vibration control effect cannot be obtained. Or, the size of the vibration-proof lens, and by extension the vibration-control driving unit increases.

The zoom lens of the present embodiment includes, in another mode (for example, the numerical example 7 described later) the first lens group having a positive refractive power, the second lens group having a negative refractive power, and the rear group, sequentially from the object side. When changing magnification from a short focal length end to a long focal length end, intervals between the adjacent lens groups change, and the rear group includes at least one lens group having a negative refractive power, and at least one lens group having a positive refractive power. A lens group having the highest negative refractive power in the lens group having a negative refractive power included in the rear group is the focusing lens group GF that moves toward an image side when focusing from infinity to a close range. The rear group includes at least one lens group positioned on the image side relative to the focusing lens group GF, and a lens group having a positive refractive power arranged closest to the object side thereamong is the focusing lens group GFRP that moves toward the object side when focusing from infinity to a close range. A positive lens included in the lens group GFRP is only one piece, and satisfies following Conditional Expression (24) and Conditional Expression (25).

$$35<vdRP<100 \tag{24}$$

$$1.55<NdRP \tag{25}$$

where
vdRP: Abbe number of a positive lens included in (constituting) the lens group GFRP
NdRP: refractive index of a positive lens included in (constituting) the lens group GFRP.

In the present application, "a positive lens included in the lens group GFRP is only one piece" includes, in addition to a case in which the lens group GFRP includes only one positive lens, a case in which one or more negative lenses are included besides the one positive lens.

In other words, the zoom lens of the present embodiment includes at least one lens group that is positioned on the image side relative to the focusing lens group GF, and the lens group having a positive refractive power arranged closest to the object thereamong is the lens group GFRP that moves toward the object side when focusing from infinity to a close range, and a positive lens included in the lens group GFRP is only one piece, and in this case, the zoom lens of the present embodiment is preferable to satisfy following Conditional Expression (24), and is more preferable to satisfy following Conditional Expression (24').

$$35<vdRP<100 \tag{24}$$

$$50<vdRP<68 \tag{24'}$$

where
vdRP: Abbe number of a positive lens included in (constituting) the lens group GFRP.

The zoom lens of the present embodiment can further include the lens group GFRP that moves when focusing, in addition to the focusing lens group GF. By adopting such a double focusing system, aberration correction can be performed more effectively when changing an imaging distance. Particularly, the lens group GFRP having a positive refractive power arranged adjacent to the image side relative to the focusing lens group GF has a relatively small lens outer diameter and lightweight, and high speed AF action is possible and can be structured with relatively small number of lenses.

Furthermore, by satisfying Conditional Expression (24), axial chromatic aberration and variation of chromatic aberration of magnification caused by zooming and focusing can be suppressed. This effect can be produced more significantly by satisfying Conditional Expression (24').

When a upper limit of Conditional Expression (24) is exceeded, the axial chromatic aberration and variation of chromatic aberration of magnification caused by zooming or focusing are excessively corrected.

When a lower limit of Conditional Expression (24) is exceeded, the axial chromatic aberration and variation of chromatic aberration of magnification caused by zooming or focusing increase.

Moreover, the zoom lens of the present embodiment includes at least one lens group that is positioned on the image side relative to the focusing lens group GF, and the lens group having a positive refractive power arranged closes to the object side thereamong is the lens group GFRP that moves toward the object side when focusing from infinity to a close range, and the positive lens included in the lens group GFRP is only one piece, and in this case, the zoom lens of the present embodiment is preferable to satisfy following Conditional Expression (25), and is more preferable to satisfy following Conditional Expression (25').

$$1.55 < NdRP \tag{25}$$

$$1.59 < NdRP \tag{25'}$$

where
NdRP: refractive index of a positive lens included in (constituting) the lens group GFRP.

By satisfying Conditional Expression (25), spherical aberration, coma aberration, astigmatism, and the like can be well corrected. Moreover, a field curvature at a short focal length end, and spherical aberration and coma aberration at a long focal length end when changing an imaging distance can be well corrected. This effect can be produced more significantly by satisfying Conditional Expression (25').

When a lower limit of Conditional Expression (25) is exceeded, it becomes difficult to correct spherical aberration, coma aberration, astigmatism, and the like. Particularly, the field curvature at the short focal length end and the spherical aberration and the coma aberration at the long focal length end when changing an imaging distance are degraded.

Furthermore, the zoom lens of the present embodiment includes at least one lens group that is positioned on the image side relative to the focusing lens group GF, and the lens group having a positive refractive power arranged closes to the object side thereamong is the lens group GFRP that moves toward the object side when focusing from infinity to a close range, and the positive lens included in the lens group GFRP is only one piece, and in this case, the zoom lens of the present embodiment is preferable to satisfy following Conditional Expression (26), and is more preferable to satisfy following Conditional Expression (26').

$$0.2 < |fGF/fGFRP| < 2.5 \tag{26}$$

$$0.4 < |fGF/fGFRP| < 1.5 \tag{26'}$$

where
fGF: focal length of the focusing lens group GF
fGFRP: focal length of the lens group GFRP.

By satisfying Conditional Expression (26), spherical aberration, coma aberration, astigmatism, and the like can be well corrected. Moreover, a field curvature at a short focal length end, and spherical aberration and coma aberration at a long focal length end when changing an imaging distance can be well corrected. This effect can be produced more significantly by satisfying Conditional Expression (26').

When an upper limit of Conditional Expression (26) is exceeded, the refractive power of the lens group GFRP becomes too high, and it becomes difficult to correct spherical aberration, coma aberration, astigmatism, and the like. Particularly, the spherical aberration and the coma aberration at the long focal length end when changing an imaging distance are degraded.

When a lower limit of Conditional Expression (26) is exceeded, the refractive power of the lens group GFRP becomes too low, and it becomes difficult to correct spherical aberration, coma aberration, astigmatism, and the like. Particularly, the field curvature at the short focal length end when changing an imaging distance are degraded.

The zoom lens of the present embodiment includes, in another mode (for example, the numerical example 1 described later), the first lens group having a positive refractive power, the second lens group having a negative refractive power, and the rear group, sequentially from the object side. When changing magnification from a short focal length end to a long focal length end, intervals between the adjacent lens groups change, and the rear group includes at least one lens group having a negative refractive power, and at least one lens group having a positive refractive power. A lens group having the highest negative refractive power in the lens group having a negative refractive power included in the rear group is the focusing lens group GF that moves toward an image side when focusing from infinity to a close range. The lens group GFF having the positive refractive power arranged adjacent to the object side of the focusing lens group GF out of the lens groups having a positive refractive power included in the rear group includes, sequentially from the object side, the positive lens L4P, the positive lens L3P, the negative lens L3N, the negative lens L2N, the positive lens L2P, and the positive lens L1P, and the negative lens L2N, the negative lens L3N respectively satisfy following Conditional Expressions (27) and (28).

$$1.91 < NdL2N \tag{27}$$

$$1.91 < NdL3N \tag{28}$$

where
NdL2N: refractive index of the negative lens L2N
NdL3N: refractive index of the negative lens L3N.

As described above, in the zoom lens of the present embodiment, the lens group GFF having a positive refractive power arranged adjacent to the object side of the focusing lens group GF out of the lens groups having a positive refractive power included in the rear group can include, sequentially from the object side, the positive lens L4P, the positive lens L3P, the negative lens L3N, the negative lens L2N, the positive lens L2P, and the positive lens L1P. By adopting a structure in which the lenses are thus arranged symmetrically, aberration correction can be more effectively performed when changing magnification or changing an imaging distance. Particularly, it is effective for off-axis aberration, such as coma aberration and astigmatism. Moreover, because it is structure such that an interval between the negative lens L3N and the negative lens L2N is fixed while zooming, aberration caused by eccentricity occurring when changing magnification can be suppressed.

The zoom lens of the present embodiment is preferable to satisfy following Conditional Expressions (27), (28), and is more preferable to satisfy following Conditional Expressions (27'), (27"), (28'), (28") on the precondition that it has the above lens structure.

$$1.91 < NdL2N \tag{27}$$

$$1.95 < NdL2N \tag{27'}$$

$$2.00 < NdL2N \tag{27"}$$

$$1.91 < NdL3N \tag{28}$$

$$1.95 < NdL3N \tag{28'}$$

$$2.00 < NdL3N \tag{28"}$$

where
NdL2N: refractive index of the negative lens L2N
NdL3N: refractive index of the negative lens L3N.

By satisfying Conditional Expression (27), spherical aberration, coma aberration, and the like in the entire zoom area can be well corrected. Moreover, spherical aberration and coma aberration variation can be well corrected when changing magnification. This effect can be produced more significantly by satisfying Conditional Expressions (27'), (27").

When a lower limit of Conditional Expression (27) is exceeded, it becomes difficult to correct spherical aberration, coma aberration, and the like in the entire zoom area. Furthermore, spherical aberration and coma aberration when changing an imaging distance are degraded.

By satisfying Conditional Expression (28), spherical aberration, coma aberration, and the like in the entire zoom area can be well corrected. Moreover, spherical aberration and coma aberration variation can be well corrected when changing magnification. This effect can be produced more significantly by satisfying Conditional Expressions (28'), (28").

When a lower limit of Conditional Expression (28) is exceeded, it becomes difficult to correct spherical aberration, coma aberration, and the like in the entire zoom area. Furthermore, spherical aberration and coma aberration when changing an imaging distance are degraded.

The zoom lens of the present embodiment is preferable to satisfy following Conditional Expression (29), and is more preferable to satisfy following Conditional Expressions (29'), (29") on the precondition that it has the structure including the positive lens L4P, the positive lens L3P, the negative lens L3N, the negative lens L2N, the positive lens L2P, the positive lens L1P sequentially from the object side.

$$0.2 < D23N < DGFF < 0.8 \tag{29}$$

$$0.3 < D23N < DGFF < 0.7 \tag{29'}$$

$$0.352 < D23N < DGFF < 0.65 \tag{29"}$$

where
D23N: distance on an optical axis from a surface on the image side of the negative lens L3N to a surface on the object side of the negative lens L2N
DGFF: distance on an optical axis from a refractive surface on the most object side to a refractive surface on the most image side of the lens group GFF.

By satisfying Conditional Expression (29), the total lens length can be reduced, and coma aberration can be well corrected in the entire zoom area.

When an upper limit of Conditional Expression (29) is exceeded, the thickness of the lens group GFF in the optical axis direction becomes too large, and the total lens length increases. Accordingly, it is necessary to increase a lens diameter to increase peripheral illumination of off-axis light, and as a result, correction of coma aberration becomes difficult.

When a lower limit of Conditional Expression (29) is exceeded, correction of coma aberration in the entire zoom area becomes difficult.

The zoom lens of the present embodiment is preferable to satisfy following Conditional Expression (30), and is more preferable to satisfy following Conditional Expressions (30'), (30") on the precondition that it has the structure including the positive lens L4P, the positive lens L3P, the negative lens L3N, the negative lens L2N, the positive lens L2P, the positive lens L1P sequentially from the object side.

$$0.7 < fGFFA < fGFFB < 1.5 \tag{30}$$

$$0.75 < fGFFA < fGFFB < 1.3 \tag{30'}$$

$$0.8 < fGFFA < fGFFB < 1.2 \tag{30"}$$

where
fGFFA: combined focal distance of the positive lens L4P, the positive lens L3P, and the negative lens L3N
fGFFB: combined focal distance of the negative lens L2N, the positive lens L2P, the positive lens L1P.

By satisfying Conditional Expression (30), spherical aberration, coma aberration, astigmatism, and the like in the entire zoom area can be well corrected.

When an upper limit of Conditional Expression (30) is exceeded, the symmetry of the refractive power of the lens group GFF collapses, and correction of spherical aberration, coma aberration, astigmatism, and the like becomes difficult.

When a lower limit of Conditional Expression (30) is exceeded, the symmetry of the refractive power of the lens group GFF collapses, and correction of spherical aberration, coma aberration, astigmatism, and the like becomes difficult in this case also.

Specific numerical examples 1 to 7 will be explained. In longitudinal aberration diagrams, lateral aberration diagrams, and tables, d-line, g-line, and C-line indicate aberrations with respect to the respective wavelengths, S signifies sagittal, M signifies meridional, FNO. signifies F number, f signifies a focal length, W signifies a half angle of view, Y signifies an image height, BF signifies back focus, L signifies total lens length, R signifies curvature radius, D signifies lens thickness or lens interval, N(d) signifies refractive index with respect to d-line, and ν(d) signifies Abbe number with respect to d-line. The back focus is a distance from a surface on the most image side in the entire lens system to a designed imaging surface. The lens total length and the back focus indicate values of air conversion length from the surface on the most image side of the entire lens system to the designed imaging surface without including a cover glass and the like. The F number, the focal length, the magnification, the half angle of view, the image height, the back focus, the total lens length, and an interval D that changes in interval with zooming and focusing are shown in order of the short focal length end-intermediate focal length-long focal length end. The unit of length is [mm].

A rotation symmetric aspheric surface is defined by the following equation.

$$x = cy^2/[1+[1-(1+K)c^2y^2]^{1/2}] + A4y^4 + A6y^6 + A8y^8 + A10y^{10} + A12y^{12} \ldots$$

(where c is curvature (1/r), y is height from an optical axis, K is cone coefficient, A4, A6, A8, . . . are aspheric surface coefficients of respective grades).

Numerical Example 1

Figure 8:
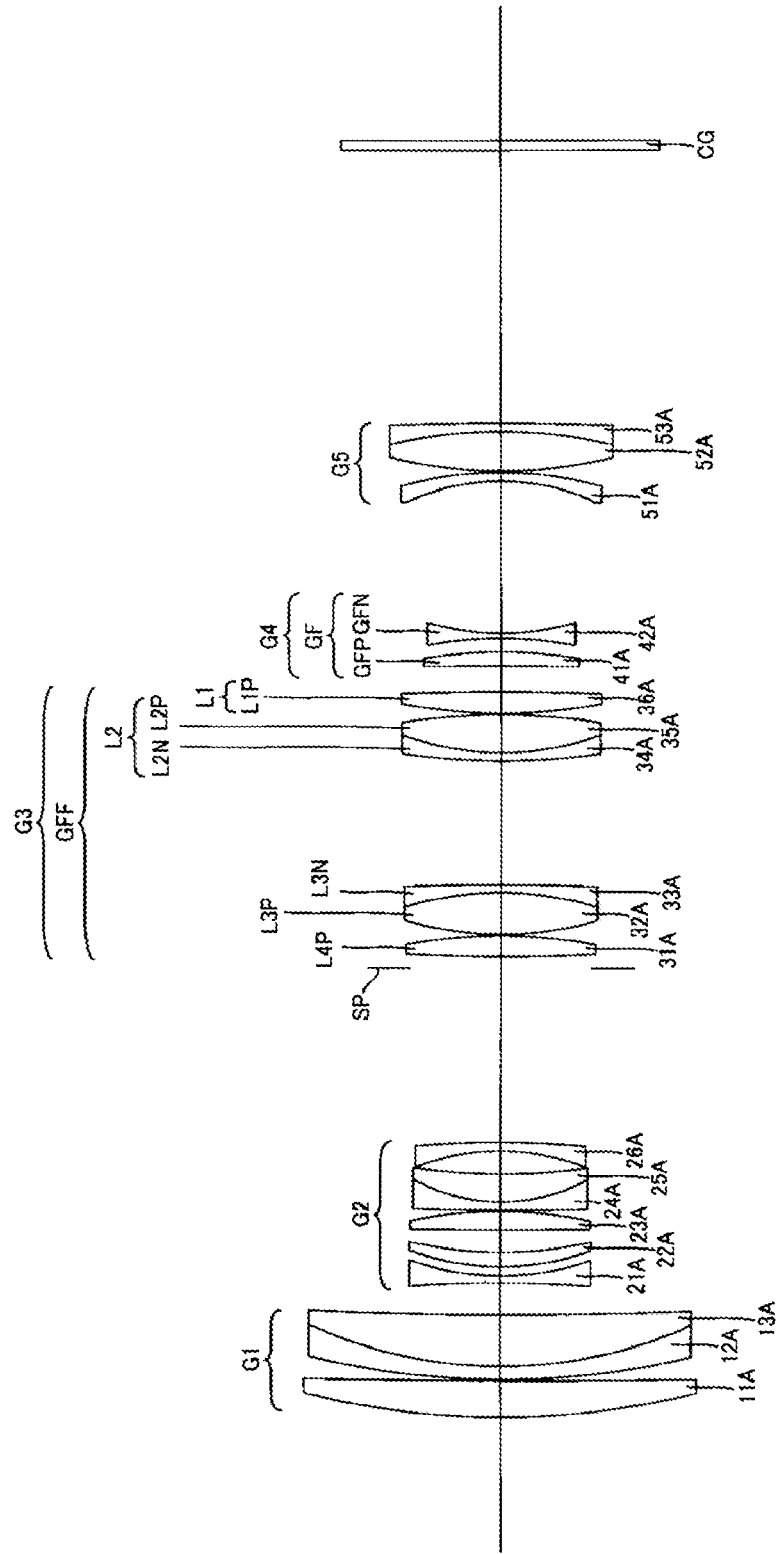
FIG. 8 is a diagram illustrating a lens structure at when focusing on infinity at a short focal length end of the zoom lens of the numerical example 1.
Figure 9:
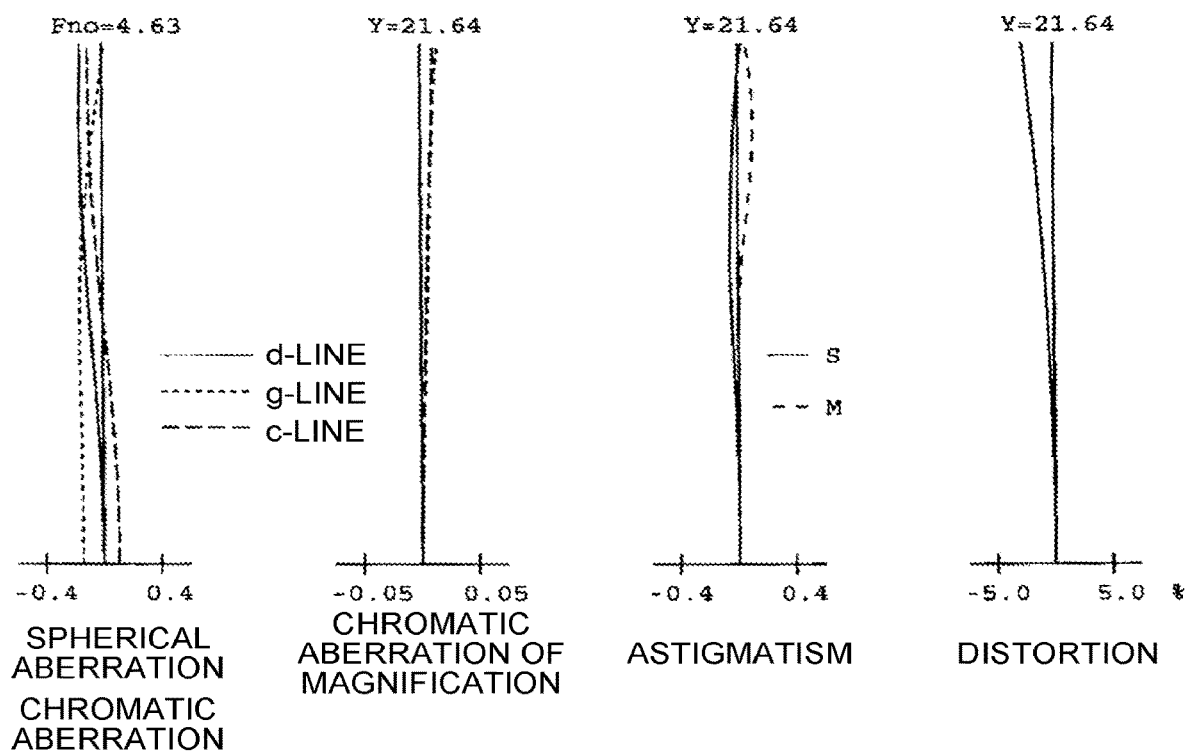
FIG. 9 is a longitudinal aberration diagram when focusing on infinity at the short focal length end of the zoom lens of the numerical example 1.
Figure 10:
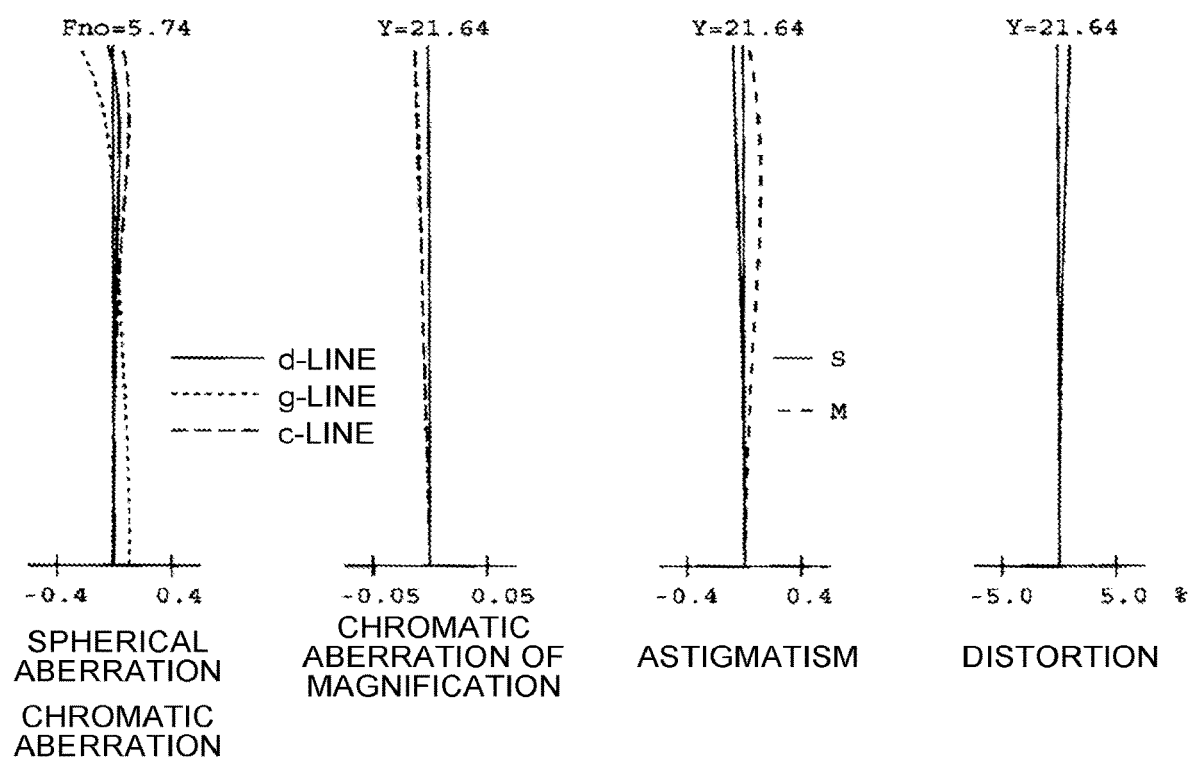
FIG. 10 is a longitudinal aberration diagram when focusing on infinity at a long focal length end of the zoom lens of the numerical example 1.
Figure 11:
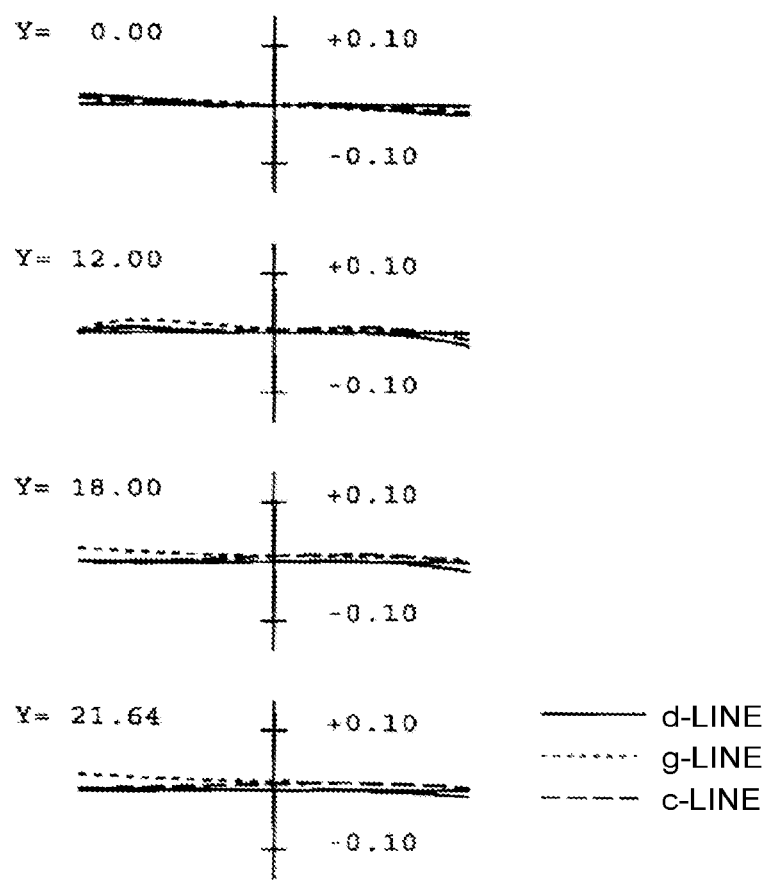
FIG. 11 is a lateral aberration diagram when focusing on infinity at the short focal length end of the zoom lens of the numerical example 1.
Figure 12:
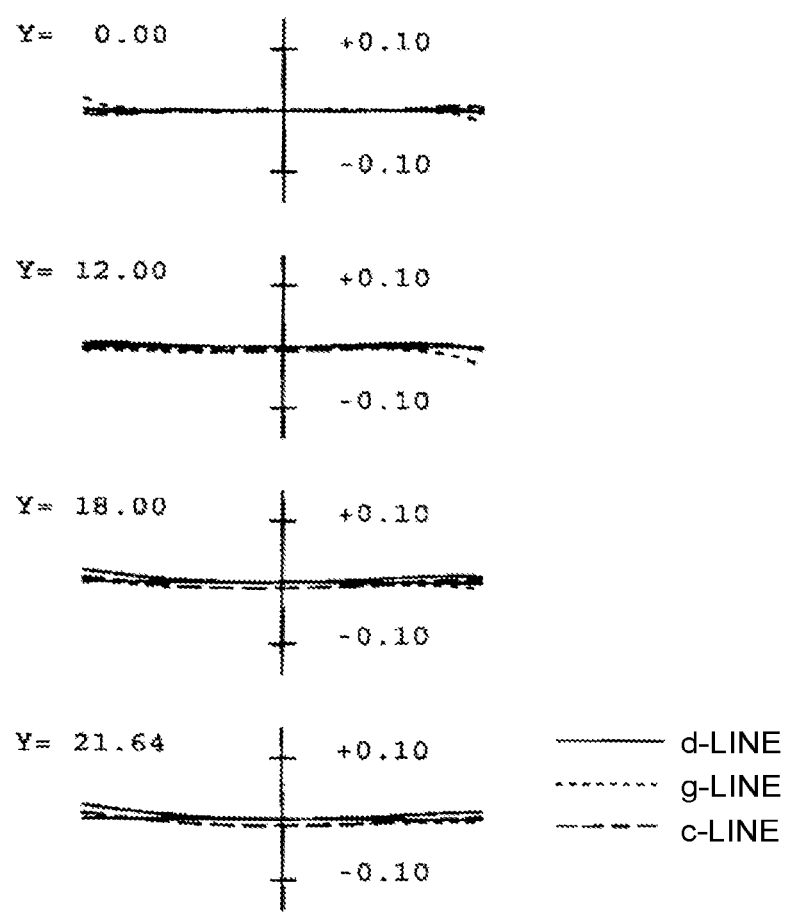
FIG. 12 is a lateral aberration diagram when focusing on infinity at the long focal length end of the zoom lens of the numerical example 1.
Figure 13:
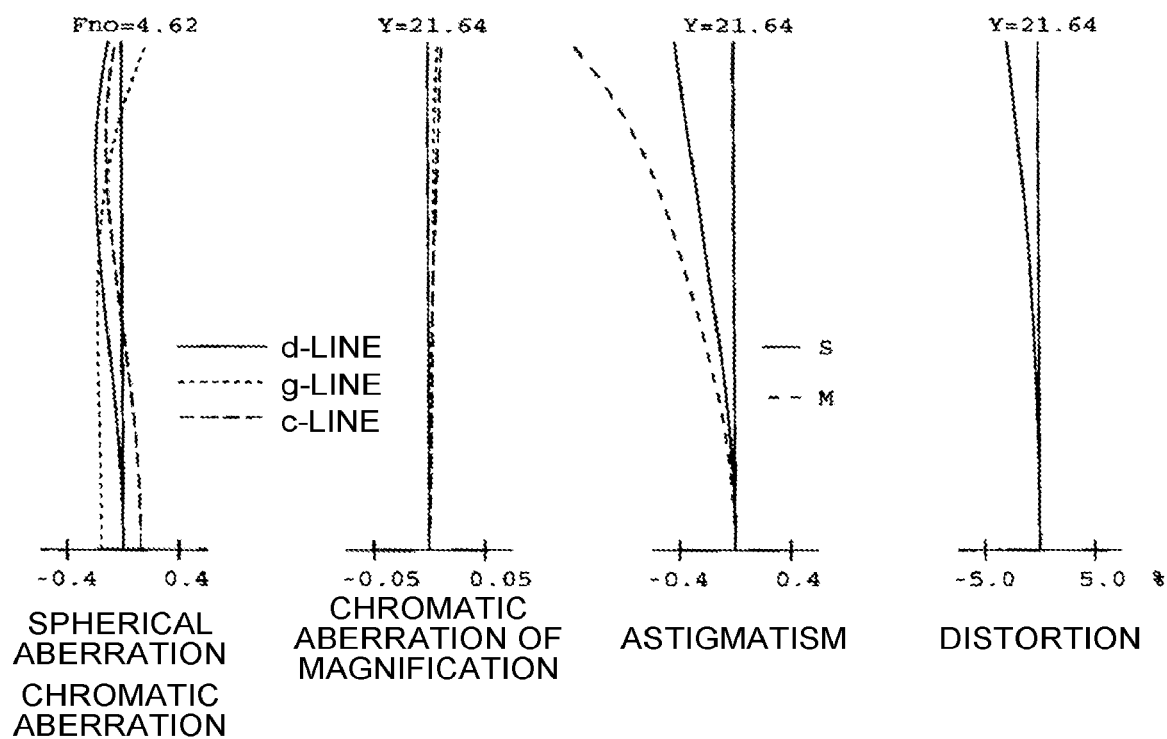
FIG. 13 is a longitudinal aberration diagram when focusing at an object-to-image distance of 0.9 m at the short focal length end of the zoom lens of the numerical example 1.
Figure 14:
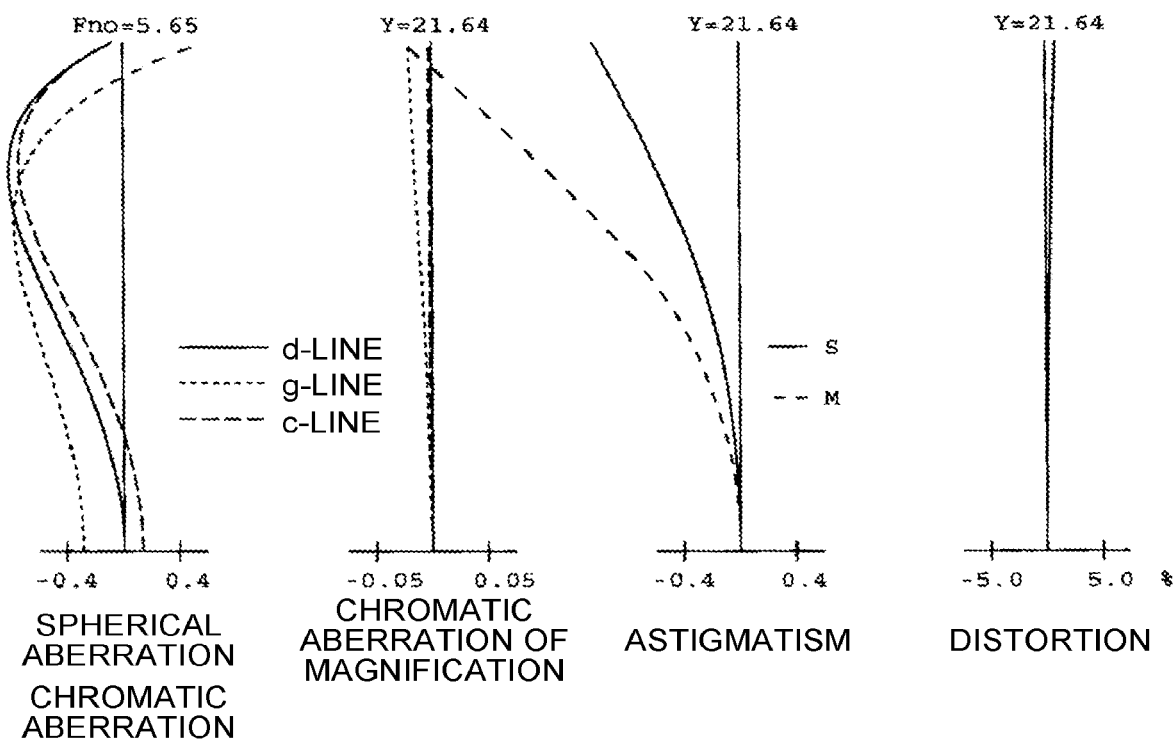
FIG. 14 is a longitudinal aberration diagram when focusing at an object-to-image distance of 0.9 m at the long focal length end of the zoom lens of the numerical example 1.
Figure 15:
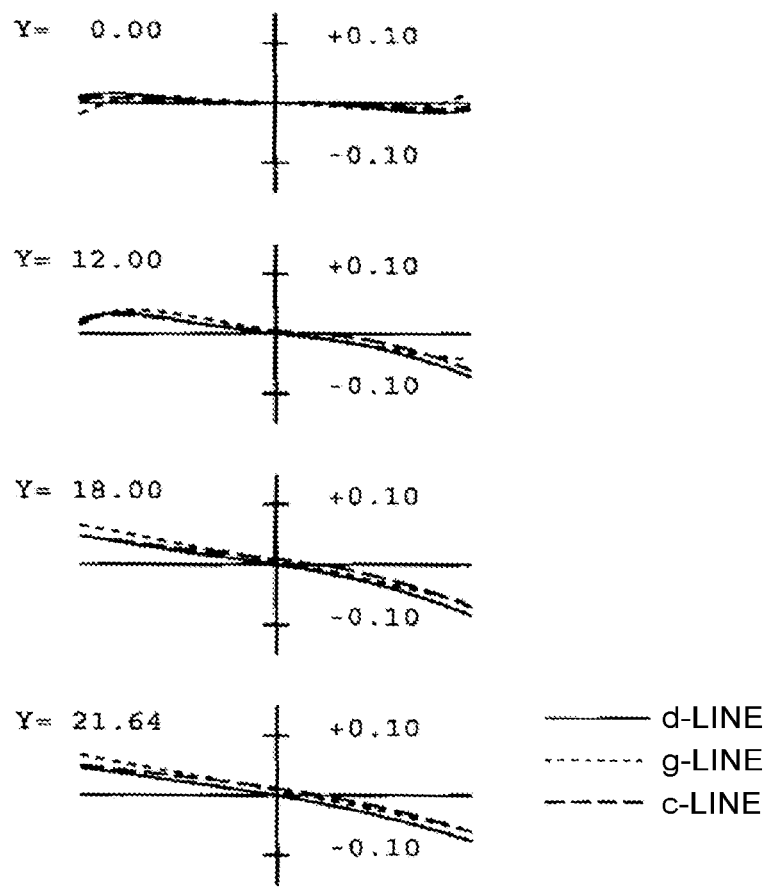
FIG. 15 is a lateral aberration diagram when focusing at an object-to-image distance of 0.9 m at the short focal length end of the zoom lens of the numerical example 1.
Figure 16:
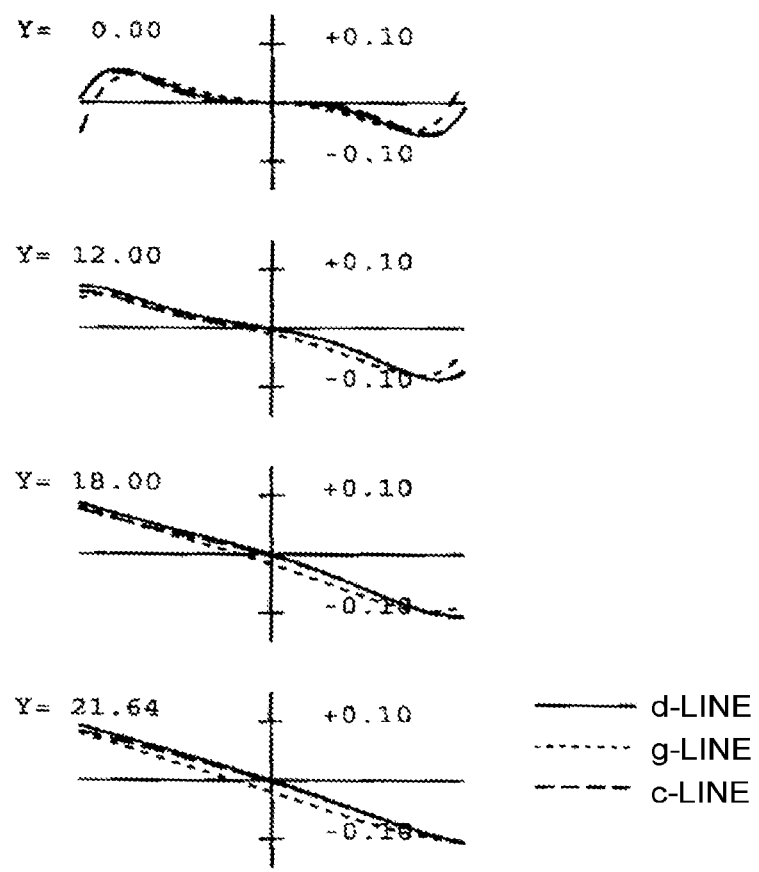
FIG. 16 is a lateral aberration diagram when focusing at an object-to-image distance of 0.9 m at the long focal length end of the zoom lens of the numerical example 1.

FIG. 8 to FIG. 16 and Table 1 to Table 3 show a zoom lens of Numerical Example 1. FIG. 8 is a diagram illustrating a lens structure when focusing on infinity at a short focal length end. FIG. 9, FIG. 10 are longitudinal aberration diagrams when focusing on infinity at the short focal length end and a long focal length end. FIG. 11, FIG. 12 are a lateral aberration diagrams when focusing on infinity at the short focal length end and the long focal length end. FIG. 13, FIG. 14 are longitudinal aberration diagrams when focusing at an object-to-image distance of 0.9 m at the short focal length end and the long focal length end. FIG. 15, FIG. 16 are lateral aberration diagrams when focusing at an object-toimage distance of 0.9 m at the short focal length end and the long focal length end. Table 1 gives surface data, Table 2 gives miscellaneous data, and Table 3 gives data of zoom lens group.

The zoom lens of Numerical Example 1 includes, sequentially from the object side, the first lens group G1 having a positive refractive power, the second lens group G2 having a negative refractive power, the third lens group G3 having a positive refractive power (the lens group GFF having a positive refractive power), the fourth lens group G4 having a negative refractive power (the focusing lens group GF), and the fifth lens group G5 having a positive refractive power. The third lens group G3, the fourth lens group G4, and the fifth lens group G5 constitute the "rear group". Between the second lens group G2 and the third lens group G3 (right before the third lens group G3), the diaphragm SP for light amount adjustment that moves with the third lens group G3 is arranged. Between the fifth lens group G5 and the imaging surface, the plane parallel plate CG is arranged.

The first lens group G1 includes, sequentially from the object side, a positive meniscus lens 11A convex toward the object side, a negative meniscus lens 12A convex toward the object side, and a positive meniscus lens 13A convex toward the object side. The negative meniscus lens 12A and the positive meniscus lens 13A are joined.

The second lens group G2 includes, sequentially from the object side, a double-concave negative lens 21A, a positive meniscus lens 22A convex toward the object side, a double-convex positive lens 23A, a negative meniscus lens 24A convex toward the object side, a positive meniscus lens 25A convex toward the object side, and a negative meniscus lens 26A convex toward the image side. The negative meniscus lens 24A and the positive meniscus lens 25A are joined.

The third lens group G3 includes, sequentially from the object side, a double-convex positive lens 31A, a double-convex positive lens 32A, a negative meniscus lens 33A convex toward the image side, a negative meniscus lens 34A convex toward the object side (the negative lens L2N), a double-convex positive lens 35A (the positive lens L2P), and a double-convex positive lens 36A (positive lens L1P). The double-convex positive lens 32A and the negative meniscus lens 33A are joined. The negative meniscus lens 34A (the negative lens L2N) and the double-convex positive lens 35A (the positive lens L2P) are joined, and constitute the positive lens component L2. The double-convex lens 36A (the positive lens L1P) constitutes the positive lens component L1.

The fourth lens group G4 includes, sequentially from the object side, a positive meniscus lens 41A convex toward the image side (the positive lens GFP), and a double concave negative lens 42A (the negative lens GFN).

The fifth lens group G5 includes, sequentially from the object side, a negative meniscus lens 51A convex toward the image side, a double-convex positive lens 52A, and a negative meniscus lens 53A convex toward the image side. The double-convex positive lens 52A and the negative meniscus lens 53A are joined.

TABLE 1

| Surface number | R | D | N(d) | v (d) |
|---|---|---|---|---|
| [Surface Data] | | | | |
| Zoom ratio | 4.04 | | | |
| 1 | 99.253 | 5.400 | 1.48749 | 70.2 |
| 2 | 1397.368 | 0.200 | | |
| 3 | 100.745 | 1.950 | 1.83400 | 37.2 |
| 4 | 56.982 | 7.700 | 1.49700 | 81.6 |
| 5 | 585.095 | D5 | | |
| 6 | −141.620 | 0.960 | 1.65160 | 58.5 |
| 7 | 32.543 | 1.400 | | |
| 8 | 32.259 | 2.150 | 1.84666 | 23.8 |
| 9 | 50.420 | 3.244 | | |
| 10 | 1510.480 | 2.700 | 1.91082 | 35.2 |
| 11 | −54.493 | 0.200 | | |
| 12 | 417.468 | 1.200 | 1.83400 | 37.2 |
| 13 | 22.174 | 4.090 | 1.76182 | 26.5 |
| 14 | 70.614 | 3.490 | | |
| 15 | −28.047 | 1.200 | 1.83400 | 37.2 |
| 16 | −122.178 | D16 | | |
| 17 | INFINITY | 1.800 | | |
| Diaphragm | | | | |
| 18 | 238.169 | 3.000 | 1.80400 | 46.5 |
| 19 | −63.599 | 0.200 | | |
| 20 | 41.342 | 6.200 | 1.49700 | 81.6 |
| 21 | −41.342 | 1.200 | 2.00100 | 29.1 |
| 22 | −303.653 | 18.383 | | |
| 23 | 84.166 | 1.200 | 2.00100 | 29.1 |
| 24 | 35.196 | 5.700 | 1.48749 | 70.2 |
| 25 | −75.219 | 0.200 | | |
| 26 | 65.603 | 3.200 | 1.91082 | 35.2 |
| 27 | −332.779 | D27 | | |
| 28 | −875.660 | 2.130 | 1.84666 | 23.8 |
| 29 | −54.081 | 1.980 | | |
| 30 | −51.289 | 0.800 | 1.77250 | 49.6 |
| 31 | 32.834 | D31 | | |
| 32 | −27.290 | 1.300 | 1.48749 | 70.2 |
| 33 | −45.252 | 0.200 | | |
| 34 | 56.317 | 5.900 | 1.57501 | 41.5 |
| 35 | −58.451 | 1.200 | 1.90366 | 31.3 |
| 36 | −368.732 | D36 | | |
| 37 | INFINITY | 1.500 | 1.51633 | 64.1 |
| 38 | INFINITY | — | | |

TABLE 2

[Miscellaneous Data]

| | Infinity | | | Close range (Object-to-image distance 0.9 m) | | |
|---|---|---|---|---|---|---|
| | Wide angle | Intermediate | Telephoto | Wide angle | Intermediate | Telephoto |
| FNO. | 4.6 | 5.2 | 5.7 | 4.6 | 5.2 | 5.7 |
| f | 72.08 | 135.00 | 291.32 | 67.32 | 110.85 | 157.13 |
| Magnification | 0.000 | 0.000 | 0.000 | −0.094 | −0.169 | −0.320 |
| W | 17.2 | 9.1 | 4.2 | 17.3 | 9.1 | 4.4 |

TABLE 2-continued

[Miscellaneous Data]

|   | Infinity | | | Close range (Object-to-image distance 0.9 m) | | |
|---|---|---|---|---|---|---|
|   | Wide angle | Intermediate | Telephoto | Wide angle | Intermediate | Telephoto |
| Y | 21.64 | 21.64 | 21.64 | 21.64 | 21.64 | 21.64 |
| BF | 42.56 | 55.31 | 66.55 | 42.56 | 55.31 | 66.55 |
| L | 190.18 | 223.07 | 259.23 | 190.18 | 223.07 | 259.23 |
| D5 | 4.770 | 37.655 | 73.817 | 4.770 | 37.655 | 73.817 |
| D16 | 26.036 | 13.284 | 2.046 | 26.036 | 13.284 | 2.046 |
| D27 | 3.798 | 7.090 | 6.039 | 5.034 | 10.603 | 18.550 |
| D31 | 22.540 | 19.248 | 20.299 | 21.304 | 15.735 | 7.788 |
| D36 | 40.573 | 53.325 | 64.563 | 40.573 | 53.325 | 64.563 |

TABLE 3

[Data of Zoom Lens Group]

| Group | Starting surface | Focal length |
|---|---|---|
| 1 | 1 | 161.89 |
| 2 | 6 | −29.08 |
| 3 | 18 | 35.49 |
| 4 | 28 | −43.86 |
| 5 | 32 | 3569.92 |

Numerical Example 2

Figure 17:
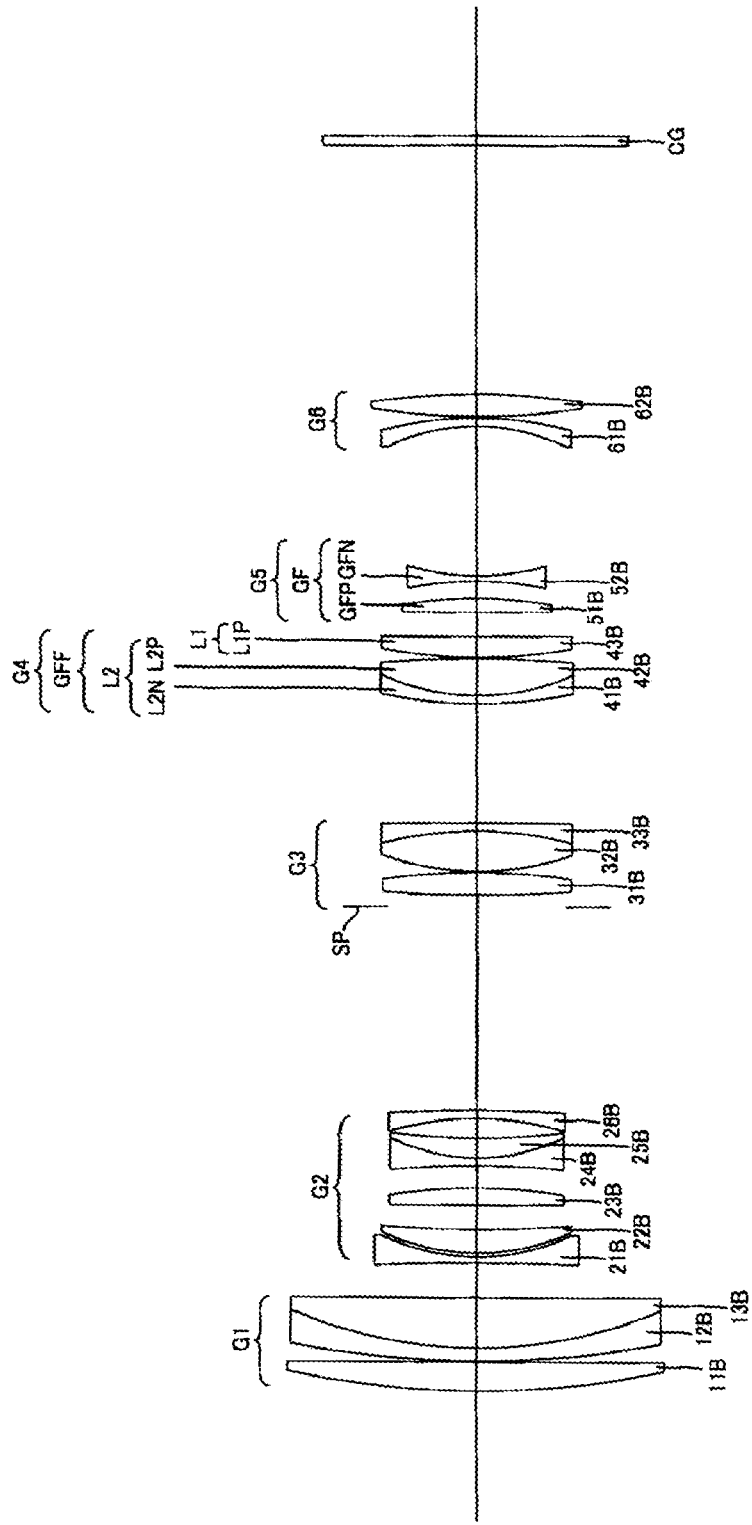
FIG. 17 is a diagram illustrating a lens structure when focusing on infinity at a short focal length end of the zoom lens of the numerical example 2.
Figure 18:
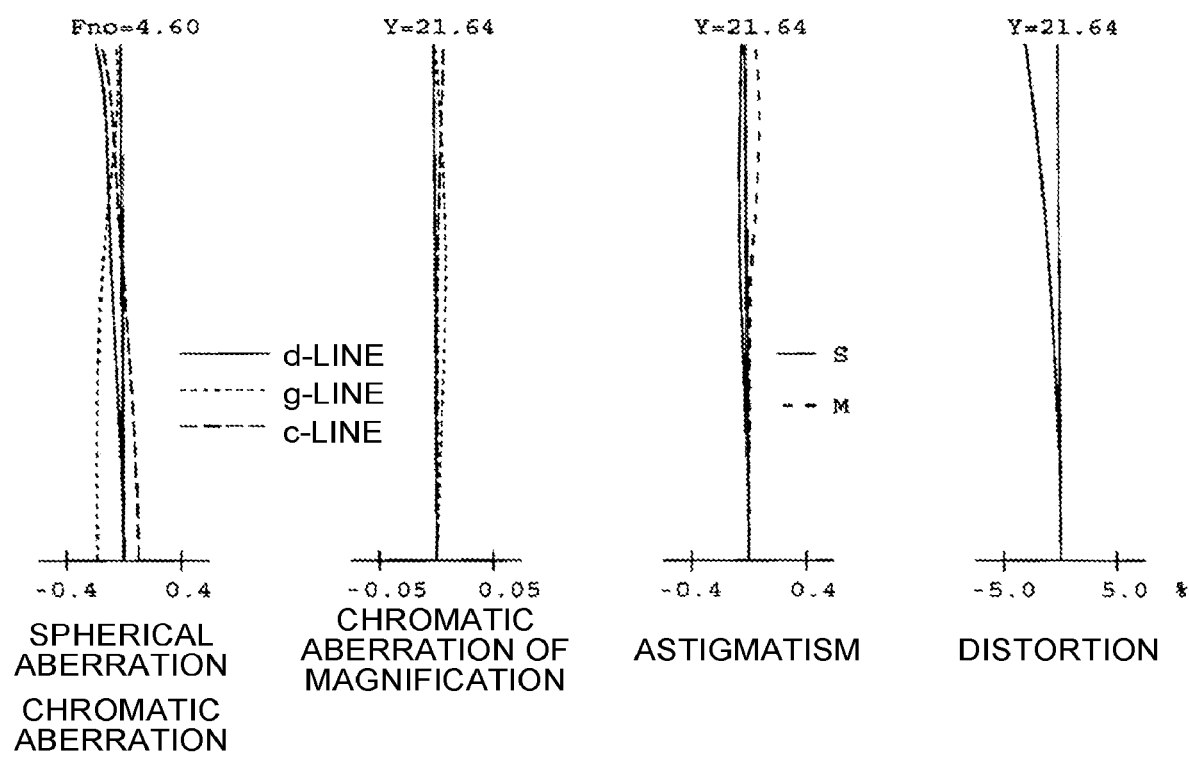
FIG. 18 is a longitudinal aberration diagram when focusing on infinity at the short focal length end of the zoom lens of the numerical example 2.
Figure 19:
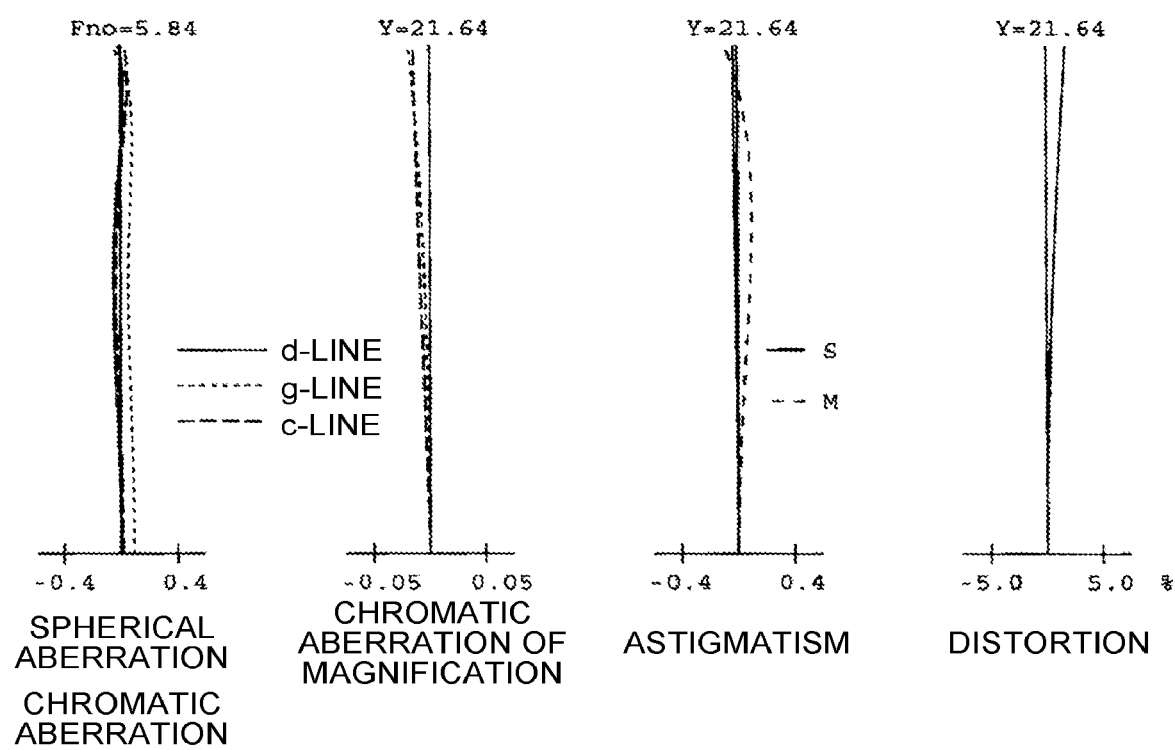
FIG. 19 is a longitudinal aberration diagram when focusing on infinity at a long focal length end of the zoom lens of the numerical example 2.
Figure 20:
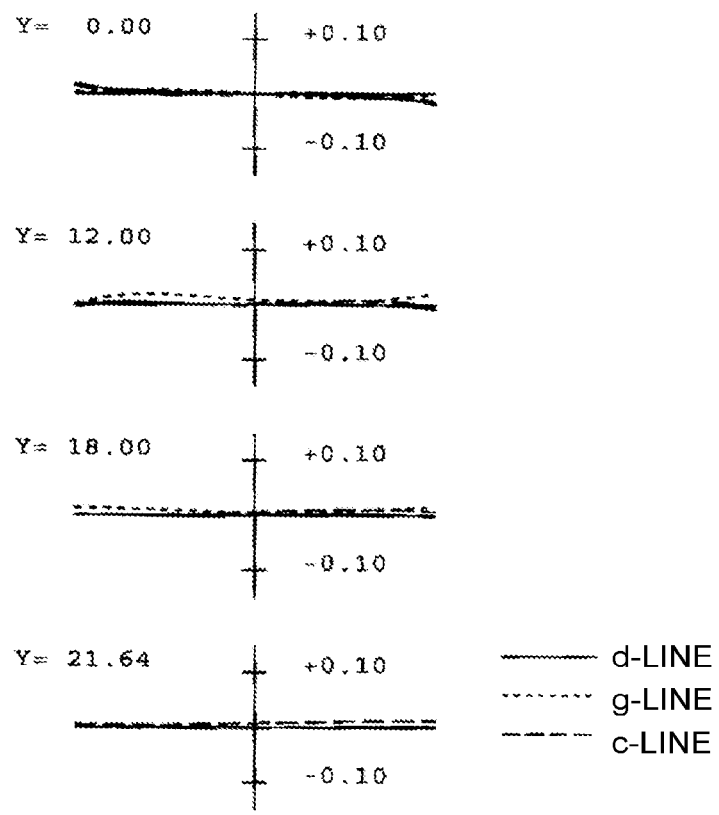
FIG. 20 is a lateral aberration diagram when focusing on infinity at the short focal length end of the zoom lens of the numerical example 2.
Figure 21:
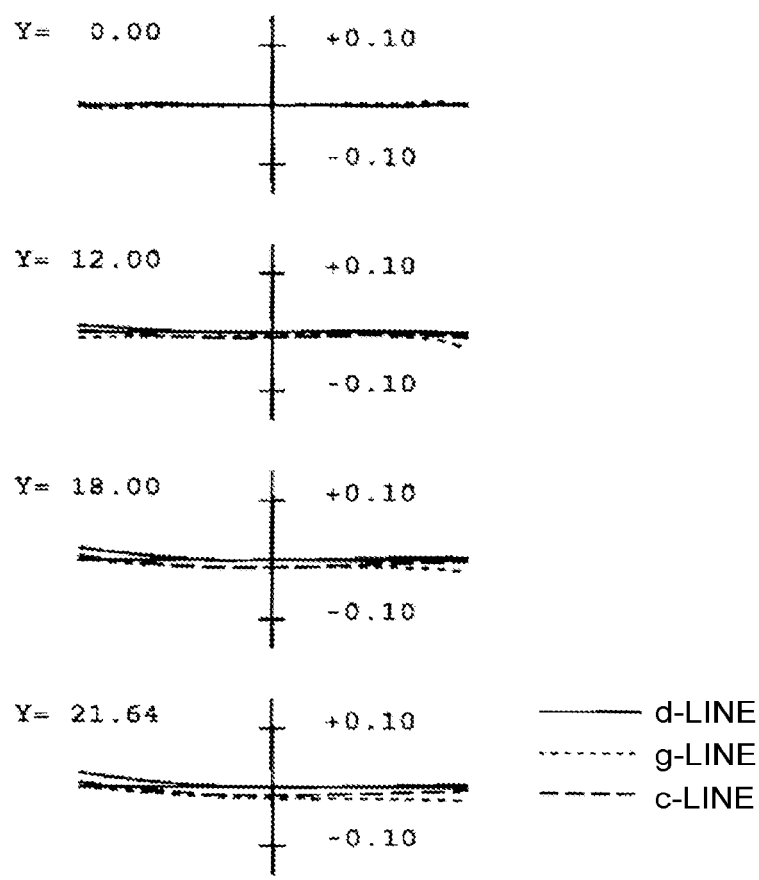
FIG. 21 is a lateral aberration diagram when focusing on infinity at the long focal length end of the zoom lens of the numerical example 2.
Figure 22:
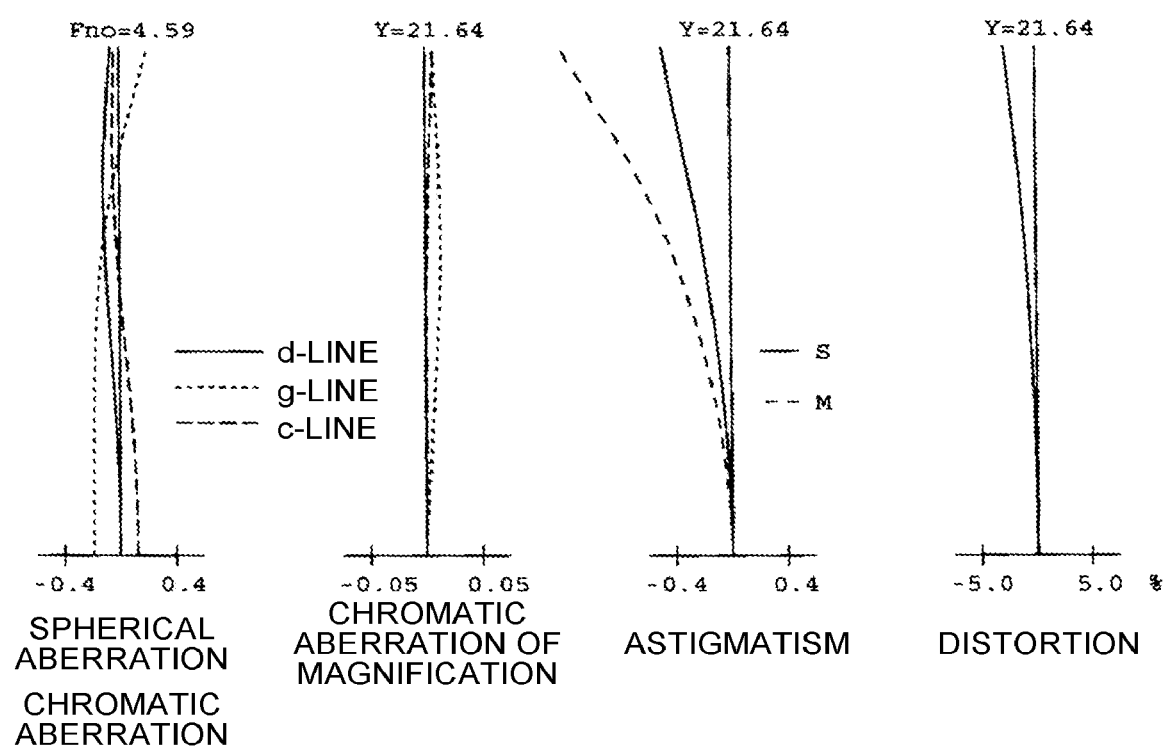
FIG. 22 is a longitudinal aberration diagram when focusing at an object-to-image distance of 0.9 m at the short focal length end of the zoom lens of the numerical example 2.
Figure 23:
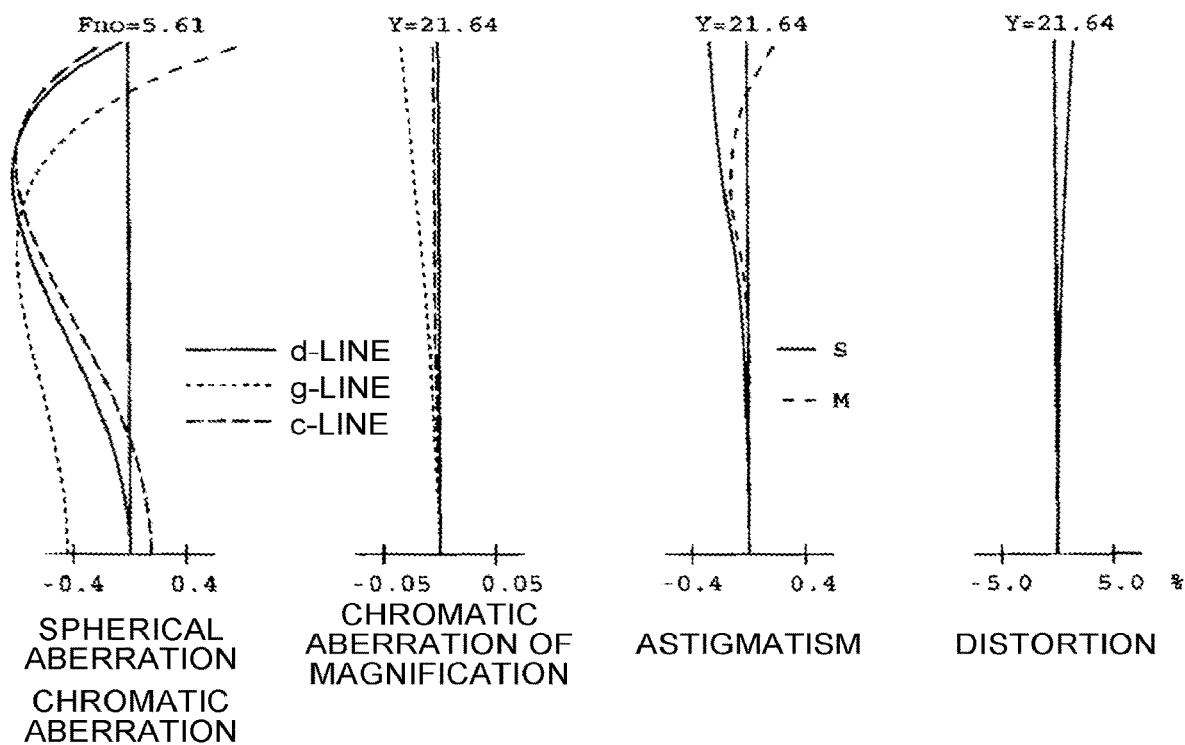
FIG. 23 is a longitudinal aberration diagram when focusing at an object-to-image distance of 0.9 m at the long focal length end of the zoom lens of the numerical example 2.
Figure 24:
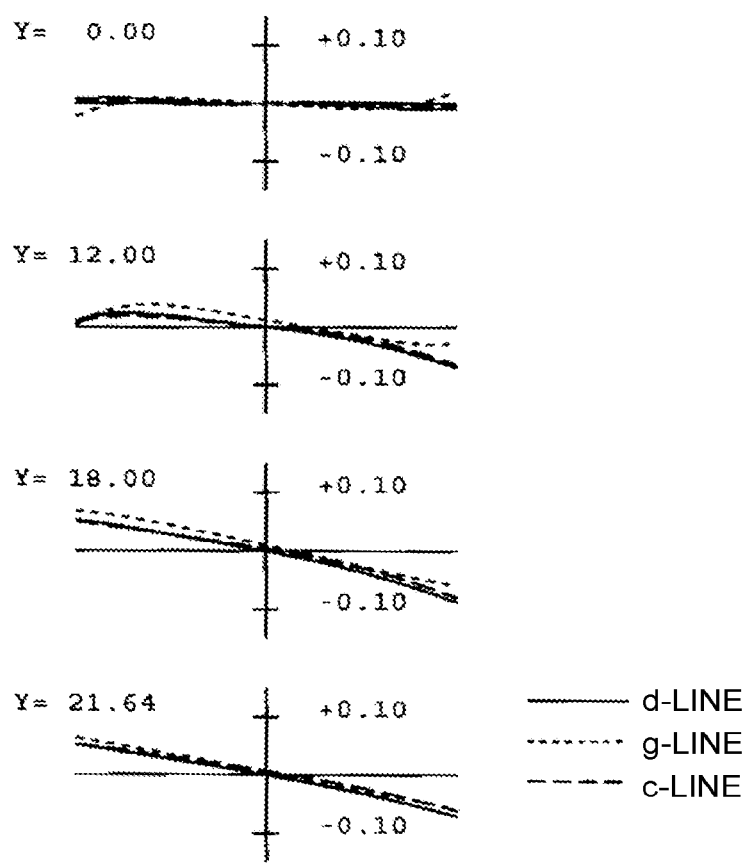
FIG. 24 is a lateral aberration diagram when focusing at an object-to-image distance of 0.9 m at the short focal length end of the zoom lens of the numerical example 2.
Figure 25:
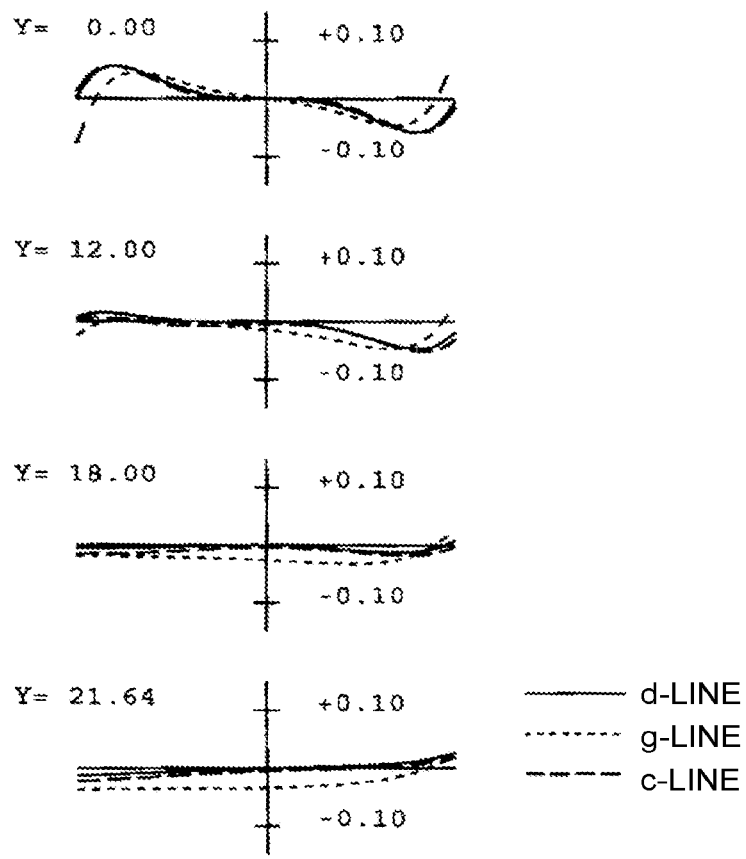
FIG. 25 is a lateral aberration diagram when focusing at an object-to-image distance of 0.9 m at the long focal length end of the zoom lens of the numerical example 2.

FIG. 17 to FIG. 25 and Table 4 to Table 6 show a zoom lens of Numerical Example 2. FIG. 17 is a diagram illustrating a lens structure when focusing on infinity at a short focal length end. FIG. 18, FIG. 19 are longitudinal aberration diagrams when focusing on infinity at the short focal length end and a long focal length end. FIG. 20, FIG. 21 are a lateral aberration diagrams when focusing on infinity at the short focal length end and the long focal length end. FIG. 22, FIG. 23 are longitudinal aberration diagrams when focusing at an object-to-image distance of 0.9 m at the short focal length end and the long focal length end. FIG. 24, FIG. 25 are lateral aberration diagrams when focusing at an object-to-image distance of 0.9 m at the short focal length end and the long focal length end. Table 4 gives surface data, Table 5 gives miscellaneous data, and Table 6 gives data of zoom lens group.

The zoom lens of Numerical Example 2 includes, sequentially from the object side, the first lens group G1 having a positive refractive power, the second lens group G2 having a negative refractive power, the third lens group G3 having a positive refractive power, the fourth lens group G4 having a positive refractive power (the lens group GFF having a positive refractive power), the fifth lens group G5 having a negative refractive power (the focusing lens group GF), and the sixth lens group G6 having a positive refractive power. The third lens group G3, the fourth lens group G4, the fifth lens group G5 and the sixth lens group G6 constitute the "rear group". Between the second lens group G2 and the third lens group G3 (right before the third lens group G3), the diaphragm SP for light amount adjustment that moves with the third lens group G3 is arranged. Between the sixth lens group G6 and the imaging surface, the plane parallel plate CG is arranged.

The first lens group G1 includes, sequentially from the object side, a positive meniscus lens 11B convex toward the object side, a negative meniscus lens 12B convex toward the object side, and a positive meniscus lens 13B convex toward the object side. The negative meniscus lens 12B and the positive meniscus lens 13B are joined.

The second lens group G2 includes, sequentially from the object side, a double-concave negative lens 21B, a positive meniscus lens 22B convex toward the object side, a plano-convex positive lens 23B convex toward the image side, a double-concave negative lens 24B, a positive meniscus lens 25B convex toward the object side, and a negative meniscus lens 26B convex toward the image side. The double-concave negative lens 24B and the positive meniscus lens 25B are joined.

The third lens group G3 includes, sequentially from the object side, a double-convex positive lens 31B, a double-convex positive lens 32B, and a negative meniscus lens 33B convex toward the image side. The double-convex positive lens 32B and the negative meniscus lens 33B are joined.

The fourth lens group G4 includes, sequentially from the object side, a negative meniscus lens 41B convex toward the object side (the negative lens L2N), a double convex positive lens 42B (the positive lens L2P), and a positive meniscus lens 43B convex toward the object side (the positive lens L1P). The negative meniscus lens 41B (the negative lens L2N) and the double-convex positive lens 42B (the positive lens L2P) are joined, and constitutes the lens component L2. The positive meniscus lens 43B (the positive lens L1P) constitutes the positive lens component L1.

The fifth lens group G5 includes, sequentially from the object side, a double-convex positive lens 51B (the positive lens GFP), and a double-concave negative lens 52B (the negative lens GFN).

The sixth lens group G6 includes, sequentially from the object side, a negative meniscus lens 61B convex toward the image side, and a double convex positive lens 62B.

TABLE 4

| Surface number | R | D | N(d) | v (d) |
|---|---|---|---|---|
| [Surface Data] | | | | |
| Zoom ratio | 4.05 | | | |
| 1 | 118.000 | 4.400 | 1.48749 | 70.2 |
| 2 | −21975.397 | 0.200 | | |
| 3 | 130.672 | 1.950 | 1.80440 | 39.6 |
| 4 | 61.654 | 7.700 | 1.53775 | 74.7 |
| 5 | 17419.442 | D5 | | |
| 6 | −305.065 | 0.960 | 1.76200 | 40.1 |
| 7 | 29.167 | 0.569 | | |

TABLE 4-continued

| Surface number | R | D | N(d) | v (d) |
|---|---|---|---|---|
| 8 | 29.456 | 3.600 | 1.65412 | 39.7 |
| 9 | 161.556 | 3.599 | | |
| 10 | INFINITY | 2.700 | 1.59270 | 35.3 |
| 11 | −67.668 | 3.405 | | |
| 12 | −109.802 | 1.200 | 1.77250 | 49.6 |
| 13 | 26.122 | 3.000 | 1.80518 | 25.4 |
| 14 | 89.182 | 2.990 | | |
| 15 | −40.185 | 1.200 | 1.59522 | 67.7 |
| 16 | −210.247 | D16 | | |
| 17 Diaphragm | INFINITY | 1.800 | | |
| 18 | 156.117 | 3.500 | 1.80400 | 46.5 |
| 19 | −87.190 | 0.200 | | |
| 20 | 38.380 | 6.200 | 1.49700 | 81.6 |
| 21 | −49.698 | 1.200 | 2.00100 | 29.1 |
| 22 | −1480.388 | D22 | | |
| 23 | 62.249 | 1.200 | 2.00100 | 29.1 |
| 24 | 30.004 | 5.700 | 1.53775 | 74.7 |
| 25 | −146.839 | 0.200 | | |
| 26 | 66.574 | 3.200 | 1.95375 | 32.3 |
| 27 | 1994.267 | D27 | | |
| 28 | 960.353 | 2.130 | 1.84666 | 23.8 |
| 29 | −54.671 | 2.677 | | |
| 30 | −45.887 | 0.800 | 1.75700 | 47.8 |
| 31 | 31.355 | D31 | | |
| 32 | −26.907 | 1.300 | 1.83400 | 37.2 |
| 33 | −47.676 | 0.200 | | |
| 34 | 87.528 | 3.400 | 1.58913 | 61.2 |
| 35 | −95.902 | D35 | | |
| 36 | INFINITY | 1.500 | 1.51633 | 64.1 |
| 37 | INFINITY | — | | |

TABLE 5

[Miscellaneous Data]

| | Infinity | | | Close range (Object-to-image distance 0.9 m) | | |
|---|---|---|---|---|---|---|
| | Wide angle | Intermediate | Telephoto | Wide angle | Intermediate | Telephoto |
| FNO. | 4.6 | 5.1 | 5.8 | 4.6 | 5.1 | 5.6 |
| f | 71.90 | 135.00 | 291.36 | 67.02 | 110.68 | 154.21 |
| Magnification | 0.000 | 0.000 | 0.000 | −0.094 | −0.165 | −0.314 |
| W | 17.2 | 9.0 | 4.2 | 17.3 | 9.2 | 4.4 |
| Y | 21.64 | 21.64 | 21.64 | 21.64 | 21.64 | 21.64 |
| BF | 40.31 | 51.04 | 63.67 | 40.31 | 51.04 | 63.67 |
| L | 193.32 | 231.85 | 262.35 | 193.32 | 231.85 | 262.35 |
| D5 | 5.299 | 43.825 | 74.329 | 5.299 | 43.825 | 74.329 |
| D16 | 31.284 | 19.386 | 2.497 | 31.284 | 19.386 | 2.497 |
| D22 | 18.383 | 19.553 | 23.815 | 18.383 | 19.553 | 23.815 |
| D27 | 3.798 | 4.862 | 6.039 | 5.176 | 8.702 | 20.257 |
| D31 | 23.069 | 22.005 | 20.828 | 21.692 | 18.165 | 6.610 |
| D35 | 38.321 | 49.050 | 61.676 | 38.321 | 49.050 | 61.676 |

TABLE 6

[Data of Zoom Lens Group]

| Group | Starting surface | Focal length |
|---|---|---|
| 1 | 1 | 167.26 |
| 2 | 6 | −32.51 |
| 3 | 18 | 53.27 |
| 4 | 23 | 55.30 |
| 5 | 28 | −44.52 |
| 6 | 32 | 6517.22 |

Numerical Example 3

Figure 26:
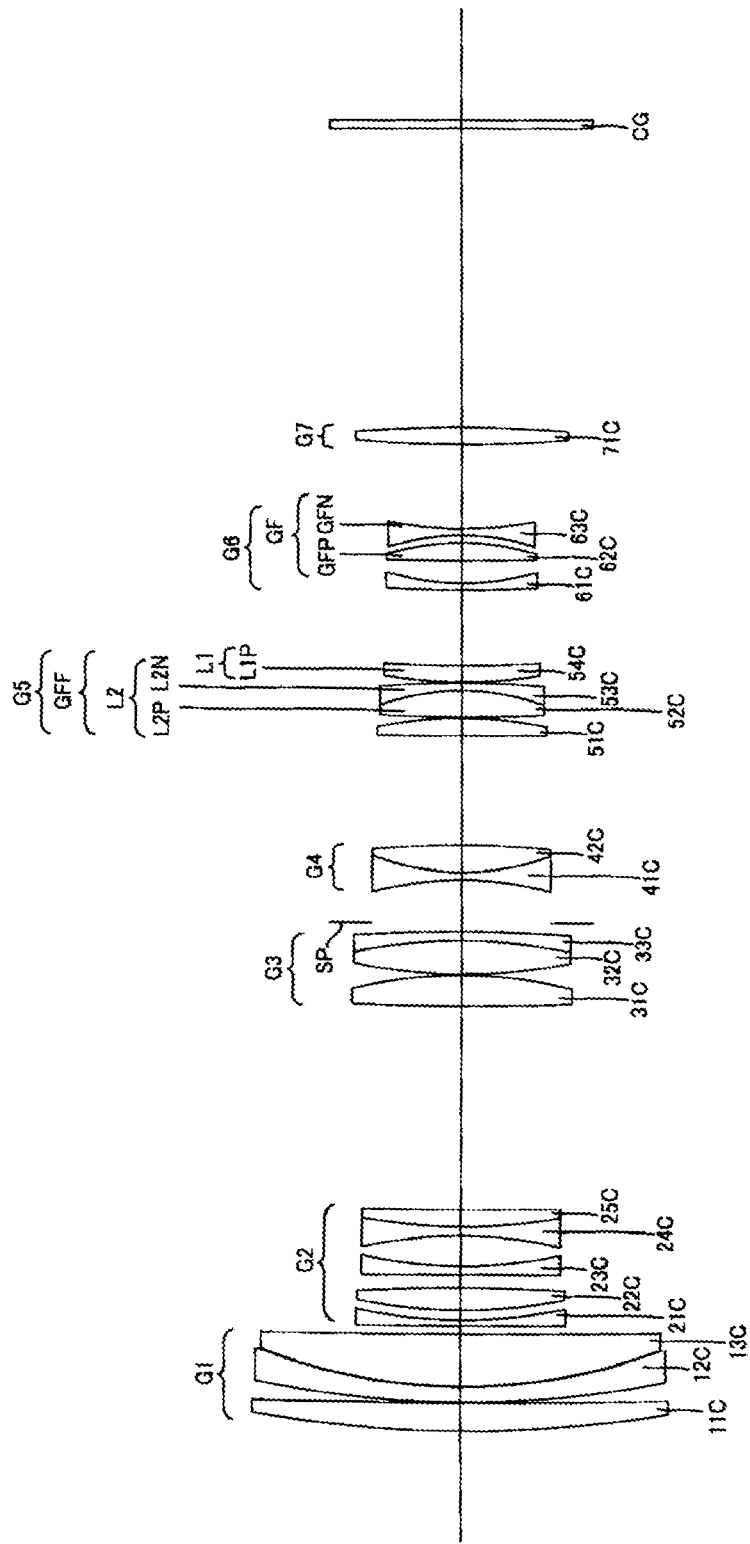
FIG. 26 is a diagram illustrating a lens structure when focusing on infinity at a short focal length end of the zoom lens of the numerical example 3.
Figure 27:
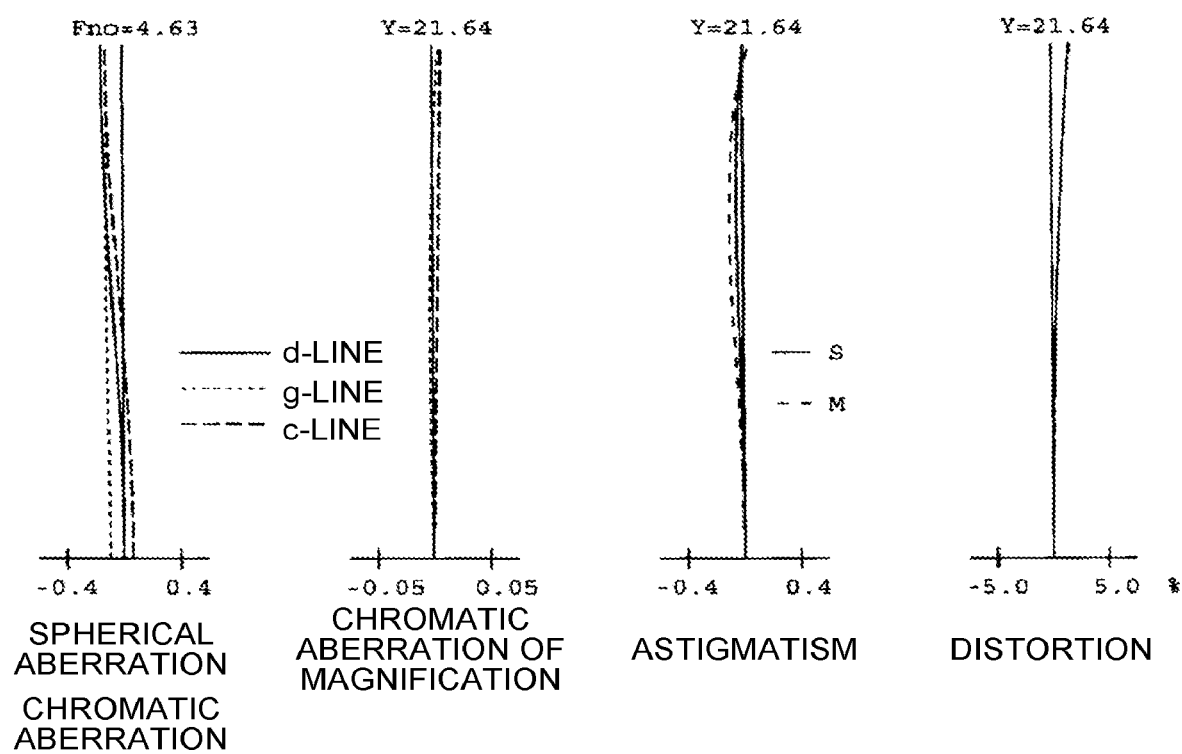
FIG. 27 is a longitudinal aberration diagram when focusing on infinity at the short focal length end of the zoom lens of the numerical example 3.
Figure 28:
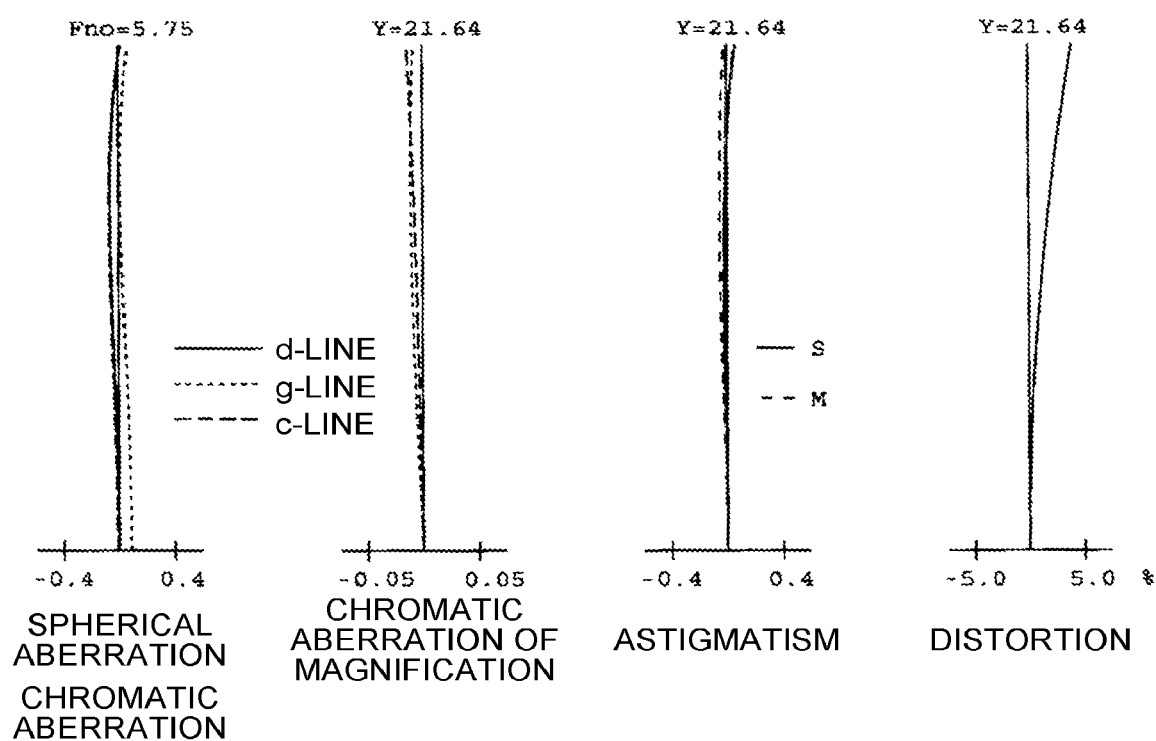
FIG. 28 is a longitudinal aberration diagram when focusing on infinity at the long focal length end of the zoom lens of the numerical example 3.
Figure 29:
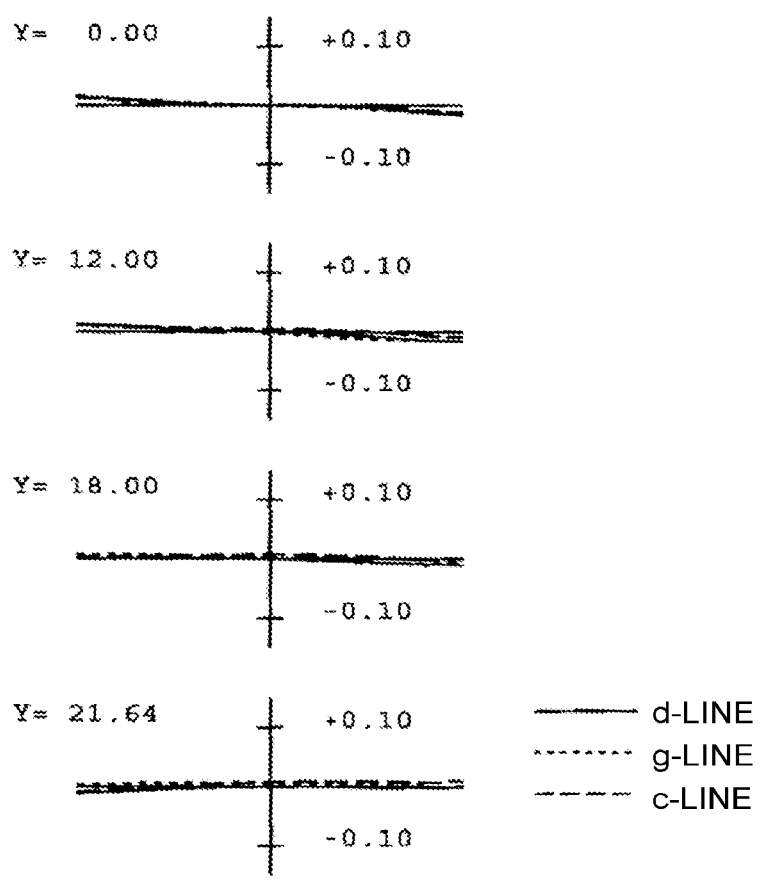
FIG. 29 is a lateral aberration diagram when focusing on infinity at the short focal length end of the zoom lens of the numerical example 3.
Figure 30:
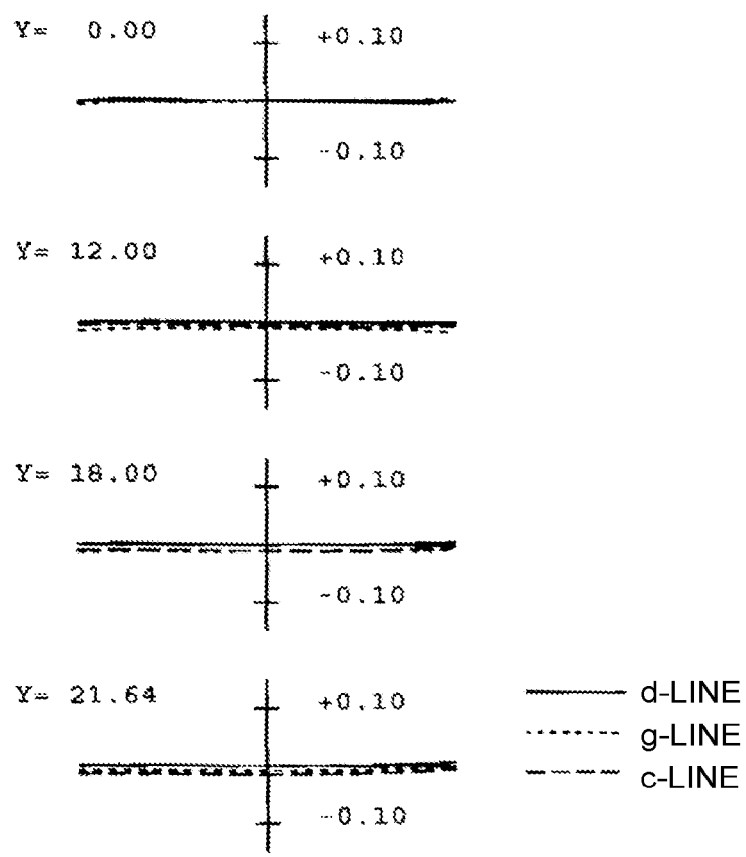
FIG. 30 is a lateral aberration diagram when focusing on infinity at the long focal length end of the zoom lens of the numerical example 3.
Figure 31:
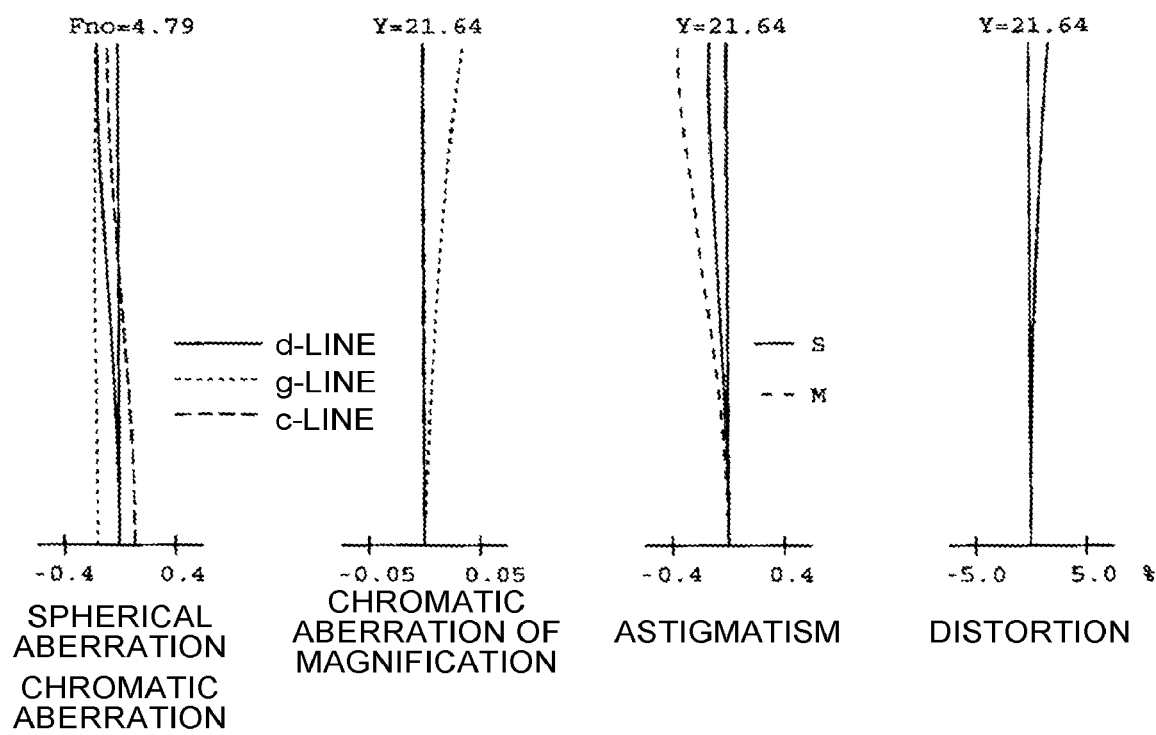
FIG. 31 is a longitudinal aberration diagram when focusing at an object-to-image distance of 0.9 m at the short focal length end of the zoom lens of the numerical example 3.
Figure 32:
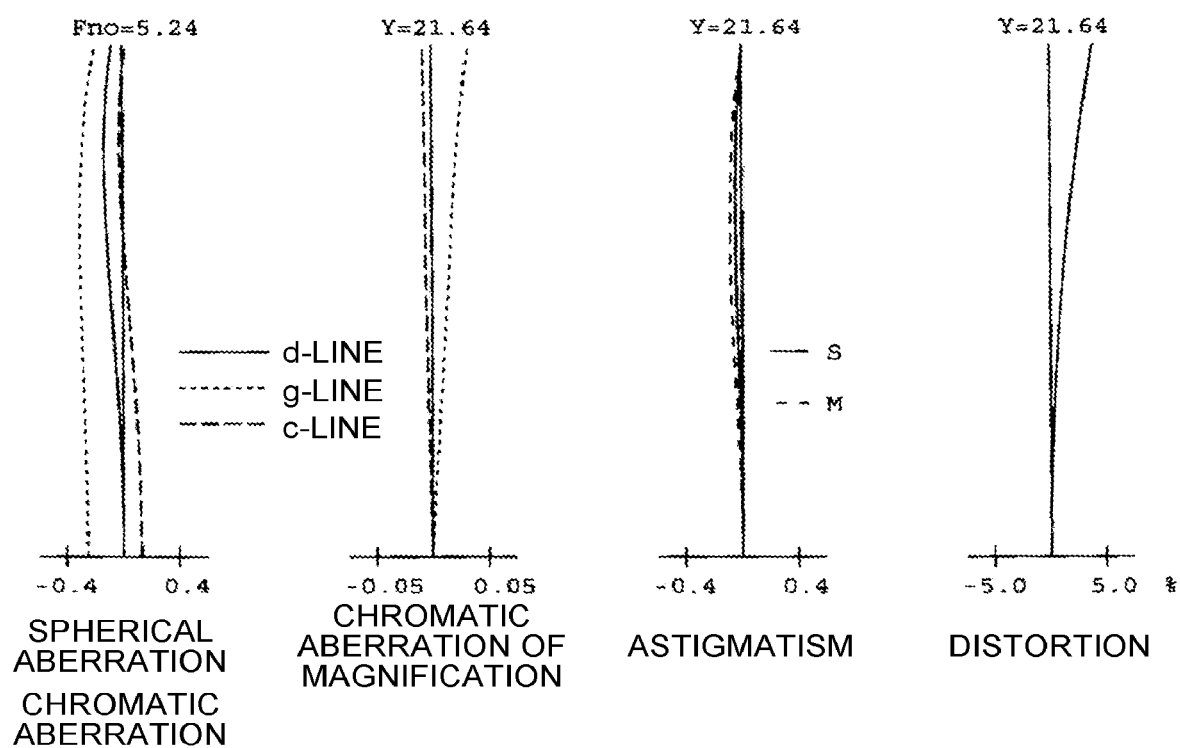
FIG. 32 is a longitudinal aberration diagram when focusing at an object-to-image distance of 0.9 m at the long focal length end of the zoom lens of the numerical example 3.
Figure 33:
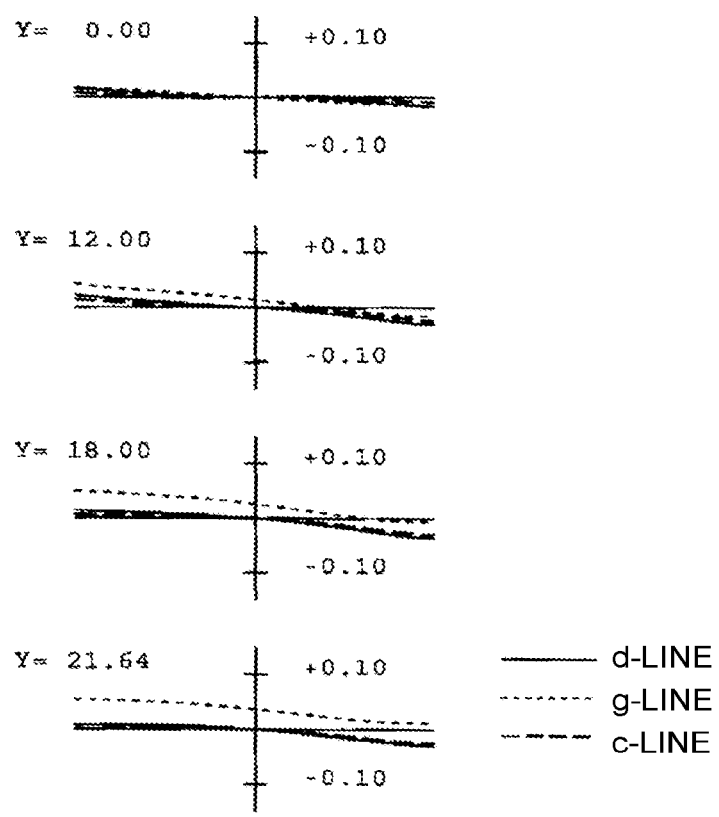
FIG. 33 is a lateral aberration diagram when focusing at an object-to-image distance of 0.9 m at the short focal length end of the zoom lens of the numerical example 3.
Figure 34:
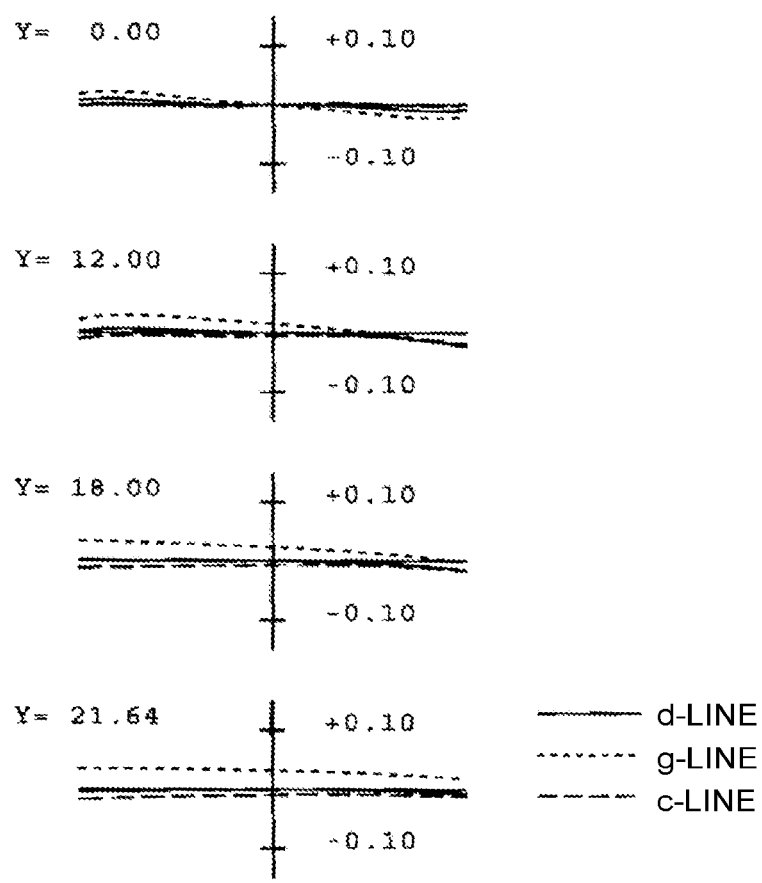
FIG. 34 is a lateral aberration diagram when focusing at an object-to-image distance of 0.9 m at the long focal length end of the zoom lens of the numerical example 3.

FIG. 26 to FIG. 34 and Table 7 to Table 9 show a zoom lens of Numerical Example 3. FIG. 26 is a diagram illustrating a lens structure when focusing on infinity at a short focal length end. FIG. 27, FIG. 28 are longitudinal aberration diagrams when focusing on infinity at the short focal length end and a long focal length end. FIG. 29, FIG. 30 are a lateral aberration diagrams when focusing on infinity at the short focal length end and the long focal length end. FIG. 31, FIG. 32 are longitudinal aberration diagrams when focusing at an object-to-image distance of 0.9 m at the short focal length end and the long focal length end. FIG. 33, FIG. 34 are lateral aberration diagrams when focusing at an object-to-image distance of 0.9 m at the short focal length end and the long focal length end. Table 7 gives surface data, Table 8 gives miscellaneous data, and Table 9 gives data of zoom lens group.

The zoom lens of Numerical Example 3 includes, sequentially from the object side, the first lens group G1 having a positive refractive power, the second lens group G2 having a negative refractive power, the third lens group G3 having a positive refractive power, the fourth lens group G4 having a negative refractive power, the fifth lens group G5 having a positive refractive power (the lens group GFF having a positive refractive power), the sixth lens group G6 having a negative refractive power (the focusing lens group GF), and the seventh lens group G7 having a positive refractive power. The third lens group G3, the fourth lens group G4, the fifth lens group G5, the sixth lens group G6, and the seventh lens group G7 constitute the "rear group". Between the third lens group G3 and the fourth lens group G4, the diaphragm SP for light amount adjustment that moves independently from the respective lens groups is arranged. Between the seventh lens group G7 and the imaging surface, the plane parallel plate CG is arranged.

The first lens group G1 includes, sequentially from the object side, a positive meniscus lens 11C convex toward the object side, a negative meniscus lens 12C convex toward the object side, and a positive meniscus lens 13C convex toward the object side.

The second lens group G2 includes, sequentially from the object side, a negative meniscus lens 21C convex toward the object side, a double-convex positive lens 22C, a double-concave negative lens 23C, a double-concave negative lens 24C, and a positive meniscus lens 25C. The double-concave negative lens 24C and the positive meniscus lens 25C are joined.

The third lens group G3 includes, sequentially from the object side, a double-convex positive lens 31C, a double-convex positive lens 32C, and a negative meniscus lens 33C convex toward the image side. The double-convex positive lens 32C and the negative meniscus lens 33C are joined.

The fourth lens group G4 includes a double-concave negative lens 41C and a double-convex positive lens 42C positioned sequentially from the object side.

The fifth lens group G5 includes, sequentially from the object side, a double-convex positive lens 51C, a double-convex positive lens 52C (the positive lens L2P), a negative meniscus lens 53C convex toward the image side (the negative lens L2N), and a positive meniscus lens 54C convex toward the object side (the positive lens L1P). The double-convex positive lens 52C (the positive lens L2P) and the negative meniscus lens 53C (the negative lens L2N) are joined, and constitute the negative lens component L2. The positive meniscus lens 54C (the positive lens L1P) constitutes the positive lens component L1.

The sixth lens group G6 includes, sequentially from the object side, a negative meniscus lens 61C convex toward the object side, and a double convex positive lens 62C (the positive lens GFP), and a double-concave negative lens 63C (the negative lens GFN).

The seventh lens group G7 includes a double-convex positive lens 71C.

TABLE 7

[Surface Data]
Zoom ratio 3.77

| Surface number | R | D | N(d) | v(d) |
|---|---|---|---|---|
| 1 | 184.448 | 5.000 | 1.62299 | 58.2 |
| 2 | 1215.181 | 0.150 | | |
| 3 | 155.193 | 2.700 | 1.65412 | 39.7 |

TABLE 7-continued

[Surface Data]
Zoom ratio 3.77

| Surface number | R | D | N(d) | v(d) |
|---|---|---|---|---|
| 4 | 83.735 | 0.110 | | |
| 5 | 83.943 | 9.280 | 1.43875 | 95.0 |
| 6 | 1729.280 | D6 | | |
| 7 | 1702.867 | 1.000 | 1.78590 | 44.2 |
| 8 | 72.810 | 1.800 | | |
| 9 | 80.046 | 4.000 | 1.76385 | 48.5 |
| 10 | −249.575 | 2.220 | | |
| 11 | −2870.919 | 1.550 | 1.65160 | 58.5 |
| 12 | 66.949 | 5.400 | | |
| 13 | −67.143 | 1.550 | 1.61800 | 63.4 |
| 14 | 83.339 | 3.000 | 1.85478 | 24.8 |
| 15 | 674.893 | D15 | | |
| 16 | 416.366 | 5.440 | 1.43387 | 95.2 |
| 17 | −67.052 | 0.180 | | |
| 18 | 79.949 | 5.970 | 1.49700 | 81.6 |
| 19 | −76.526 | 1.600 | 1.90366 | 31.3 |
| 20 | −262.745 | D20 | | |
| 21 Diaphragm | INFINITY | D21 | | |
| 22 | −50.524 | 1.400 | 1.59270 | 35.3 |
| 23 | 36.748 | 4.870 | 1.74077 | 27.8 |
| 24 | −144.274 | D24 | | |
| 25 | 4801.275 | 3.220 | 1.59551 | 39.2 |
| 26 | −59.605 | 0.160 | | |
| 27 | 215.865 | 4.740 | 1.49700 | 81.6 |
| 28 | −35.438 | 1.400 | 1.84666 | 23.8 |
| 29 | −137.919 | 0.150 | | |
| 30 | 72.012 | 2.930 | 1.90043 | 37.4 |
| 31 | 220.196 | D31 | | |
| 32 | 176.254 | 1.200 | 1.80400 | 46.5 |
| 33 | 39.636 | 4.080 | | |
| 34 | 337.790 | 3.160 | 1.85025 | 30.0 |
| 35 | −40.505 | 1.330 | | |
| 36 | −37.191 | 1.200 | 1.75500 | 52.3 |
| 37 | 55.973 | D37 | | |
| 38 | 172.690 | 3.110 | 1.64000 | 60.1 |
| 39 | −205.474 | D39 | | |
| 40 | INFINITY | 1.500 | 1.51633 | 64.1 |
| 41 | INFINITY | — | | |

TABLE 8

[Miscellaneous Data]

| | Infinity | | | Close range (Object-to-image distance 0.9 m) | | |
|---|---|---|---|---|---|---|
| | Wide angle | Intermediate | Telephoto | Wide angle | Intermediate | Telephoto |
| FNO. | 4.6 | 4.6 | 5.7 | 4.8 | 5.0 | 5.2 |
| f | 103.00 | 200.00 | 388.00 | 91.35 | 141.08 | 170.29 |
| Magnification | 0.000 | 0.000 | 0.000 | −0.140 | −0.236 | −0.335 |
| W | 11.7 | 5.9 | 3.1 | 11.7 | 5.9 | 3.5 |
| Y | 21.64 | 21.64 | 21.64 | 21.64 | 21.64 | 21.64 |
| BF | 55.31 | 55.31 | 55.31 | 55.31 | 55.31 | 55.31 |
| L | 234.40 | 300.06 | 340.41 | 234.40 | 300.06 | 340.41 |
| D6 | 1.500 | 67.152 | 107.506 | 1.500 | 67.152 | 107.506 |
| D15 | 36.337 | 18.658 | 1.400 | 36.337 | 18.658 | 1.400 |
| D20 | 1.610 | 22.809 | 11.000 | 1.610 | 22.809 | 11.000 |
| D21 | 7.600 | 9.497 | 48.216 | 4.713 | 8.620 | 40.077 |
| D24 | 19.569 | 14.153 | 4.500 | 22.456 | 15.030 | 12.640 |
| D31 | 13.466 | 10.673 | 1.350 | 16.295 | 19.536 | 25.766 |
| D37 | 15.115 | 17.908 | 27.231 | 12.286 | 9.046 | 2.815 |
| D39 | 53.317 | 53.318 | 53.318 | 53.317 | 53.318 | 53.318 |

TABLE 9

[Data of Zoom Lens Group]

| Group | Starting surface | Focal length |
|---|---|---|
| 1 | 1 | 234.09 |
| 2 | 7 | −64.07 |
| 3 | 16 | 84.15 |
| 4 | 22 | −423.21 |
| 5 | 25 | 58.85 |
| 6 | 32 | −37.70 |
| 7 | 38 | 147.08 |

Numerical Example 4

Figure 35:
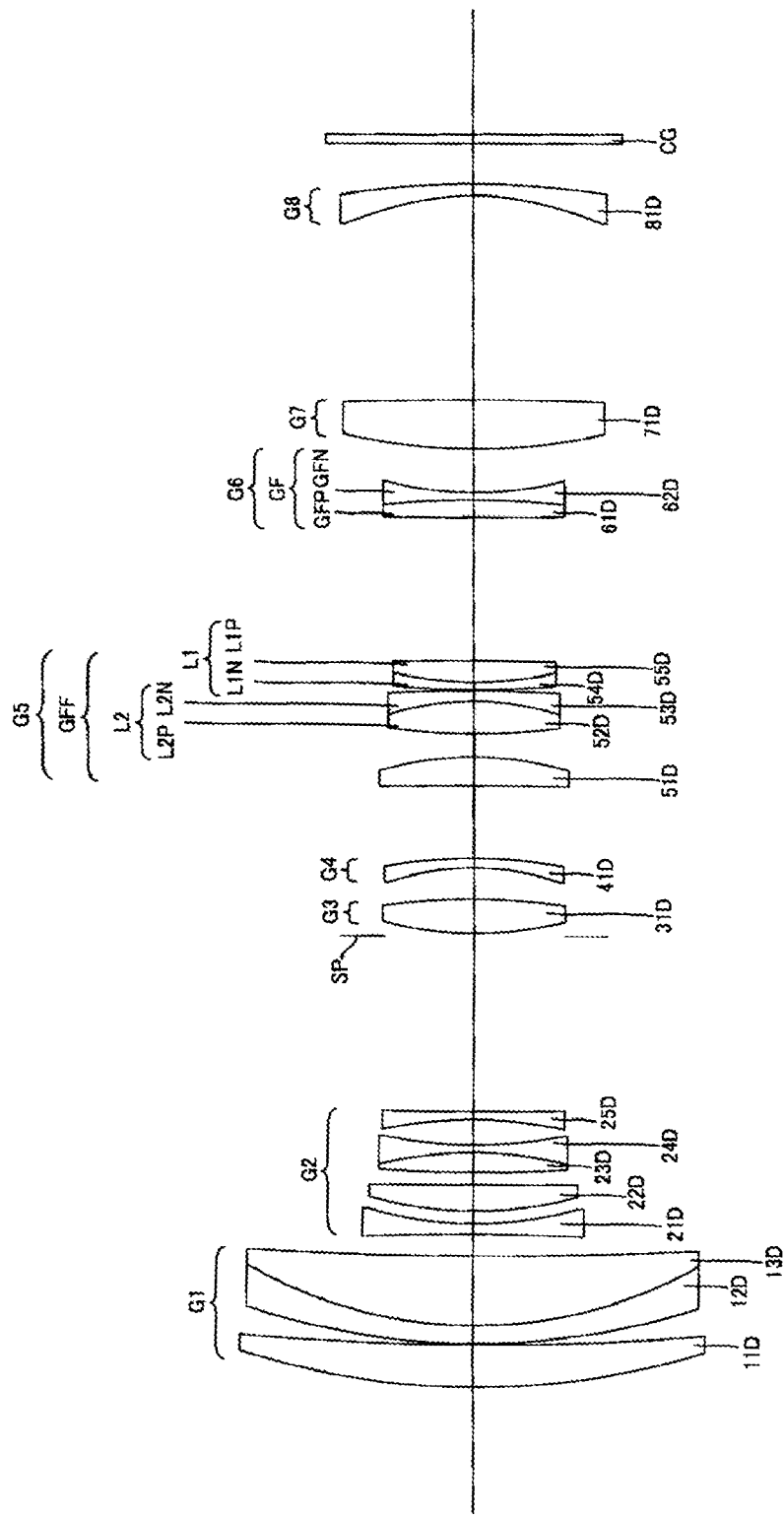
FIG. 35 is a diagram illustrating a lens structure when focusing on infinity at a short focal length end of the zoom lens of the numerical example 4.
Figure 36:
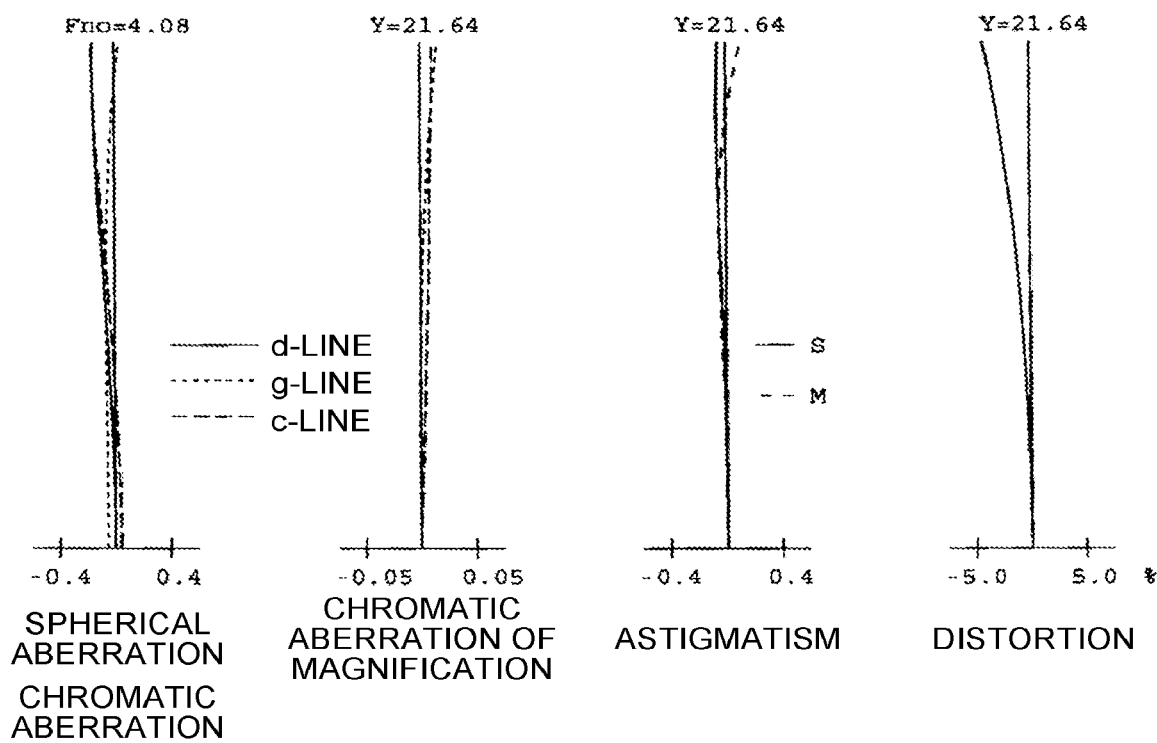
FIG. 36 is a longitudinal aberration diagram when focusing on infinity at the short focal length end of the zoom lens of the numerical example 4.
Figure 37:
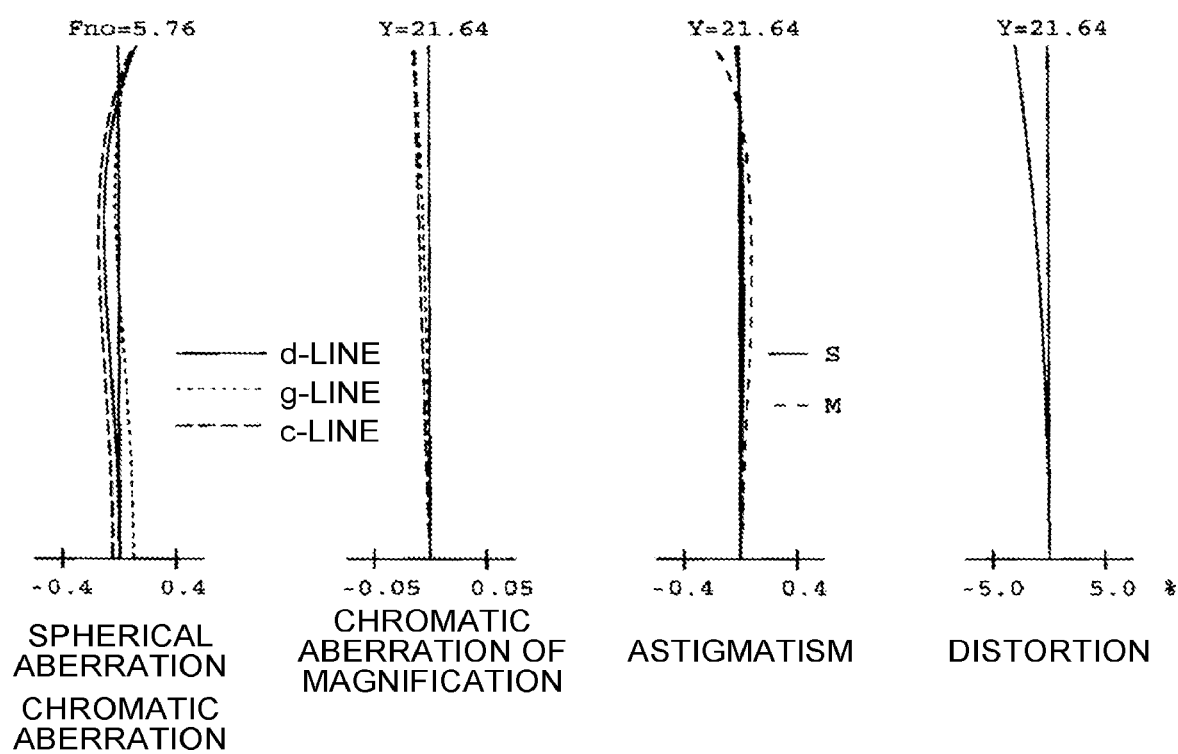
FIG. 37 is a longitudinal aberration diagram when focusing on infinity at the long focal length end of the zoom lens of the numerical example 4.
Figure 38:
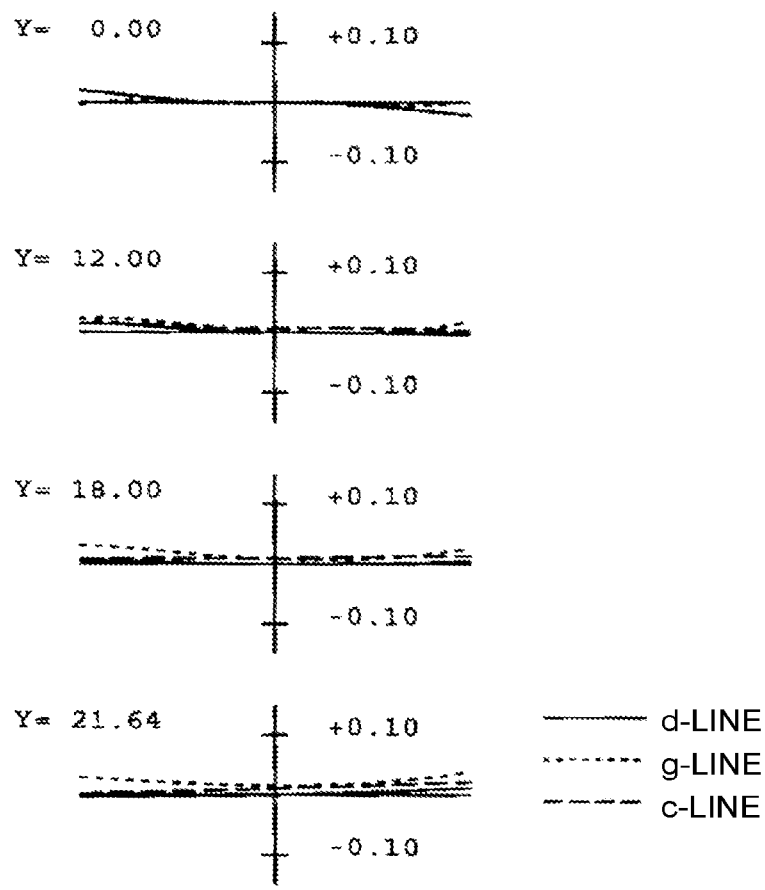
FIG. 38 is a lateral aberration diagram when focusing on infinity at the short focal length end of the zoom lens of the numerical example 4.
Figure 39:
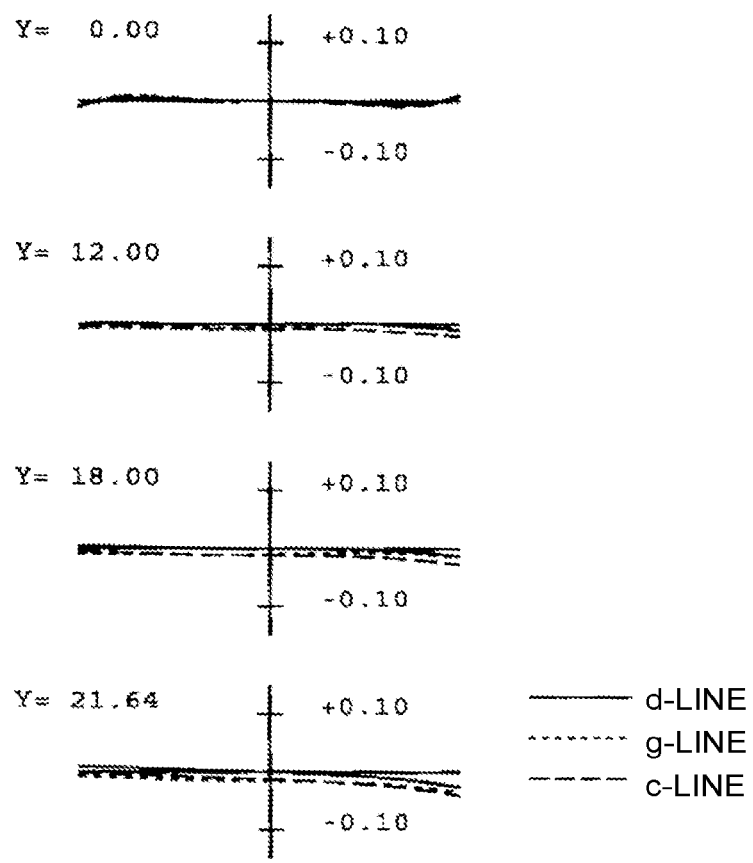
FIG. 39 is a lateral aberration diagram when focusing on infinity at the long focal length end of the zoom lens of the numerical example 4.
Figure 40:
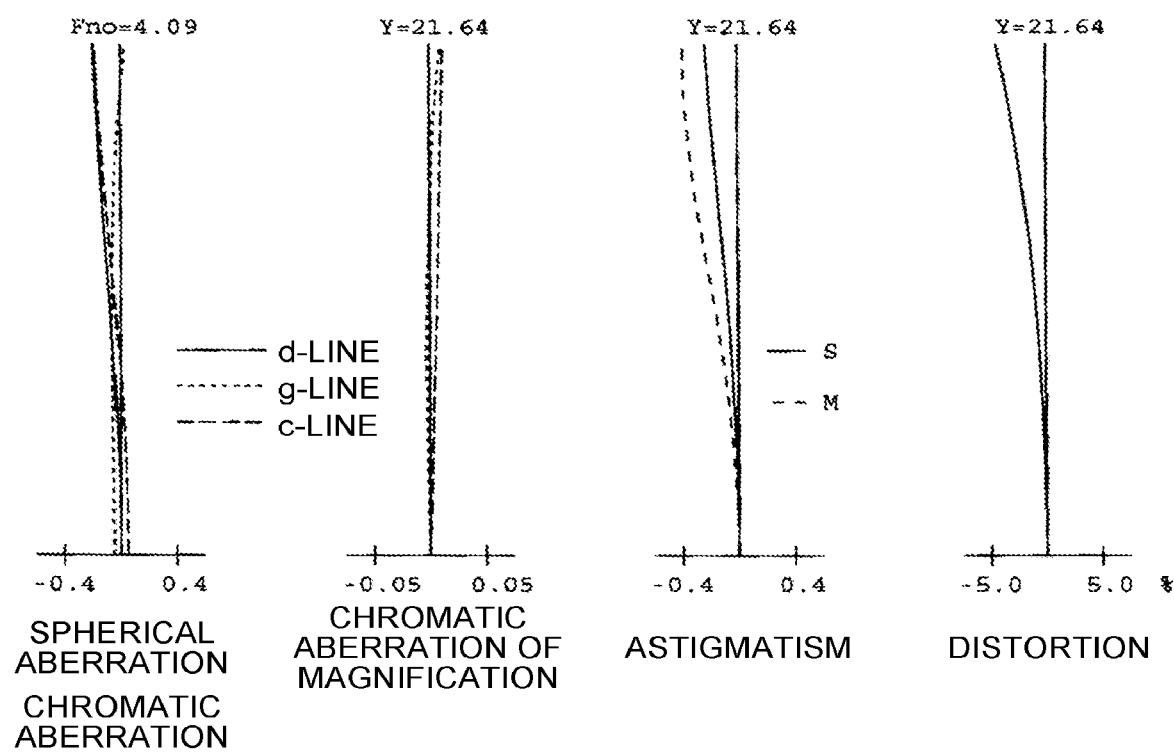
FIG. 40 is a longitudinal aberration diagram when focusing at an object-to-image distance of 1.2 m at the short focal length end of the zoom lens of the numerical example 4.
Figure 41:
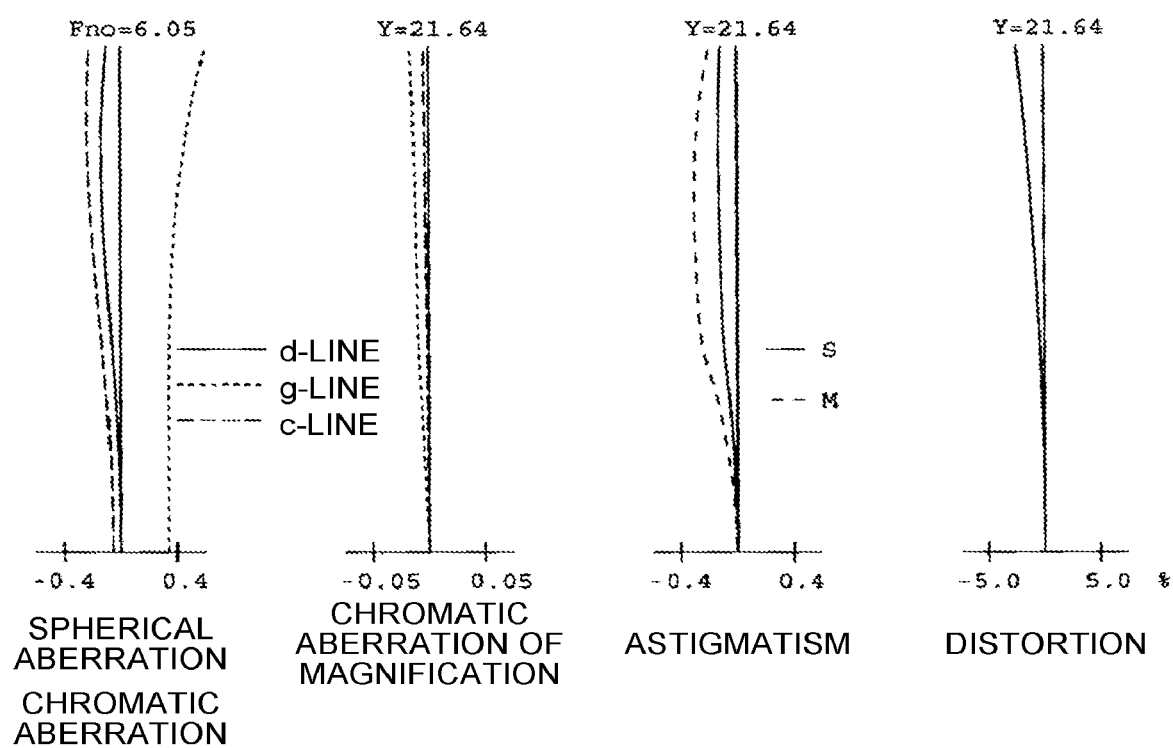
FIG. 41 is a longitudinal aberration diagram when focusing at an object-to-image distance of 1.2 m at the long focal length end of the zoom lens of the numerical example 4.
Figure 42:
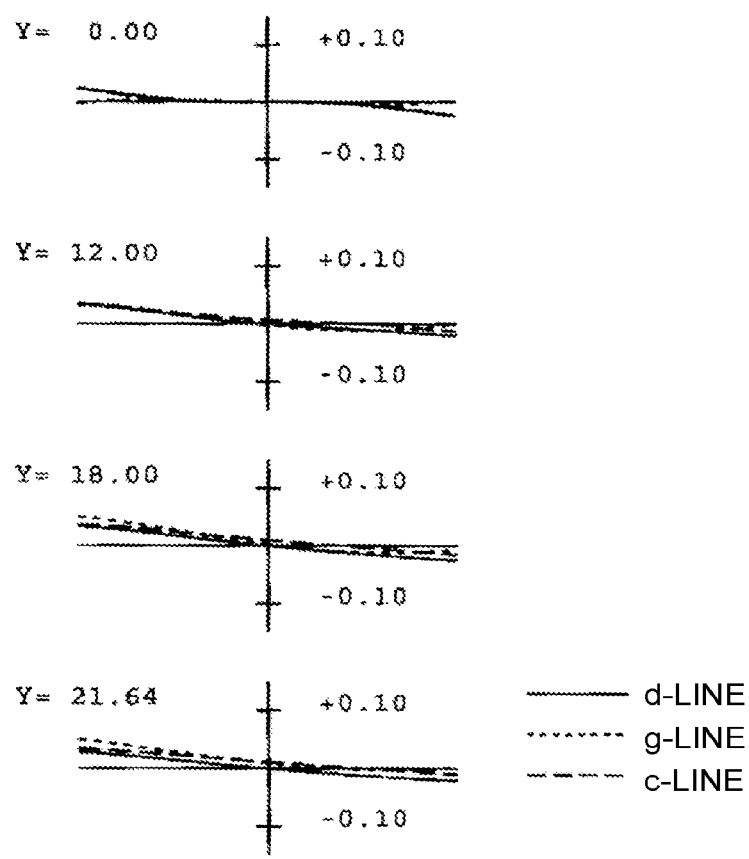
FIG. 42 is a lateral aberration diagram when focusing at an object-to-image distance of 1.2 m at the short focal length end of the zoom lens of the numerical example 4.
Figure 43:
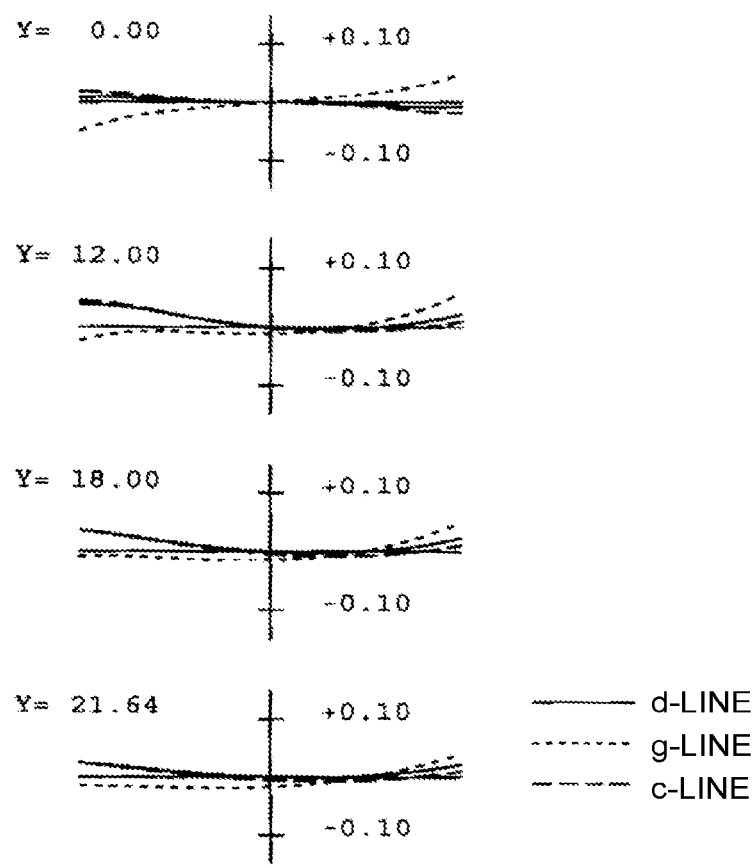
FIG. 43 is a lateral aberration diagram when focusing at an object-to-image distance of 1.2 m at the long focal length end of the zoom lens of the numerical example 4.

FIG. 35 to FIG. 43 and Table 10 to Table 13 show a zoom lens of Numerical Example 4. FIG. 35 is a diagram illustrating a lens structure when focusing on infinity at a short focal length end. FIG. 36, FIG. 37 are longitudinal aberration diagrams when focusing on infinity at the short focal length end and a long focal length end. FIG. 38, FIG. 39 are a lateral aberration diagrams when focusing on infinity at the short focal length end and the long focal length end. FIG. 40, FIG. 41 are longitudinal aberration diagrams when focusing at an object-to-image distance of 1.2 m at the short focal length end and the long focal length end. FIG. 42, FIG. 43 are lateral aberration diagrams when focusing at an object-to-image distance of 1.2 m at the short focal length end and the long focal length end. Table 10 gives surface data, Table 11 gives miscellaneous data, Table 12 gives data of zoom lens group, and Table 13 gives aspheric surface data.

The zoom lens of Numerical Example 4 includes, sequentially from the object side, the first lens group G1 having a positive refractive power, the second lens group G2 having a negative refractive power, the third lens group G3 having a positive refractive power, the fourth lens group G4 having a negative refractive power, the fifth lens group G5 having a positive refractive power (the lens group GFF having a positive refractive power), the sixth lens group G6 having a negative refractive power (the focusing lens group GF), the seventh lens group G7 having a positive refractive power, and the eighth lens group G8 having a negative refractive power. The third lens group G3, the fourth lens group G4, the fifth lens group G5, the sixth lens group G6, the seventh lens group G7, and the eighth lens group G8 constitute the "rear group". Between the second lens group G2 and the third lens group G3 (right before the third lens group G3), the diaphragm SP for light amount adjustment that moves with the third lens group G3 is arranged. Between the eighth lens group G8 and the imaging surface, the plane parallel plate CG is arranged.

The first lens group G1 includes, sequentially from the object side, a positive meniscus lens 11D convex toward the object side, a negative meniscus lens 12D convex toward the object side, and a positive lens 13D convex toward the object side. The negative meniscus lens 12D and the double-convex positive meniscus lens 13D are joined.

The second lens group G2 includes, sequentially from the object side, a double-concave negative lens 21D, a positive meniscus lens 22D convex toward the object side, a double-convex positive lens 23D, a double-concave negative lens 24D, and a double-concave negative lens 25D. The double-convex positive lens 23D and the double-concave negative lens 24D are joined.

The third lens group G3 includes a double-convex positive lens 31D.

The fourth lens group G4 includes a negative meniscus lens 41D convex toward the image side.

The fifth lens group G5 includes, sequentially from the object side, a positive meniscus lens 51D convex toward the image side, a double-convex positive lens 52D (the positive lens L2P), a negative meniscus lens 53D convex toward the image side (the negative lens L2N), a negative meniscus lens 54D convex toward the object side (the negative lens L1N), and a double-convex positive lens 55D (the positive lens L1P). The double-convex positive lens 52D (the positive lens L2P) and the negative meniscus lens 53D (the negative lens L2N) are joined, and constitute the negative lens component L2. The negative meniscus lens 54D (the negative lens L1N) and the double-convex positive lens 55D (the positive lens L1P) are joined, and constitute the positive lens component L1.

The sixth lens group G6 includes, sequentially from the object side, double-convex positive lens 61D (the positive lens GFP), and a double-concave negative lens 62D (the negative lens GFN). The double-convex positive lens 61D (the positive lens GFP) and the double-concave negative lens 62D (the negative lens GFN) are joined.

The seventh lens group G7 includes a double-convex positive lens 71D.

The eighth lens group G8 includes a negative meniscus lens 81D convex toward the image side. On a surface on the object side on the negative meniscus lens 81D, an aspheric surface is formed.

TABLE 10

[Surface Data]
Zoom ratio 5.38

| Surface number | R | D | N(d) | ν(d) |
|---|---|---|---|---|
| 1 | 104.065 | 6.690 | 1.59522 | 67.7 |
| 2 | 382.421 | 0.200 | | |
| 3 | 97.507 | 2.800 | 1.83400 | 37.2 |
| 4 | 61.040 | 10.970 | 1.43875 | 95.0 |
| 5 | 534.823 | D5 | | |
| 6 | −313.905 | 1.600 | 1.90366 | 31.3 |
| 7 | 49.648 | 2.000 | | |
| 8 | 52.721 | 4.000 | 1.84666 | 23.8 |
| 9 | 3601.881 | 2.000 | | |
| 10 | 190.316 | 3.100 | 1.85025 | 30.0 |
| 11 | −52.724 | 1.200 | 1.72000 | 50.2 |
| 12 | 59.705 | 4.000 | | |
| 13 | −56.995 | 1.200 | 1.59410 | 60.5 |
| 14 | 645.309 | D14 | | |
| 15 Diaphragm | INFINITY | 0.500 | | |
| 16 | 47.545 | 5.360 | 1.43875 | 95.0 |
| 17 | −86.947 | D17 | | |
| 18 | −35.704 | 1.500 | 1.88100 | 40.1 |
| 19 | −67.799 | D19 | | |
| 20 | −1121.378 | 4.600 | 1.74400 | 44.8 |
| 21 | −43.867 | 3.690 | | |
| 22 | 85.425 | 5.130 | 1.49700 | 81.6 |
| 23 | −37.446 | 1.700 | 2.00100 | 29.1 |
| 24 | −215.449 | 0.200 | | |
| 25 | 119.472 | 1.200 | 2.00100 | 29.1 |
| 26 | 47.388 | 3.310 | 1.90366 | 31.3 |
| 27 | −723.455 | D27 | | |
| 28 | 1557.459 | 2.710 | 1.85478 | 24.8 |
| 29 | −114.108 | 1.200 | 1.77250 | 49.6 |
| 30 | 46.445 | D30 | | |
| 31 | 78.011 | 7.800 | 1.65412 | 39.7 |
| 32 | −504.024 | D32 | | |
| 33* | −35.000 | 1.800 | 1.49710 | 81.6 |
| 34 | −110.103 | D34 | | |
| 35 | INFINITY | 1.500 | 1.51633 | 64.1 |
| 36 | INFINITY | — | | |

TABLE 11

[Miscellaneous Data]

|  | Infinity | | | Close range (Object-to-image distance 0.9 m) | | |
| --- | --- | --- | --- | --- | --- | --- |
|  | Wide angle | Intermediate | Telephoto | Wide angle | Intermediate | Telephoto |
| FNO. | 4.1 | 5.3 | 5.8 | 4.1 | 5.6 | 6.1 |
| f | 72.10 | 200.00 | 388.00 | 65.49 | 134.70 | 180.33 |
| Magnification | 0.000 | 0.000 | 0.000 | −0.066 | −0.168 | −0.277 |
| W | 17.4 | 6.3 | 3.3 | 17.8 | 6.5 | 3.6 |
| Y | 21.64 | 21.64 | 21.64 | 21.64 | 21.64 | 21.64 |
| BF | 8.34 | 21.09 | 32.23 | 8.34 | 21.09 | 32.23 |
| L | 198.41 | 248.03 | 285.17 | 198.41 | 248.03 | 285.17 |
| D5 | 3.500 | 53.119 | 90.266 | 3.500 | 53.119 | 90.266 |
| D14 | 27.755 | 5.460 | 1.610 | 27.755 | 5.460 | 1.610 |
| D17 | 4.922 | 11.874 | 15.246 | 2.805 | 5.780 | 4.864 |
| D19 | 11.460 | 4.507 | 1.135 | 13.577 | 10.602 | 11.518 |
| D27 | 22.779 | 22.715 | 3.270 | 25.125 | 32.883 | 31.183 |
| D30 | 6.930 | 21.289 | 54.992 | 4.583 | 11.121 | 27.079 |
| D32 | 32.257 | 27.511 | 5.961 | 32.257 | 27.511 | 5.961 |
| D34 | 6.355 | 19.101 | 30.242 | 6.355 | 19.101 | 30.242 |

TABLE 12

[Data of Zoom Lens Group]

| Group | Starting surface | Focal length |
| --- | --- | --- |
| 1 | 1 | 178.37 |
| 2 | 6 | −44.40 |
| 3 | 16 | 70.92 |
| 4 | 18 | −87.52 |
| 5 | 20 | 48.61 |
| 6 | 28 | −65.21 |
| 7 | 31 | 103.83 |
| 8 | 33 | −104.05 |

TABLE 13

[Aspheric Surface Data]

| NO. 33 | K = | A4 = | A6 = | A8 = | A10 = |
| --- | --- | --- | --- | --- | --- |
|  | −0.338 | 0.6191E−05 | 0.2880E−09 | −0.2054E−11 | 0.2950E−14 |

Numerical Example 5

Figure 44:
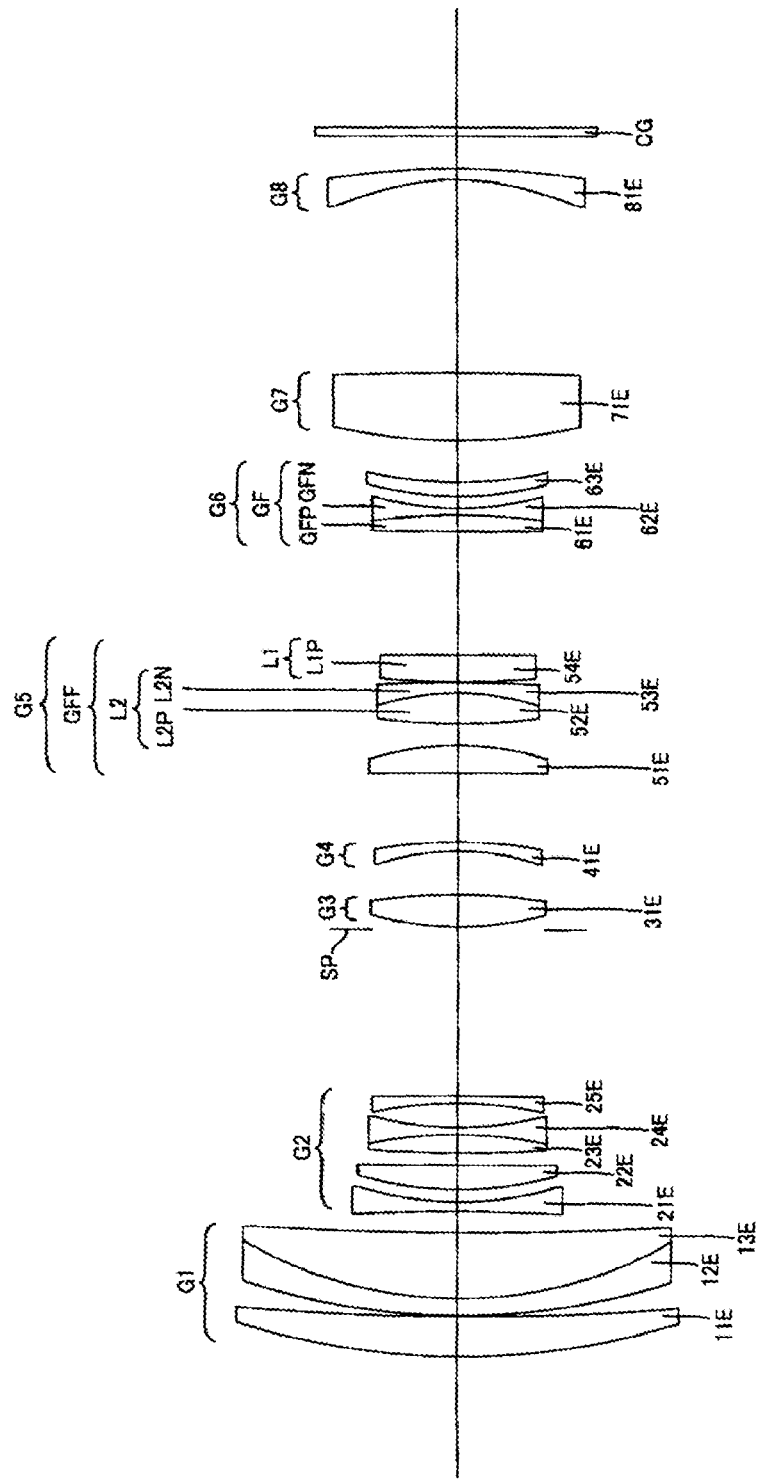
FIG. 44 is a diagram illustrating a lens structure when focusing on infinity at a short focal length end of the zoom lens of the numerical example 5.
Figure 45:
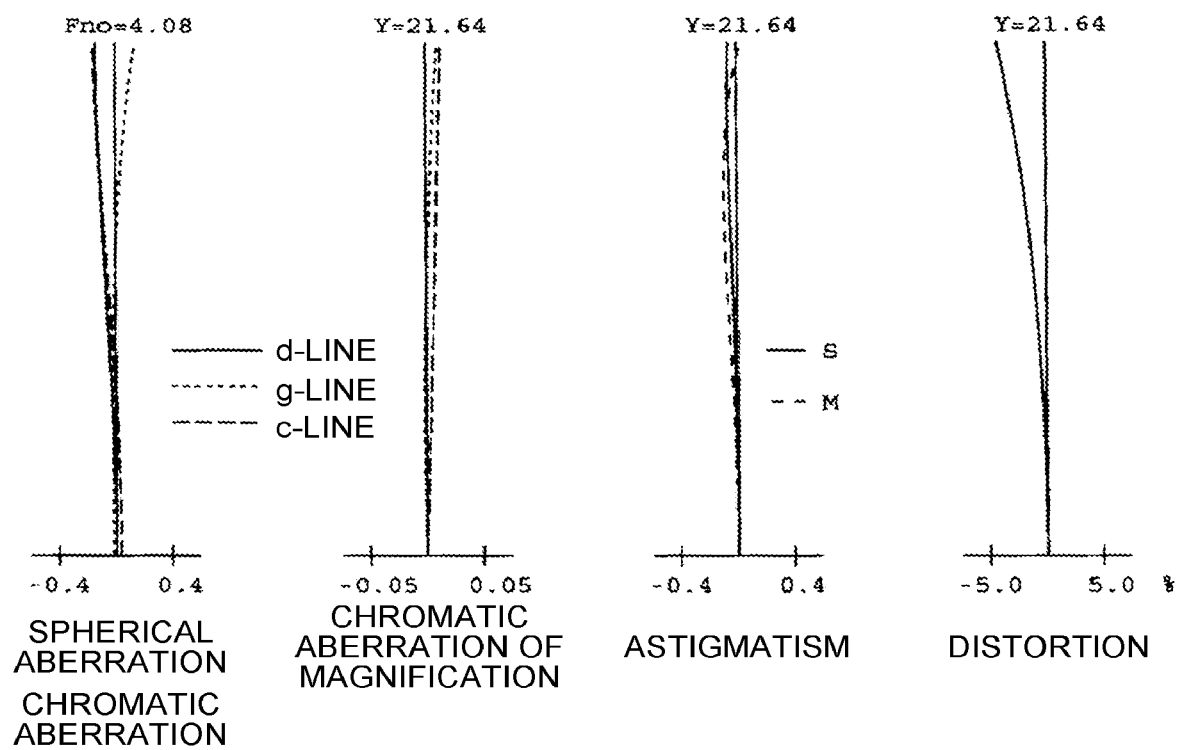
FIG. 45 is a longitudinal aberration diagram when focusing on infinity at the short focal length end of the zoom lens of the numerical example 5.
Figure 46:
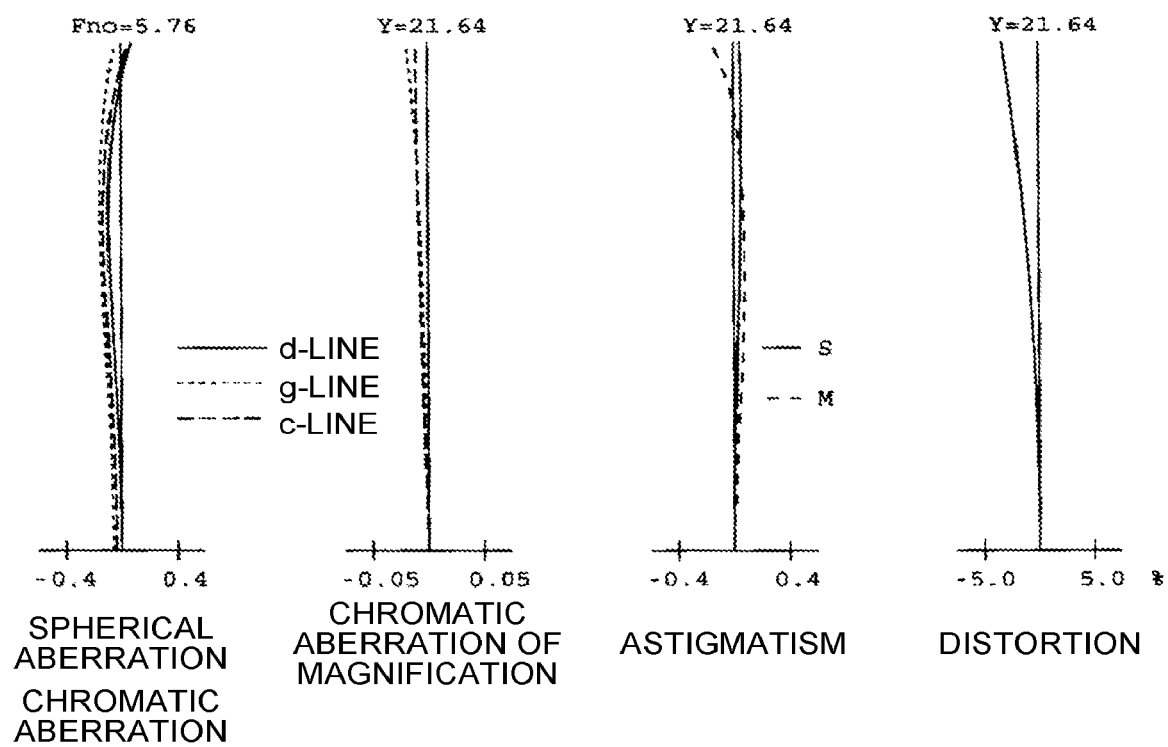
FIG. 46 is a longitudinal aberration diagram when focusing on infinity at the long focal length end of the zoom lens of the numerical example 5.
Figure 47:
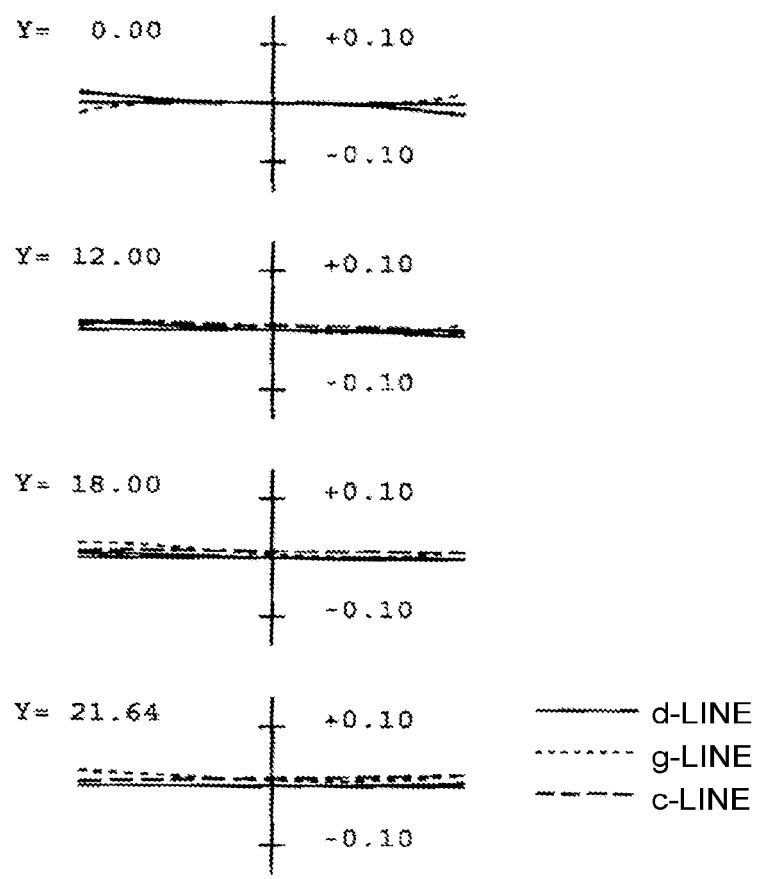
FIG. 47 is a lateral aberration diagram when focusing on infinity at the short focal length end of the zoom lens of the numerical example 5.
Figure 48:
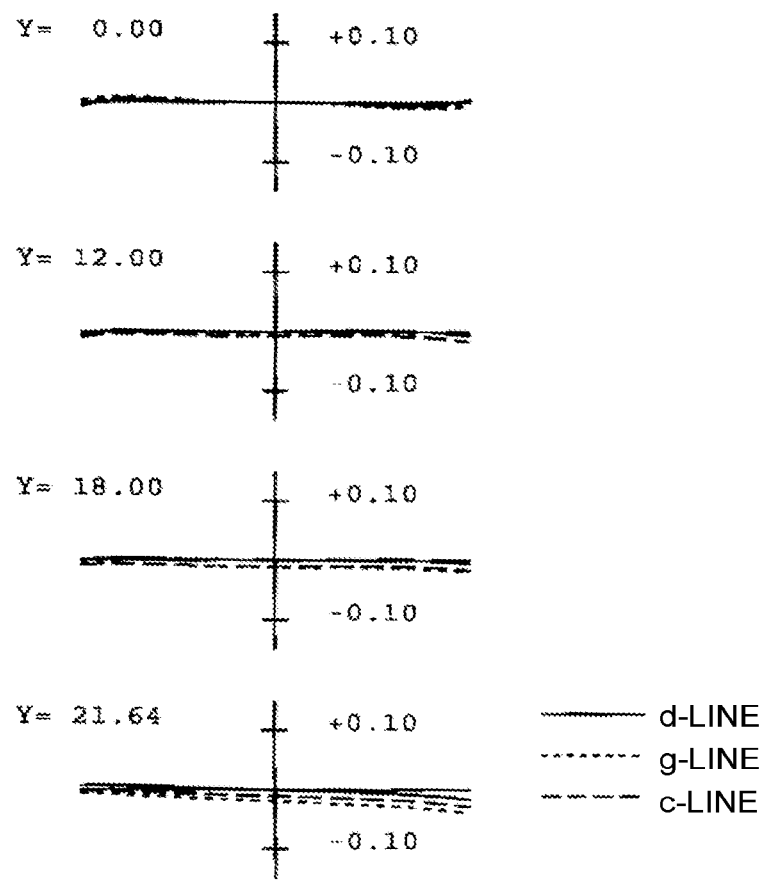
FIG. 48 is a lateral aberration diagram when focusing on infinity at the long focal length end of the zoom lens of the numerical example 5.
Figure 49:
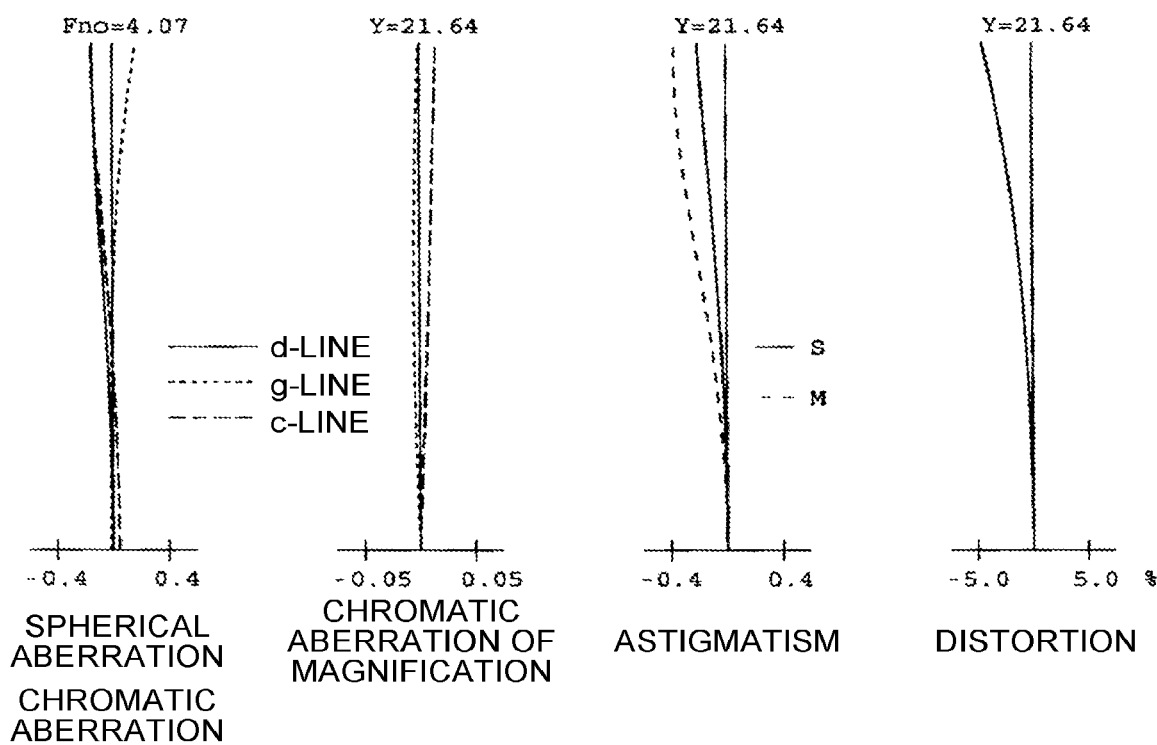
FIG. 49 is a longitudinal aberration diagram when focusing at an object-to-image distance of 1.2 m at the short focal length end of the zoom lens of the numerical example 5.
Figure 50:
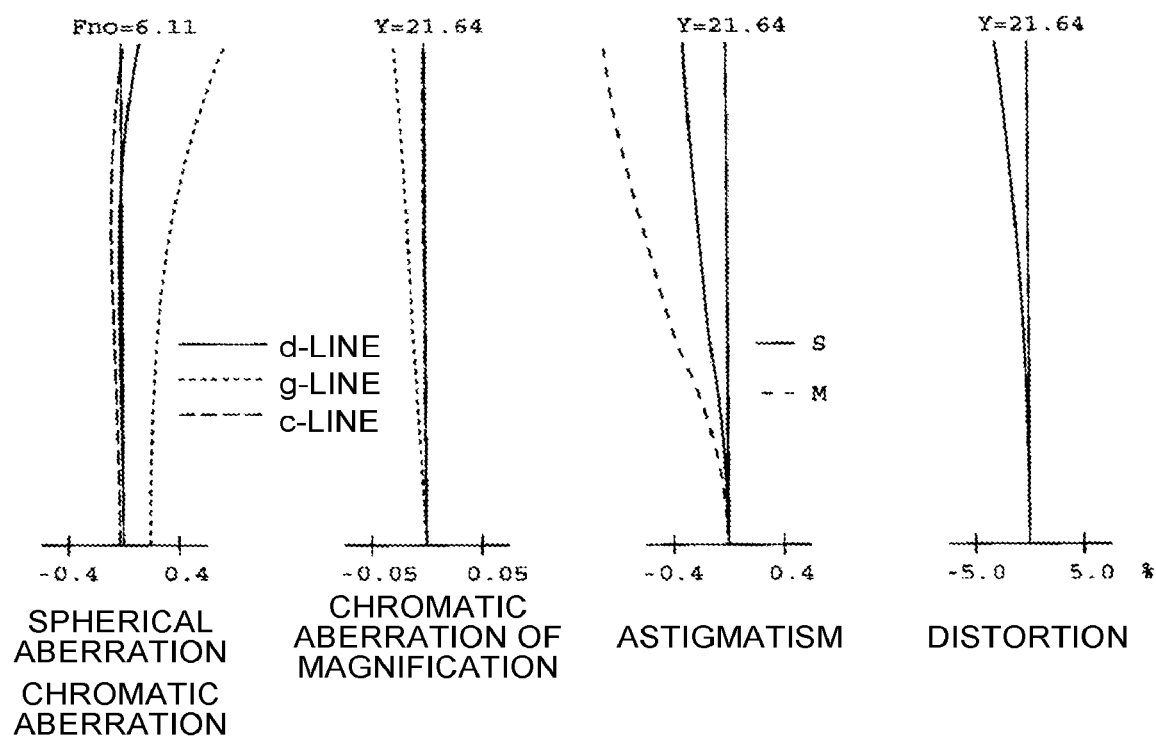
FIG. 50 is a longitudinal aberration diagram when focusing at an object-to-image distance of 1.2 m at the long focal length end of the zoom lens of the numerical example 5.
Figure 51:
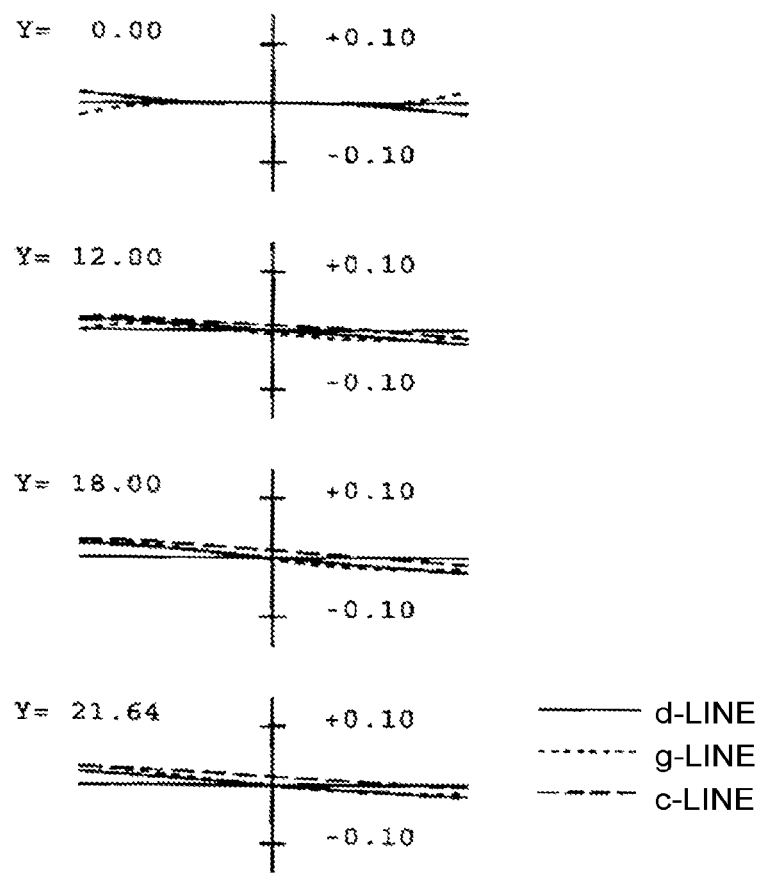
FIG. 51 is a lateral aberration diagram when focusing at an object-to-image distance of 1.2 m at the short focal length end of the zoom lens of the numerical example 5.
Figure 52:
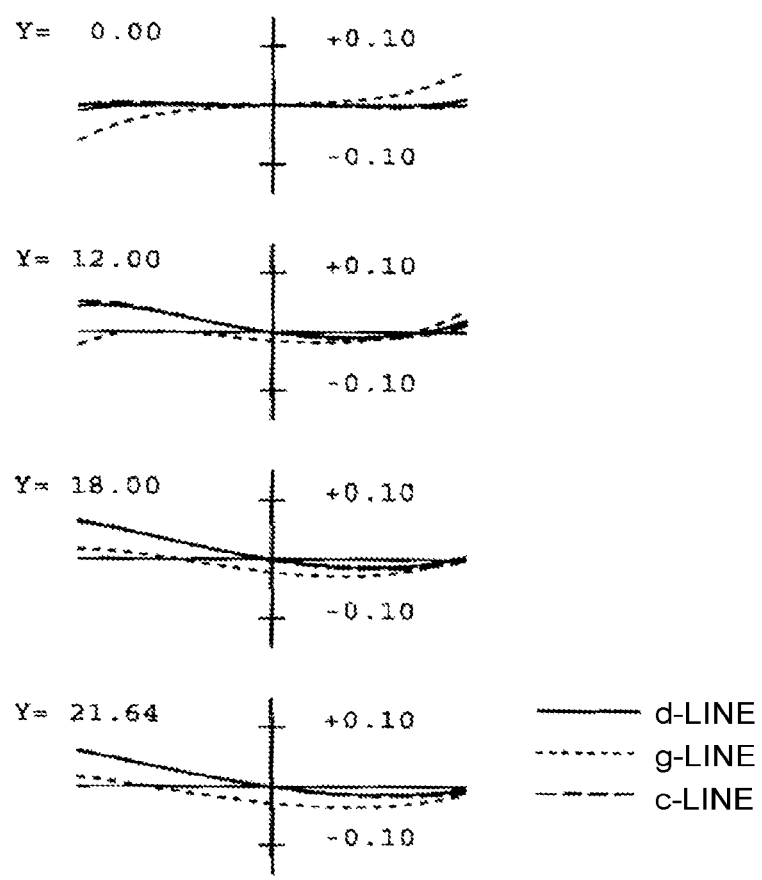
FIG. 52 is a lateral aberration diagram when focusing at an object-to-image distance of 1.2 m at the long focal length end of the zoom lens of the numerical example 5.

FIG. 44 to FIG. 52 and Table 14 to Table 17 show a zoom lens of Numerical Example 5. FIG. 44 is a diagram illustrating a lens structure when focusing on infinity at a short focal length end. FIG. 45, FIG. 46 are longitudinal aberration diagrams when focusing on infinity at the short focal length end and a long focal length end. FIG. 47, FIG. 48 are a lateral aberration diagrams when focusing on infinity at the short focal length end and the long focal length end. FIG. 49, FIG. 50 are longitudinal aberration diagrams when focusing at an object-to-image distance of 1.2 m at the short focal length end and the long focal length end. FIG. 51, FIG. 52 are lateral aberration diagrams when focusing at an object-to-image distance of 1.2 m at the short focal length end and the long focal length end. Table 14 gives surface data, Table 15 gives miscellaneous data, Table 16 gives data of zoom lens group, and Table 17 gives aspheric surface data.

The zoom lens of Numerical Example 5 includes, sequentially from the object side, the first lens group G1 having a positive refractive power, the second lens group G2 having a negative refractive power, the third lens group G3 having a positive refractive power, the fourth lens group G4 having a negative refractive power, the fifth lens group G5 having a positive refractive power (the lens group GFF having a positive refractive power), the sixth lens group G6 having a negative refractive power (the focusing lens group GF), the seventh lens group G7 having a positive refractive power, and the eighth lens group G8 having a negative refractive power. The third lens group G3, the fourth lens group G4, the fifth lens group G5, the sixth lens group G6, the seventh lens group G7, and the eighth lens group G8 constitute the "rear group". Between the second lens group G2 and the third lens group G3 (right before the third lens group G3), the diaphragm SP for light amount adjustment that moves with the third lens group G3 is arranged. Between the eighth lens group G8 and the imaging surface, the plane parallel plate CG is arranged.

The first lens group G1 includes, sequentially from the object side, a positive meniscus lens 11E convex toward the object side, a negative meniscus lens 12E convex toward the object side, and a positive meniscus lens 13E convex toward the object side. The negative meniscus lens 12E and the positive meniscus lens 13E are joined.

The second lens group G2 includes, sequentially from the object side, a double-concave negative lens 21E, a positive meniscus lens 22E convex toward the object side, a double-convex positive lens 23E, a double-concave negative lens 24E, and a negative meniscus lens 25E convex toward the image side. The double-convex positive lens 23E and the double-concave negative lens 24E are joined.

The third lens group G3 includes a double-convex positive lens 31E.

The fourth lens group G4 includes a negative meniscus lens 41E convex toward the image side.

The fifth lens group G5 includes, sequentially from the object side, a positive meniscus lens 51E convex toward the image side, a double-convex positive lens 52E (the positive lens L2P), a negative meniscus lens 53E convex toward the image side (the negative lens L2N), a double-convex positive lens 54E (the positive lens L1P). The double-convex positive lens 52E (the positive lens L2P) and the negative meniscus lens 53E (the negative lens L2N) are joined, and constitute the negative lens component L2. The double-convex positive lens 54E (the positive lens L1P) constitutes the positive lens component L1.

The sixth lens group G6 includes, sequentially from the object side, a double-convex positive lens 61E (the positive lens GFP), a double-concave negative lens 62E (the negative lens GFN), and a positive meniscus lens 63E convex toward the object side. The double-convex positive lens 61E (the positive lens GFP) and the double-concave negative lens 62E (the negative lens GFN) are joined.

The seventh lens group G7 includes a double-convex positive lens 71E.

The eighth lens group G8 includes a negative meniscus lens 81E convex toward the image side. On a surface on the object side of the negative meniscus lens 81E, an aspheric surface is formed.

TABLE 14

[Surface Data]
Zoom ratio 5.38

| Surface number | R | D | N(d) | v(d) |
|---|---|---|---|---|
| 1 | 104.176 | 6.690 | 1.59522 | 67.7 |
| 2 | 380.855 | 0.200 | | |
| 3 | 97.664 | 2.800 | 1.83400 | 37.2 |

TABLE 14-continued

[Surface Data]
Zoom ratio 5.38

| Surface number | R | D | N(d) | v(d) |
|---|---|---|---|---|
| 4 | 60.661 | 10.970 | 1.43875 | 95.0 |
| 5 | 526.158 | D5 | | |
| 6 | −306.086 | 1.600 | 1.88100 | 40.1 |
| 7 | 48.697 | 2.000 | | |
| 8 | 52.215 | 4.000 | 1.85025 | 30.0 |
| 9 | 2988.601 | 2.000 | | |
| 10 | 187.409 | 3.100 | 1.85025 | 30.0 |
| 11 | −61.975 | 1.200 | 1.65160 | 58.5 |
| 12 | 49.512 | 4.000 | | |
| 13 | −56.322 | 1.200 | 1.69680 | 55.5 |
| 14 | −782.477 | D14 | | |
| 15 Diaphragm | INFINITY | 0.500 | | |
| 16 | 46.973 | 5.360 | 1.43875 | 95.0 |
| 17 | −88.408 | D17 | | |
| 18 | −35.684 | 1.500 | 1.89190 | 37.1 |
| 19 | −−68.241 | D19 | | |
| 20 | −926.897 | 4.600 | 1.74320 | 49.3 |
| 21 | −43.656 | 3.690 | | |
| 22 | 91.191 | 5.130 | 1.49700 | 81.6 |
| 23 | −37.058 | 1.700 | 2.00100 | 29.1 |
| 24 | −234.678 | 0.200 | | |
| 25 | 127.192 | 4.510 | 2.00100 | 29.1 |
| 26 | −1078.467 | D26 | | |
| 27 | 2112.091 | 2.710 | 1.85478 | 24.8 |
| 28 | −98.081 | 1.200 | 1.78800 | 47.4 |
| 29 | 44.447 | 2.000 | | |
| 30 | 47.601 | 2.300 | 1.48749 | 70.2 |
| 31 | 56.986 | D31 | | |
| 32 | 77.448 | 11.306 | 1.65412 | 39.7 |
| 33 | −481.206 | D33 | | |
| 34* | −35.000 | 1.800 | 1.49710 | 81.6 |
| 35 | −115.109 | D35 | | |
| 36 | INFINITY | 1.500 | 1.51633 | 64.1 |
| 37 | INFINITY | — | | |

TABLE 15

[Miscellaneous Data]

| | Infinity | | | Close range (Object-to-image distance 0.9 m) | | |
|---|---|---|---|---|---|---|
| | Wide angle | Intermediate | Telephoto | Wide angle | Intermediate | Telephoto |
| FNO. | 4.1 | 5.3 | 5.8 | 4.1 | 5.6 | 6.1 |
| f | 72.10 | 200.00 | 388.00 | 65.62 | 135.66 | 181.00 |
| Magnification | 0.000 | 0.000 | 0.000 | −0.067 | −0.168 | −0.277 |
| W | 17.4 | 6.3 | 3.3 | 17.8 | 6.5 | 3.6 |
| Y | 21.64 | 21.64 | 21.64 | 21.64 | 21.64 | 21.64 |
| BF | 7.38 | 20.05 | 33.49 | 7.38 | 20.05 | 33.49 |
| L | 205.62 | 256.35 | 292.36 | 205.62 | 256.35 | 292.36 |
| D5 | 3.500 | 54.231 | 90.245 | 3.500 | 54.231 | 90.245 |
| D14 | 27.755 | 5.650 | 1.610 | 27.755 | 5.650 | 1.610 |
| D17 | 7.280 | 13.786 | 18.125 | 5.203 | 7.741 | 7.801 |
| D19 | 11.460 | 4.954 | 0.615 | 13.536 | 10.999 | 10.938 |
| D26 | 20.661 | 22.538 | 3.270 | 22.962 | 32.622 | 31.024 |
| D31 | 6.930 | 22.936 | 50.775 | 4.628 | 12.852 | 23.021 |
| D33 | 32.383 | 23.941 | 5.961 | 32.383 | 23.941 | 5.961 |
| D35 | 5.393 | 18.056 | 31.505 | 5.393 | 18.056 | 31.505 |

TABLE 16

[Data of Zoom Lens Group]

| Group | Starting surface | Focal length |
|---|---|---|
| 1 | 1 | 180.87 |
| 2 | 6 | −44.24 |
| 3 | 16 | 70.77 |
| 4 | 18 | −85.72 |
| 5 | 20 | 48.18 |
| 6 | 27 | −66.84 |
| 7 | 32 | 102.81 |
| 8 | 34 | −101.93 |

TABLE 17

[ASPHERIC SURFACE DATA]

| NO. 34 | K = | A4 = | A6 = | A8 = | A10 = |
|---|---|---|---|---|---|
| | −0.338 | 0.6191E−05 | 0.2880E−09 | −0.2054E−11 | 0.2950E−14 |

Numerical Example 6

Figure 53:
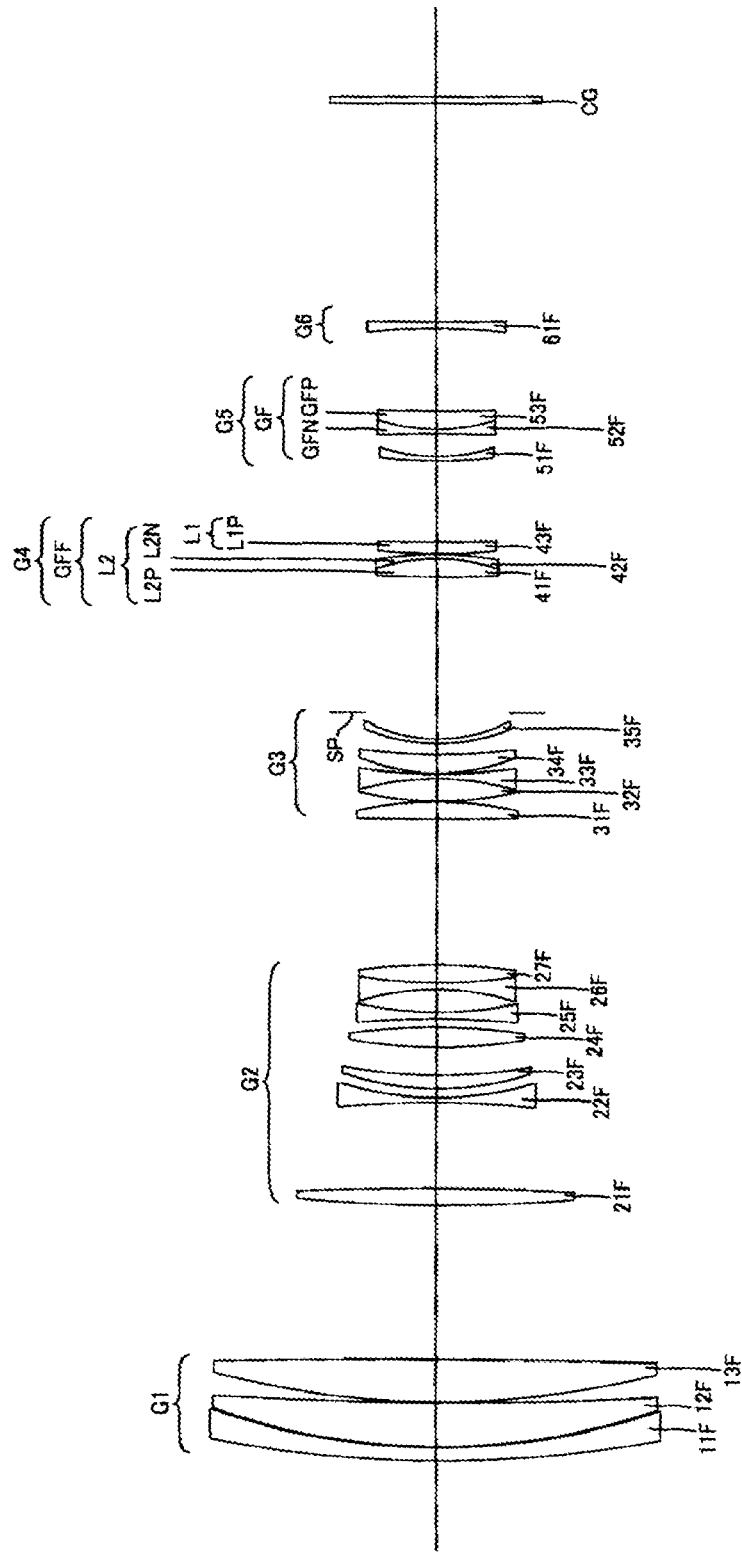
FIG. 53 is a diagram illustrating a lens structure when focusing on infinity at a short focal length end of the zoom lens of the numerical example 6.
Figure 54:
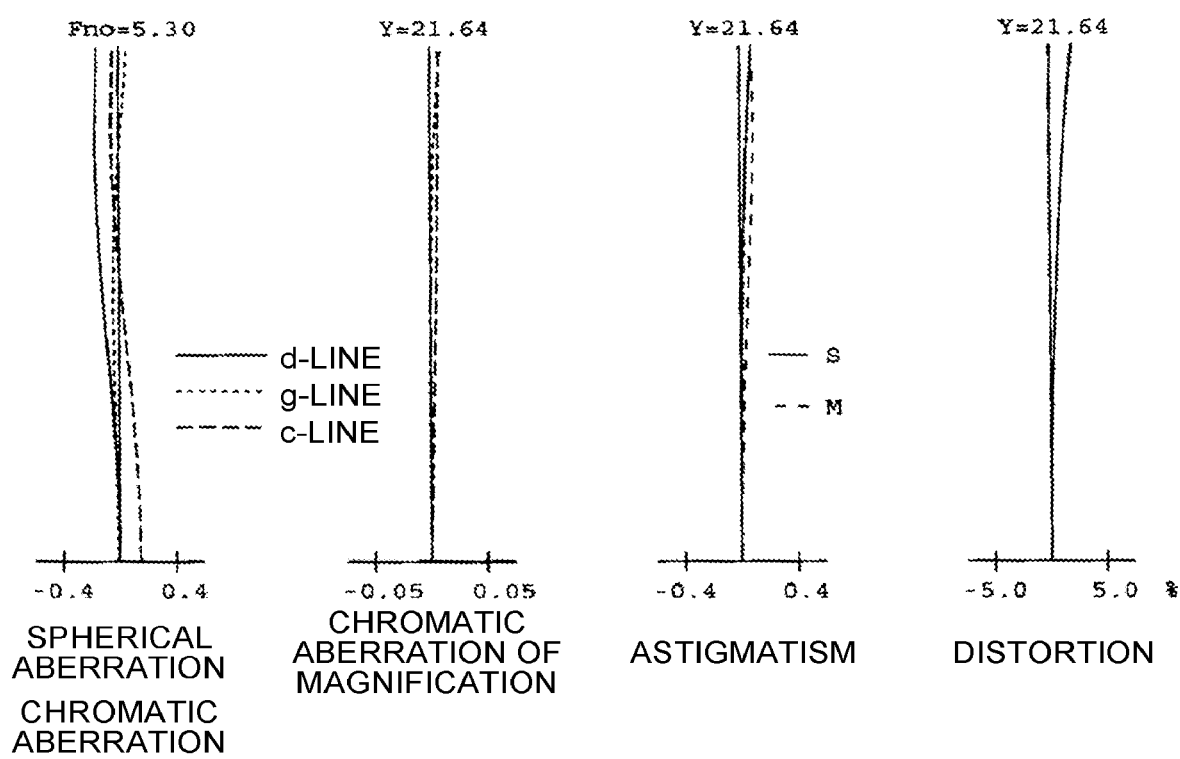
FIG. 54 is a longitudinal aberration diagram when focusing on infinity at the short focal length end of the zoom lens of the numerical example 6.
Figure 55:
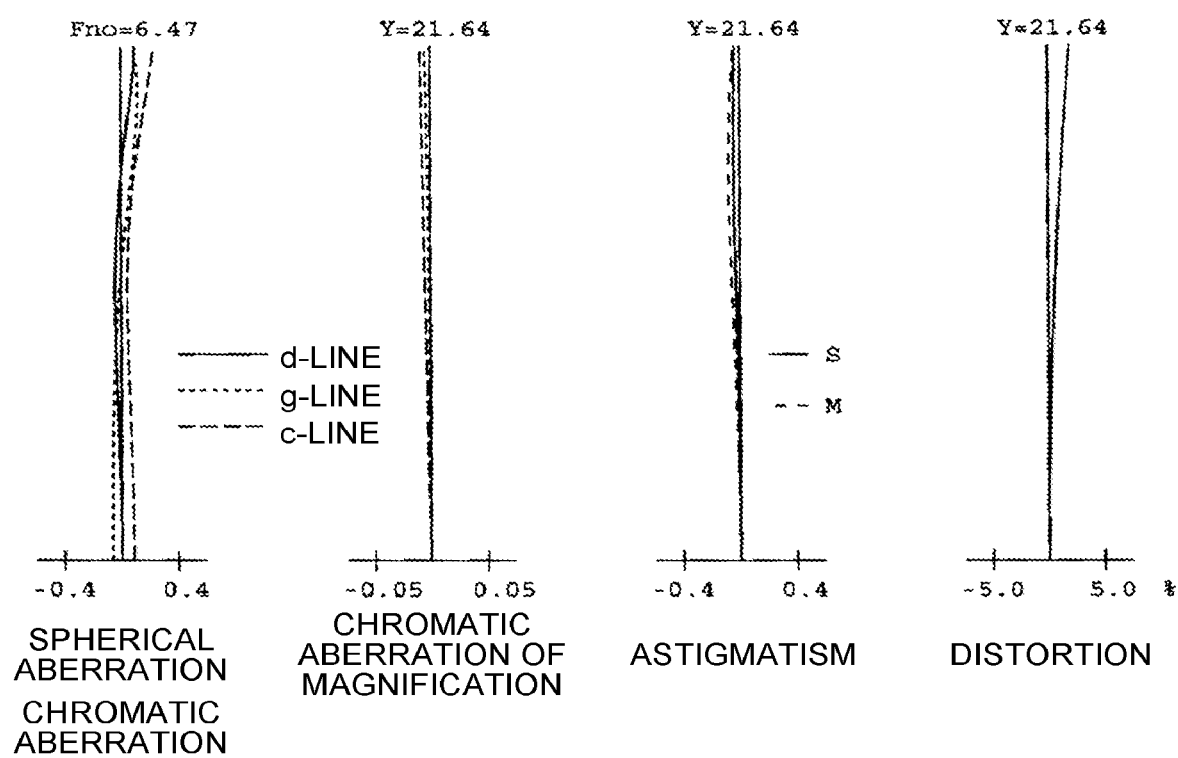
FIG. 55 is a longitudinal aberration diagram when focusing on infinity at the long focal length end of the zoom lens of the numerical example 6.
Figure 56:
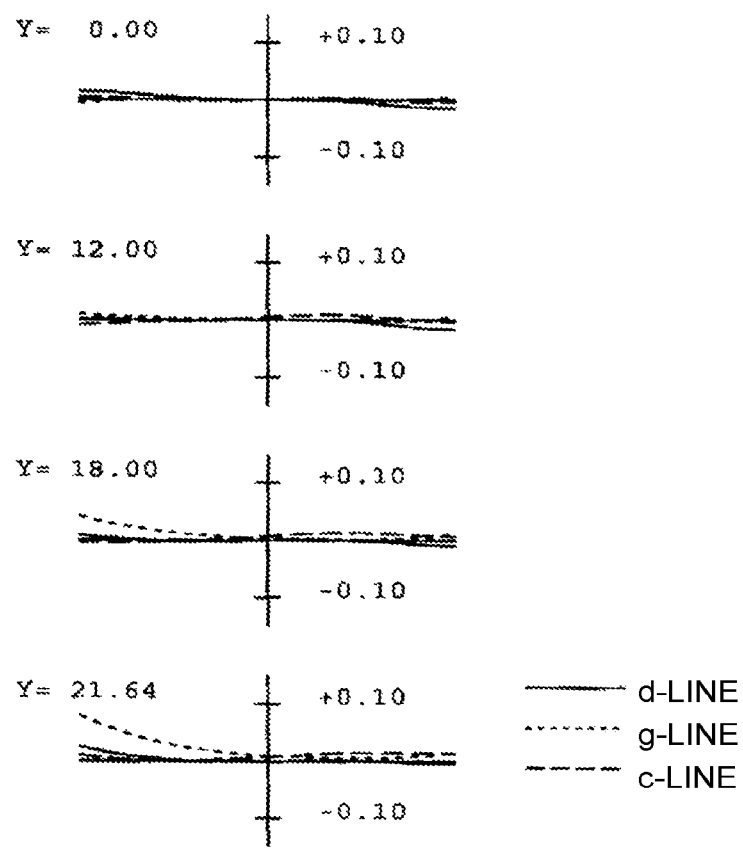
FIG. 56 is a lateral aberration diagram when focusing on infinity at the short focal length end of the zoom lens of the numerical example 6.
Figure 57:
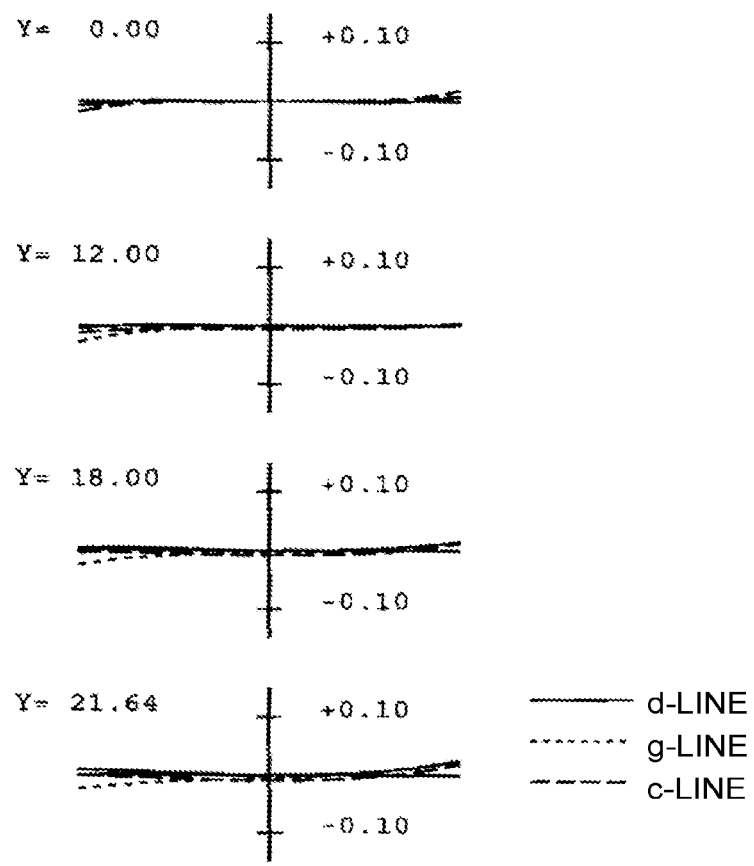
FIG. 57 is a lateral aberration diagram when focusing on infinity at the long focal length end of the zoom lens of the numerical example 6.
Figure 58:
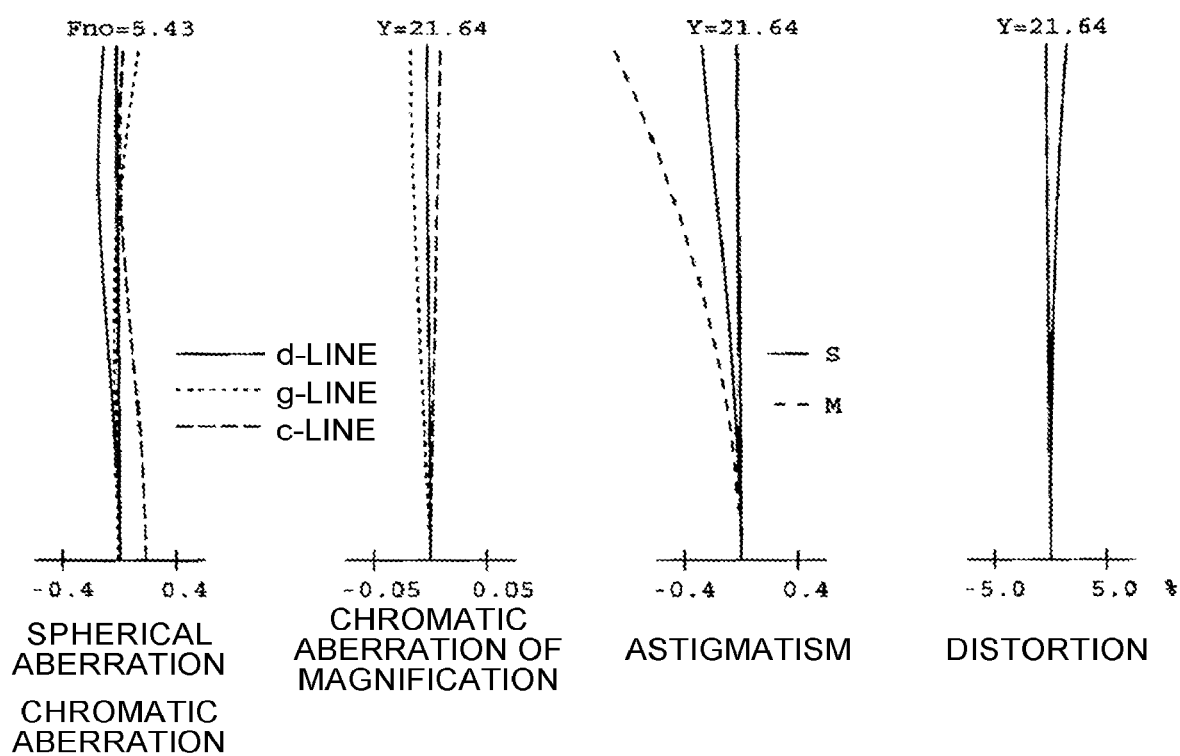
FIG. 58 is a longitudinal aberration diagram when focusing at an object-to-image distance of 1.5 m at the short focal length end of the zoom lens of the numerical example 6.
Figure 59:
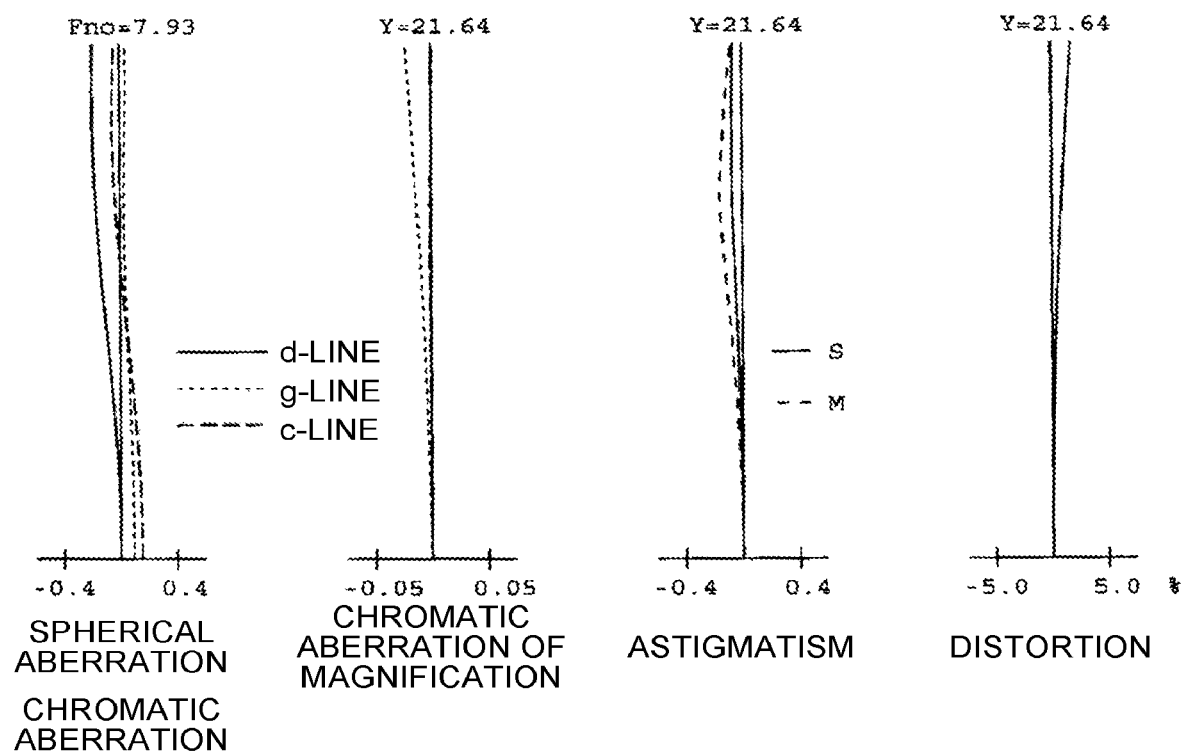
FIG. 59 is a longitudinal aberration diagram when focusing at an object-to-image distance of 1.5 m at the long focal length end of the zoom lens of the numerical example 6.
Figure 60:
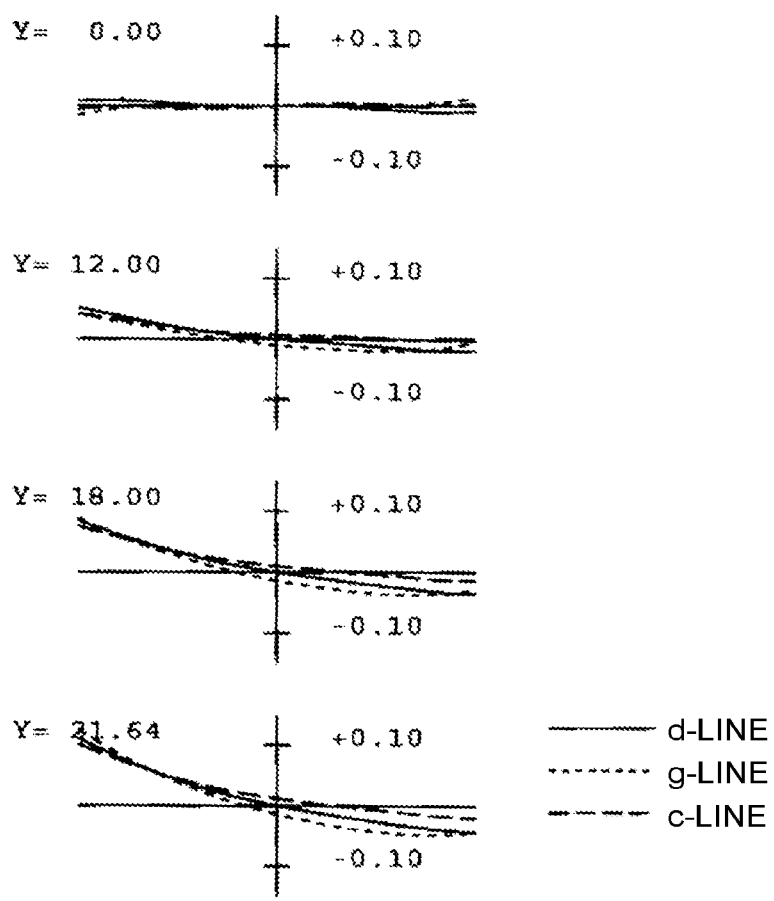
FIG. 60 is a lateral aberration diagram when focusing at an object-to-image distance of 1.5 m at the short focal length end of the zoom lens of the numerical example 6.
Figure 61:
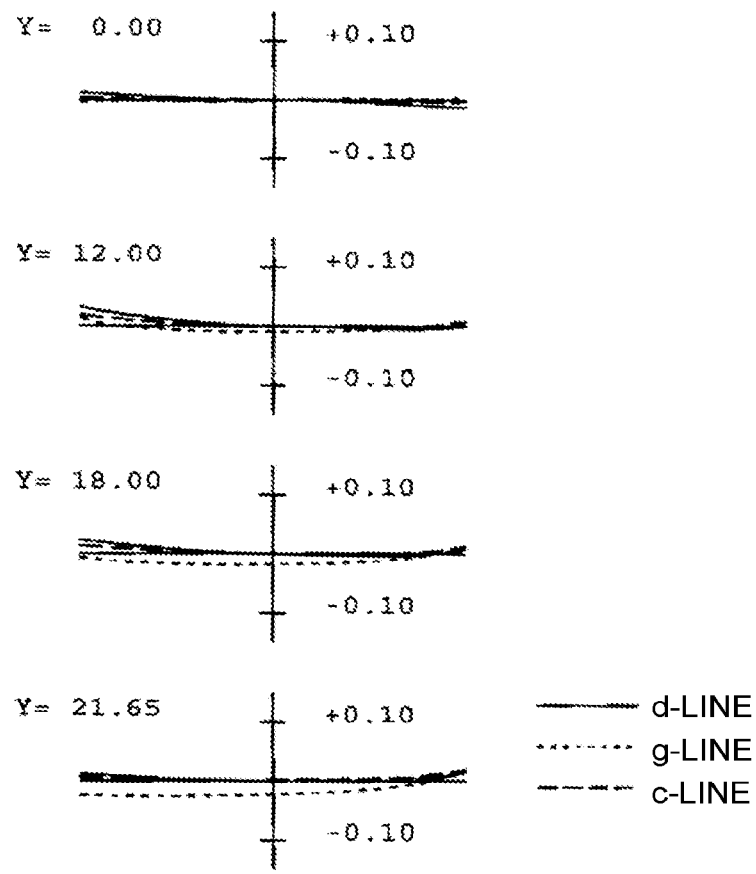
FIG. 61 is a lateral aberration diagram when focusing at an object-to-image distance of 1.5 m at the long focal length end of the zoom lens of the numerical example 6.

FIG. 53 to FIG. 61 and Table 18 to Table 20 show a zoom lens of Numerical Example 6. FIG. 53 is a diagram illustrating a lens structure when focusing on infinity at a short focal length end. FIG. 54, FIG. 55 are longitudinal aberration diagrams when focusing on infinity at the short focal length end and a long focal length end. FIG. 56, FIG. 57 are a lateral aberration diagrams when focusing on infinity at the short focal length end and the long focal length end. FIG. 58, FIG. 59 are longitudinal aberration diagrams when focusing at an object-to-image distance of 1.5 m at the short focal length end and the long focal length end. FIG. 60, FIG. 61 are lateral aberration diagrams when focusing at an object-to-image distance of 1.5 m at the short focal length end and the long focal length end. Table 18 gives surface data, Table 19 gives miscellaneous data, and Table 20 gives data of zoom lens group.

The zoom lens of Numerical Example 6 includes, sequentially from the object side, the first lens group G1 having a positive refractive power, the second lens group G2 having a negative refractive power, the third lens group G3 having a positive refractive power, the fourth lens group G4 having a positive refractive power (the lens group GFF having a positive refractive power), the fifth lens group G5 having a negative refractive power (the focusing lens group GF), and the sixth lens group G6 having a negative refractive power. The third lens group G3, the fourth lens group G4, the fifth lens group G5, and the sixth lens group G6 constitute the "rear group". Between the third lens group G3 and the fourth lens group G4 (right after the third lens group G3), the diaphragm SP for light amount adjustment that moves with the third lens group G3 is arranged. Between the sixth lens group G6 and the imaging surface, the plane parallel plate CG is arranged.

The first lens group G1 includes, sequentially from the object side, a negative meniscus lens 11F convex toward the object side, a positive meniscus lens 12F convex toward the object side, and a double-convex positive lens 13F.

The second lens group G2 includes, sequentially from the object side, a double-convex positive lens 21F, a double-concave negative lens 22F, a positive meniscus lens 23F convex toward the object side, a double-convex positive lens 24F, a double-concave negative lens 25F, a double-concave negative lens 26F, and a double-convex positive lens 27F. The double-concave negative lens 26F and the double-convex positive lens 27F are joined.

The third lens group G3 includes, sequentially from the object side, a double-convex positive lens 31F, a double-convex positive lens 32F, a double-concave negative lens 33F, a positive meniscus lens 34F convex toward the object side, and a negative meniscus lens 35F convex toward the object side. The double convex positive lens 32F and the double-concave negative lens 33F are joined.

The fourth lens group G4 includes, sequentially from the object side, a double-convex positive lens 41F (the positive lens L2P), a negative meniscus lens 42F convex toward the image side (the negative lens L2N), and a positive meniscus lens 43F convex toward the object side (the positive lens L1P). The double-convex positive lends 41F (the positive lens L2P) and the negative meniscus lens 42F (the negative lens L2N) are joined, and constitutes the positive lens component L2. The positive meniscus lens 43F (the positive lens L1P) constitutes the positive lens component L1.

The fifth lens group G5 includes, sequentially from the object side, a negative meniscus lens 51F convex toward the object side, a double-concave negative lens 52F (the negative lens GFN), and a positive meniscus lens 53F convex toward the object side (the positive lens GFP). The double-concave negative lens 52F (the negative lens GFN) and the positive meniscus lens 53F (the positive lens GFP) are joined.

The sixth lens group G6 includes a double-concave negative lens 61F.

TABLE 18

[Surface Data]
Zoom ratio 3.77

| Surface number | R | D | N(d) | ν(d) |
|---|---|---|---|---|
| 1 | 220.319 | 3.000 | 1.83400 | 37.3 |
| 2 | 127.262 | 0.200 | | |
| 3 | 126.500 | 9.800 | 1.49700 | 81.6 |
| 4 | 774.194 | 0.150 | | |
| 5 | 166.193 | 9.300 | 1.43700 | 95.1 |
| 6 | −1868.579 | D6 | | |
| 7 | 291.576 | 3.780 | 1.74000 | 28.3 |
| 8 | −494.359 | 19.000 | | |
| 9 | −173.577 | 1.000 | 1.80400 | 46.5 |
| 10 | 60.827 | 2.000 | | |
| 11 | 55.256 | 3.000 | 1.86966 | 20.0 |
| 12 | 98.474 | 6.092 | | |
| 13 | 95.553 | 4.500 | 1.69930 | 51.1 |
| 14 | −107.486 | 1.808 | | |
| 15 | −167.295 | 1.500 | 1.80610 | 40.9 |
| 16 | 70.631 | 5.000 | | |
| 17 | −47.183 | 1.500 | 1.74400 | 44.8 |
| 18 | 94.272 | 4.000 | 1.65412 | 39.7 |
| 19 | −103.915 | D19 | | |
| 20 | 661.049 | 3.873 | 1.77250 | 49.6 |
| 21 | −66.823 | 0.150 | | |
| 22 | 64.592 | 5.004 | 1.49700 | 81.6 |
| 23 | −52.657 | 1.000 | 1.91082 | 35.2 |
| 24 | 101.219 | 0.150 | | |
| 25 | 37.470 | 4.206 | 1.67300 | 38.3 |
| 26 | 110.715 | 2.455 | | |
| 27 | 35.363 | 1.000 | 1.83481 | 42.7 |
| 28 | 28.918 | 5.761 | | |
| 29 Diaphragm | INFINITY | D29 | | |
| 30 | 208.171 | 4.150 | 1.61340 | 44.3 |
| 31 | −34.586 | 1.000 | 2.00100 | 29.1 |
| 32 | −63.459 | 0.150 | | |
| 33 | 106.953 | 2.570 | 1.90043 | 37.4 |
| 34 | 392.438 | D34 | | |
| 35 | 90.490 | 1.000 | 1.90366 | 31.3 |
| 36 | 34.131 | 4.982 | | |
| 37 | −285.596 | 1.000 | 1.49700 | 81.6 |

TABLE 18-continued

[Surface Data]
Zoom ratio 3.77

| Surface number | R | D | N(d) | ν(d) |
|---|---|---|---|---|
| 38 | 35.810 | 4.059 | 1.78880 | 28.4 |
| 39 | 410.899 | D39 | | |
| 40 | −127.507 | 1.500 | 1.48749 | 70.2 |
| 41 | 1090.662 | D41 | | |
| 42 | INFINITY | 1.500 | 1.51633 | 64.1 |
| 43 | INFINITY | — | | |

TABLE 19

[Miscellaneous Data]

| | Infinity | | | Close range (Object-to-image distance 0.9 m) | | |
|---|---|---|---|---|---|---|
| | Wide angle | Intermediate | Telephoto | Wide angle | Intermediate | Telephoto |
| FNO. | 5.3 | 5.4 | 6.5 | 5.4 | 5.8 | 7.9 |
| f | 154.50 | 250.00 | 582.00 | 132.05 | 185.45 | 242.46 |
| Magnification | 0.000 | 0.000 | 0.000 | −0.110 | −0.157 | −0.322 |
| W | 7.8 | 4.8 | 2.1 | 7.7 | 4.9 | 2.0 |
| Y | 21.64 | 21.64 | 21.64 | 21.64 | 21.64 | 21.64 |
| BF | 50.52 | 57.89 | 84.97 | 50.52 | 57.89 | 84.97 |
| L | 302.82 | 368.86 | 411.23 | 302.82 | 368.86 | 411.23 |
| D6 | 33.864 | 99.903 | 142.276 | 33.864 | 99.903 | 142.276 |
| D19 | 32.302 | 33.109 | 3.500 | 32.302 | 33.109 | 3.500 |
| D29 | 30.133 | 21.957 | 24.487 | 30.133 | 21.957 | 24.487 |
| D34 | 18.026 | 8.984 | 1.998 | 23.350 | 18.465 | 33.883 |
| D39 | 18.328 | 27.370 | 34.356 | 13.004 | 17.889 | 2.471 |
| D41 | 48.535 | 55.904 | 82.982 | 48.535 | 55.904 | 82.982 |

TABLE 20

[Data of Zoom Lens Group]

| Group | Starting surface | Focal length |
|---|---|---|
| 1 | 1 | 297.09 |
| 2 | 7 | −56.33 |
| 3 | 20 | 81.63 |
| 4 | 30 | 73.05 |
| 5 | 35 | −87.07 |
| 6 | 40 | −234.09 |

Numerical Example 7

Figure 62:
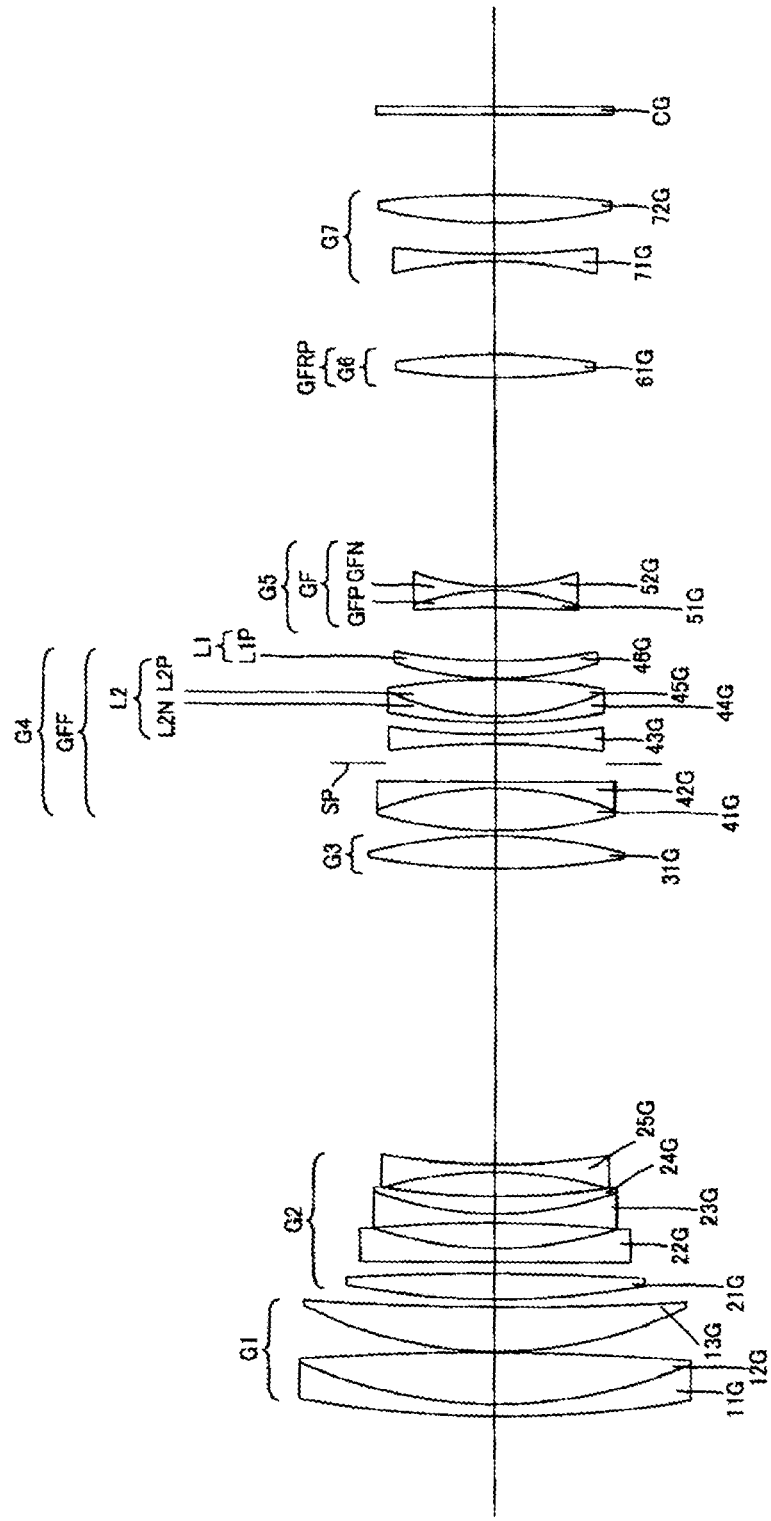
FIG. 62 is a diagram illustrating a lens structure when focusing on infinity at a short focal length end of the zoom lens of the numerical example 7.
Figure 63:
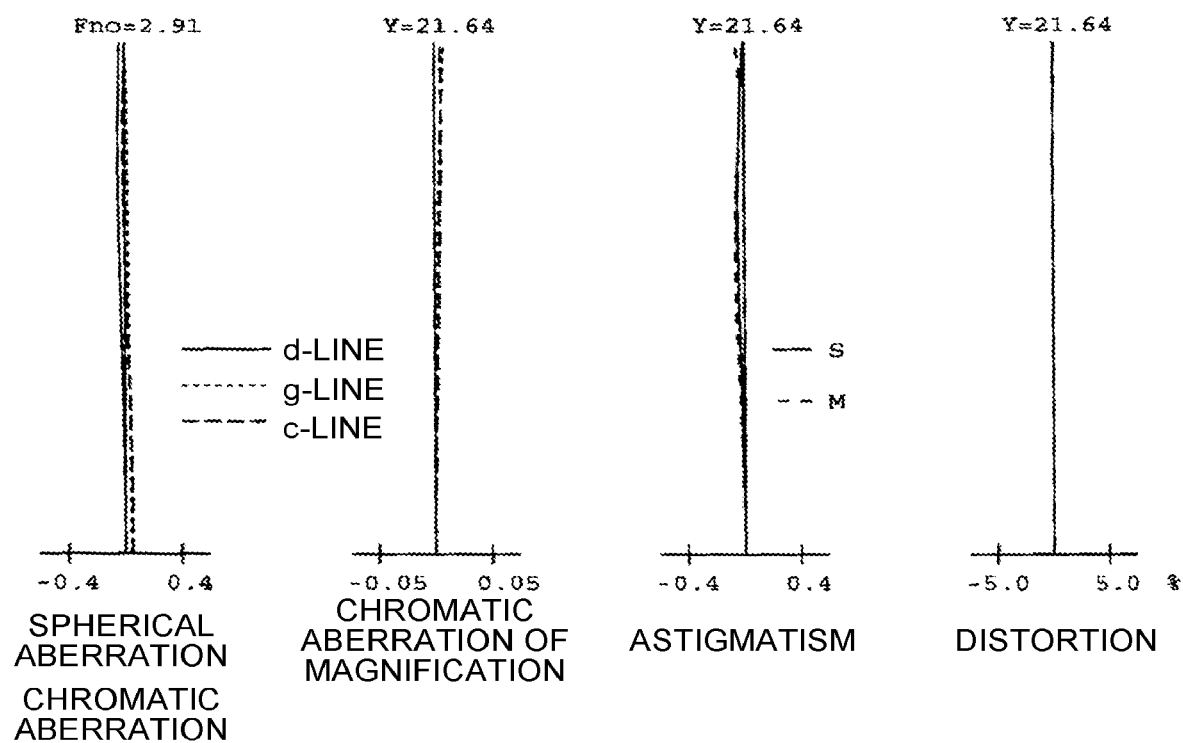
FIG. 63 is a longitudinal aberration diagram when focusing on infinity at the short focal length end of the zoom lens of the numerical example 7.
Figure 64:
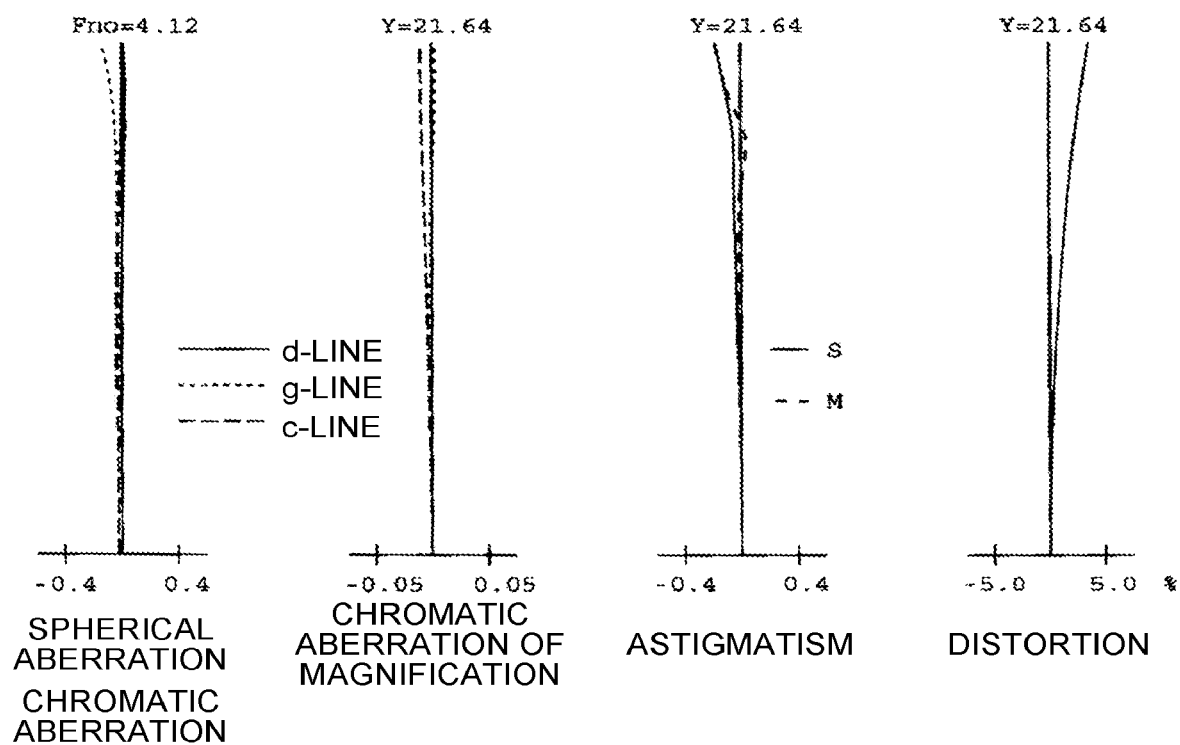
FIG. 64 is a longitudinal aberration diagram when focusing on infinity at the long focal length end of the zoom lens of the numerical example 7.
Figure 65:
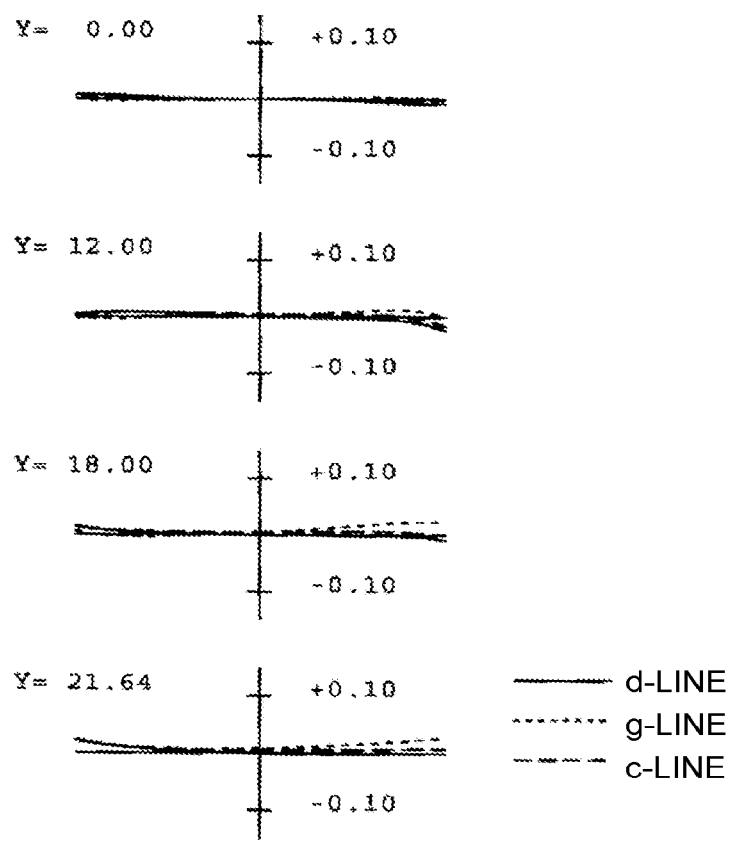
FIG. 65 is a lateral aberration diagram when focusing on infinity at the short focal length end of the zoom lens of the numerical example 7.
Figure 66:
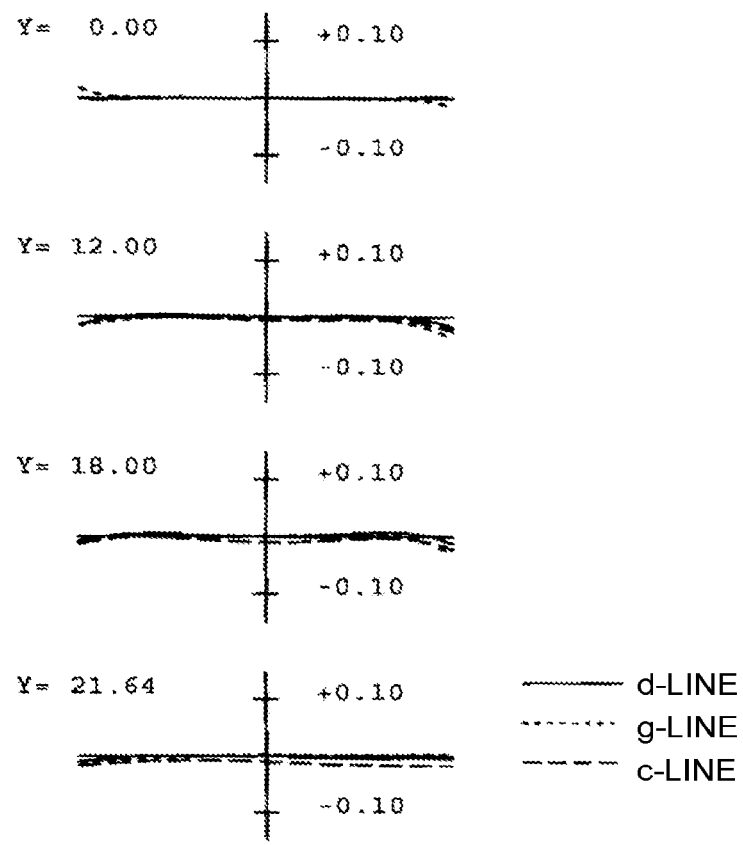
FIG. 66 is a lateral aberration diagram when focusing on infinity at the long focal length end of the zoom lens of the numerical example 7.
Figure 67:
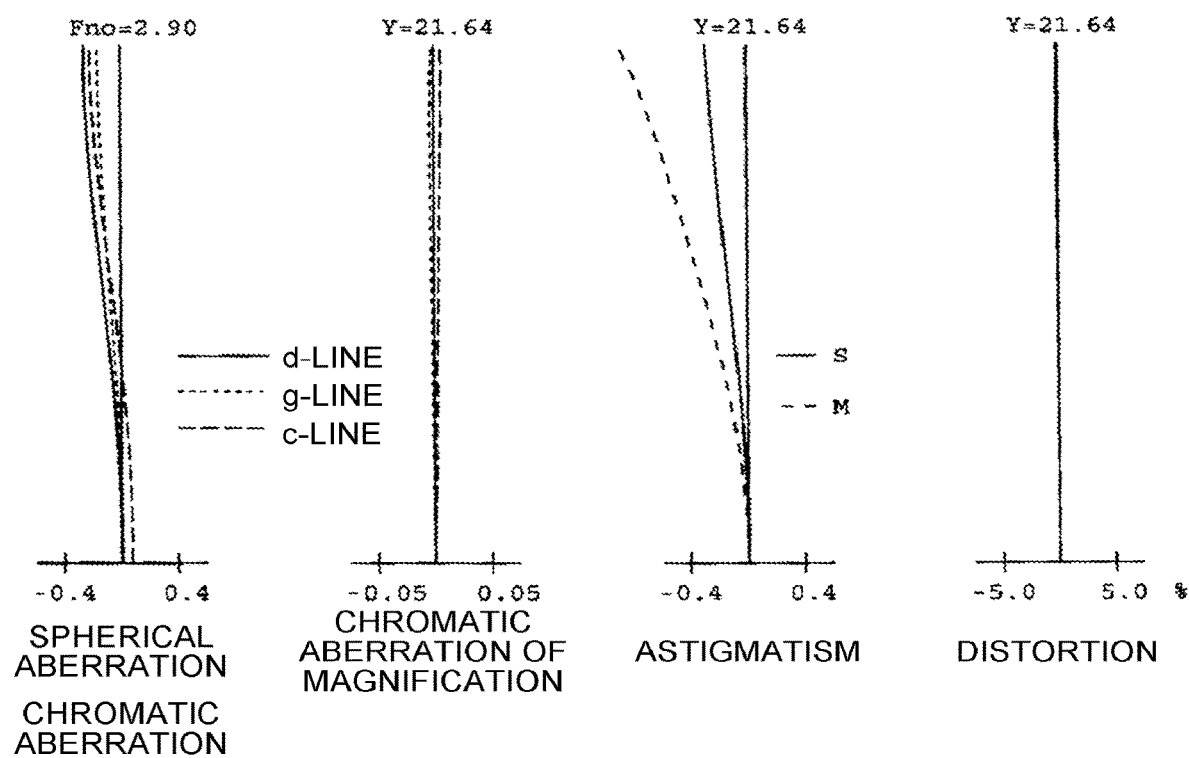
FIG. 67 is a longitudinal aberration diagram when focusing at an object-to-image distance of 1.2 m at the short focal length end of the zoom lens of the numerical example 7.
Figure 68:
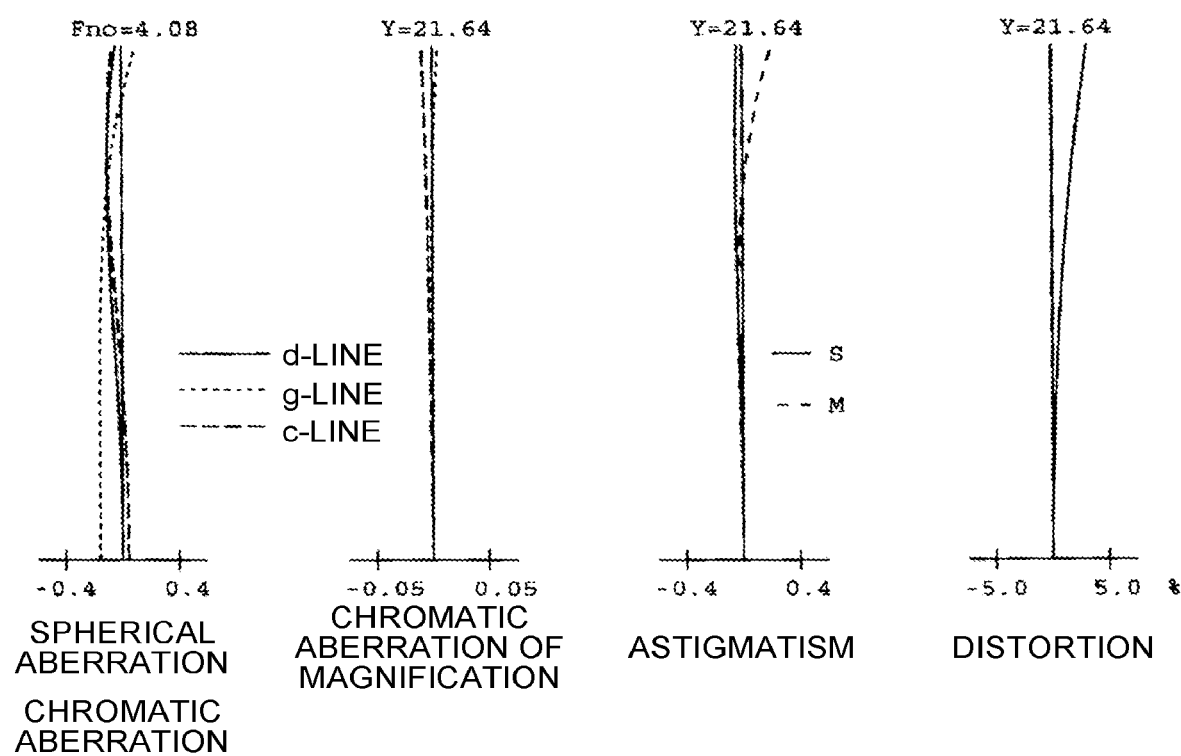
FIG. 68 is a longitudinal aberration diagram when focusing at an object-to-image distance of 1.2 m at the long focal length end of the zoom lens of the numerical example 7.
Figure 69:
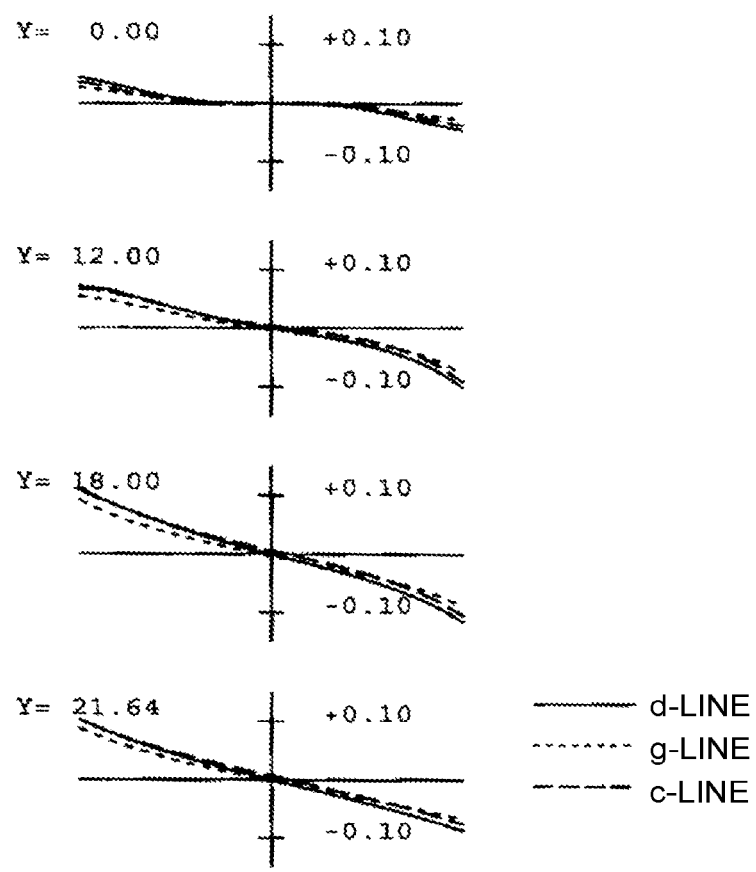
FIG. 69 is a lateral aberration diagram when focusing at an object-to-image distance of 1.2 m at the short focal length end of the zoom lens of the numerical example 7.
Figure 70:
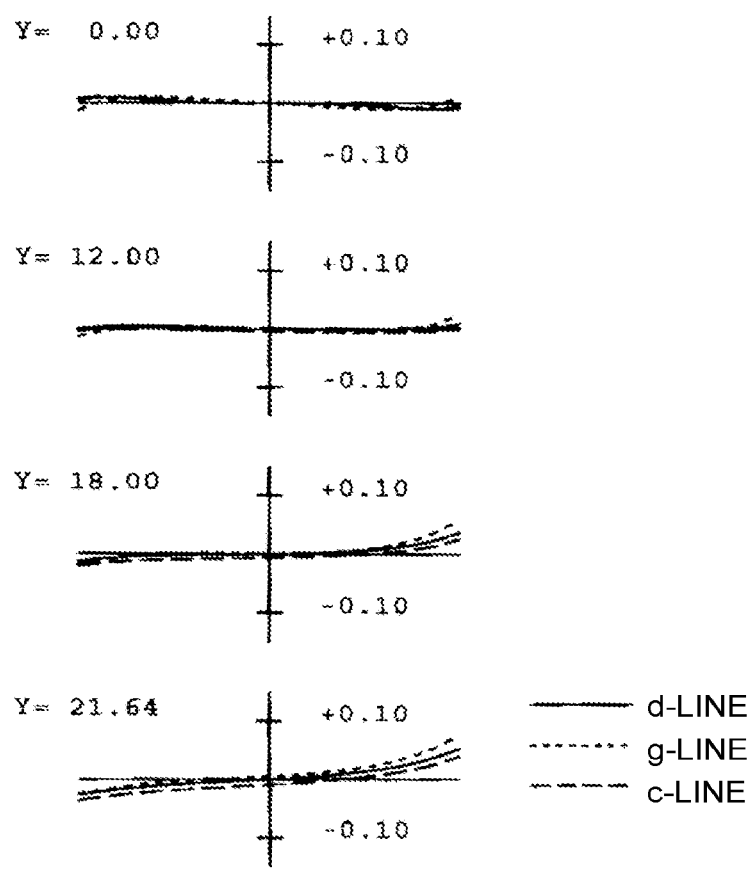
FIG. 70 is a lateral aberration diagram when focusing at an object-to-image distance of 1.2 m at the long focal length end of the zoom lens of the numerical example 7.

FIG. 62 to FIG. 70 and Table 21 to Table 23 show a zoom lens of Numerical Example 7. FIG. 62 is a diagram illustrating a lens structure when focusing on infinity at a short focal length end. FIG. 63, FIG. 64 are longitudinal aberration diagrams when focusing on infinity at the short focal length end and a long focal length end. FIG. 65, FIG. 66 are a lateral aberration diagrams when focusing on infinity at the short focal length end and the long focal length end. FIG. 67, FIG. 68 are longitudinal aberration diagrams when focusing at an object-to-image distance of 1.2 m at the short focal length end and the long focal length end. FIG. 69, FIG. 70 are lateral aberration diagrams when focusing at an object-to-image distance of 1.2 m at the short focal length end and the long focal length end. Table 21 gives surface data, Table 22 gives miscellaneous data, Table 23 gives data of zoom lens group.

The zoom lens of Numerical Example 7 includes, sequentially from the object side, the first lens group G1 having a positive refractive power, the second lens group G2 having a negative refractive power, the third lens group G3 having a positive refractive power, the fourth lens group G4 having a positive refractive power, (the lens group GFF having a positive refractive power), the fifth lens group G5 having a negative refractive power (the focusing lens group GF), the sixth lens group G6 having a positive refractive power (the focusing lens group GFRP), and the seventh lens group G7 having a negative refractive power. The third lens group G3, the fourth lens group G4, the fifth lens group G5, the sixth lens group G6, and the seventh lens group G7 constitute the "rear group". Between a second lens 42G and a third lens 43G of the fourth lens group G4, the diaphragm SP for light amount adjustment that moves with the fourth lens group G4 is arranged. Between the seventh lens group G7 and the imaging surface, the plane parallel plate CG is arranged.

The first lens group G1 includes, sequentially from the object side, a negative meniscus lens 11G convex toward the object side, a double-convex positive lens 12G, and a positive meniscus lens 13G convex toward the object side. The negative meniscus lens 11G and the double-convex positive lens 12G are joined.

The second lens group G2 includes, sequentially from the object side, a double-convex positive lens 21G, a negative meniscus lens 22G convex toward the object side, a double-concave negative lens 23G, a positive meniscus lens 24G convex toward the object side, and a double-concave negative lens 25G. The double-concave negative lens 23G and the positive meniscus lens 24G are joined.

The third lens group G3 includes a double-convex positive lens 31G.

The fourth lens group G4 includes, sequentially from the object side, a double-convex positive lens 41G, double-concave negative lens 42G, a double-concave negative lens 43G, a negative meniscus lens 44G convex toward the object side (the negative lens L2N), a double-convex positive lens 45G (the positive lens L2P), and a positive meniscus lens 46G convex toward the object side (the positive lens L1P). The negative meniscus lens 44G (the negative lens L2N) and the double-convex positive lens 45G (the positive lens L2P) are joined, and constitute the positive lens component L2. The positive meniscus lens 46G (the positive lens L1P) constitutes the positive lens component L1.

The fifth lens group G5 includes, sequentially from the object side, a positive meniscus lens 51G (the positive lens GFP), and double-concave negative lens 52G (the negative lens GFN). The positive meniscus lens 51G (the positive lens GFP) and double-concave negative lens 52G (the negative lens GFN) are joined.

The sixth lens group G6 includes a double-convex positive lens 61G.

The seventh lens group G7 includes, sequentially from the object side, double-concave negative lens 71G and a double-convex positive lens 72G.

TABLE 21

[Surface Data]
Zoom ratio 2.83

| Surface number | R | D | N(d) | ν(d) |
|---|---|---|---|---|
| 1 | 193.512 | 2.400 | 1.90366 | 31.3 |
| 2 | 82.686 | 10.180 | 1.49700 | 81.6 |
| 3 | −451.165 | 0.200 | | |
| 4 | 72.421 | 8.780 | 1.43700 | 95.1 |
| 5 | 549.259 | D5 | | |
| 6 | 141.133 | 5.050 | 1.85478 | 24.8 |
| 7 | −421.355 | 2.134 | | |

TABLE 21-continued

[Surface Data]
Zoom ratio 2.83

| Surface number | R | D | N(d) | ν(d) |
|---|---|---|---|---|
| 8 | 20392.485 | 2.800 | 1.57501 | 41.5 |
| 9 | 66.706 | 5.000 | | |
| 10 | −226.826 | 1.600 | 1.59349 | 67.0 |
| 11 | 57.892 | 3.500 | 1.84666 | 23.8 |
| 12 | 132.431 | 4.735 | | |
| 13 | −68.309 | 1.500 | 1.58267 | 46.5 |
| 14 | 116.510 | D14 | | |
| 15 | 131.781 | 6.459 | 1.74100 | 52.7 |
| 16 | −83.245 | D16 | | |
| 17 | 78.287 | 8.430 | 1.43700 | 95.1 |
| 18 | −56.310 | 1.300 | 1.72000 | 50.2 |
| 19 | 2545.556 | 3.585 | | |
| 20 Diaphragm | INFINITY | 4.000 | | |
| 21 | −143.686 | 1.800 | 1.74950 | 35.3 |
| 22 | 125.656 | 2.433 | | |
| 23 | 102.485 | 1.300 | 1.85478 | 24.8 |
| 24 | 43.003 | 7.200 | 1.69680 | 55.5 |
| 25 | −114.001 | 0.200 | | |
| 26 | 56.611 | 3.576 | 1.90043 | 37.4 |
| 27 | 96.667 | D27 | | |
| 28 | −236.335 | 3.330 | 1.84666 | 23.8 |
| 29 | −41.240 | 0.800 | 1.65412 | 39.7 |
| 30 | 40.597 | D30 | | |
| 31 | 118.655 | 4.642 | 1.59349 | 67.0 |
| 32 | −105.336 | D32 | | |
| 33 | −73.711 | 1.500 | 1.88300 | 40.8 |
| 34 | 155.486 | 6.110 | | |
| 35 | 85.318 | 5.620 | 1.72825 | 28.5 |
| 36 | −162.178 | D36 | | |
| 37 | INFINITY | 1.500 | 1.51633 | 64.1 |
| 38 | INFINITY | — | | |

TABLE 22

[Miscellaneous Data]

| | Infinity | | | Close range (Object-to-image distance 0.9 m) | | |
|---|---|---|---|---|---|---|
| | Wide angle | Intermediate | Telephoto | Wide angle | Intermediate | Telephoto |
| FNO. | 2.9 | 3.6 | 4.1 | 2.9 | 3.5 | 4.1 |
| f | 103.00 | 200.00 | 292.00 | 96.53 | 158.13 | 187.60 |
| Magnification | 0.000 | 0.000 | 0.000 | −0.097 | −0.171 | −0.241 |
| W | 11.9 | 6.0 | 4.1 | 11.9 | 6.3 | 4.4 |
| Y | 21.64 | 21.64 | 21.64 | 21.64 | 21.64 | 21.64 |
| BF | 18.00 | 18.00 | 18.00 | 18.00 | 18.00 | 18.00 |
| L | 259.72 | 259.72 | 259.72 | 259.72 | 259.72 | 259.72 |
| D5 | 1.528 | 28.745 | 41.231 | 1.528 | 28.745 | 41.231 |
| D14 | 58.612 | 23.382 | 2.000 | 58.612 | 23.382 | 2.000 |
| D16 | 1.000 | 9.012 | 17.908 | 1.000 | 9.012 | 17.908 |
| D27 | 10.551 | 14.035 | 10.471 | 11.788 | 19.630 | 24.175 |
| D30 | 41.491 | 50.628 | 57.873 | 34.070 | 26.324 | 14.824 |
| D32 | 18.372 | 5.750 | 2.070 | 24.556 | 24.460 | 31.415 |
| D36 | 16.011 | 16.011 | 16.011 | 16.011 | 16.011 | 16.011 |

TABLE 23

[Data of Zoom Lens Group]

| Group | Starting surface | Focal length |
|---|---|---|
| 1 | 1 | 163.25 |
| 2 | 6 | −56.29 |
| 3 | 15 | 69.74 |
| 4 | 17 | 133.08 |
| 5 | 28 | −66.26 |
| 6 | 31 | 94.75 |
| 7 | 33 | −329.73 |

A relationship between an image blurring correction amount of Numerical Examples 1 to 7 and a moving amount of the vibration-proof lens group for the correction amount is shown in Table 24. The unit of this moving amount is [mm].

TABLE 24

| | Vibration correction amount | Driving amount Wide angle | Driving amount Intermediate | Driving amount Telephoto end |
|---|---|---|---|---|
| First embodiment | ±0.40° | ±0.524 | ±0.677 | ±0.998 |
| Second embodiment | ±0.40° | ±0.278 | ±0.384 | ±0.550 |
| THIRD embodiment | ±0.35° | ±0.370 | ±0.538 | ±0.745 |
| Fourth embodiment | ±0.35° | ±0.409 | ±0.619 | ±1.002 |
| Fifth embodiment | ±0.35° | ±0.572 | ±0.607 | ±0.958 |
| Sixth embodiment | ±0.28° | ±0.638 | ±0.896 | ±01.212 |
| Seventh embodiment | ±0.40° | ±0.639 | ±0.666 | ±0.979 |

Values for respective Conditional Expressions of Numerical Examples 1 to 7 are shown in Table 25.

TABLE 25

| | First embodiment | Second embodiment | Third embodiment | Fourth embodiment |
|---|---|---|---|---|
| Conditional expression (1) | 1.91082 | 1.95375 | 1.90043 | 1.90366 |
| Conditional expression (2) | 35.25 | 32.32 | 37.37 | 31.31 |
| Conditional expression (3) | −0.81 | −1.24 | −1.56 | −0.75 |
| Conditional expression (4) | 1.35 | 1.30 | 1.23 | 1.34 |
| Conditional expression (5) | 0.41 | 0.39 | 0.29 | 0.36 |
| Conditional expression (6) | 1.70 | 1.30 | 2.00 | 2.72 |
| Conditional expression (7) | 4.24 | 3.15 | 6.23 | 2.71 |
| Conditional expression (8) | 0.89 | 0.90 | 0.88 | 0.73 |
| Conditional expression (9) | 0.56 | 0.57 | 0.60 | 0.46 |
| Conditional expression (10) | 0.66 | 0.73 | 1.70 | 0.68 |
| Conditional expression (11) | −5.57 | −5.14 | −3.65 | −4.02 |
| Conditional expression (12) | 49.60 | 47.82 | 52.32 | 49.60 |
| Conditional expression (13) | −2.63 | −2.50 | −1.45 | −2.92 |
| Conditional expression (14) | 0.48 | 0.50 | 0.57 | 0.50 |
| Conditional expression (15) | 0.12 | 0.12 | 0.12 | 0.22 |
| Conditional expression (16) | −81.40 | −146.38 | −3.90 | −17.04 |
| Conditional expression (17) | 8.30 | 7.39 | 6.48 | 4.71 |
| Conditional expression (18) | −1.01 | −1.14 | −0.83 | −0.88 |
| Conditional expression (19) | 1.12 | 1.16 | 1.17 | 1.07 |
| Conditional expression (20) | 0.43 | 0.41 | 0.45 | 0.49 |
| Conditional expression (21) | −0.82 | −0.89 | −0.55 | −0.59 |
| Conditional expression (22) | 1.45 | 1.50 | 1.05 | 0.98 |
| Conditional expression (23) | 2.03 | 3.69 | 3.14 | 2.34 |
| Conditional expression (24) | — | — | — | — |
| Conditional expression (25) | — | — | — | — |
| Conditional expression (26) | — | — | — | — |
| Conditional expression (27) | 2.00100 | — | — | — |
| Conditional expression (28) | 2.00100 | — | — | — |
| Conditional expression (29) | 0.47 | — | — | — |
| Conditional expression (30) | 1.02 | — | — | — |

| | Fifth embodiment | Sixth embodiment | Seventh embodiment |
|---|---|---|---|
| Conditional expression (1) | 2.00100 | 1.90043 | 1.90043 |
| Conditional expression (2) | 29.13 | 37.37 | 37.37 |
| Conditional expression (3) | −0.72 | −0.84 | −2.01 |
| Conditional expression (4) | 1.34 | 1.34 | 1.09 |
| Conditional expression (5) | 0.36 | 0.36 | 0.45 |
| Conditional expression (6) | 2.36 | 2.23 | 1.09 |
| Conditional expression (7) | 2.39 | 0.82 | 0.65 |
| Conditional expression (8) | 0.75 | 0.71 | 0.89 |
| Conditional expression (9) | 0.47 | 0.51 | 0.56 |
| Conditional expression (10) | 0.66 | 0.65 | 0.85 |
| Conditional expression (11) | −4.09 | −5.27 | −2.90 |
| Conditional expression (12) | 47.37 | 81.61 | 39.68 |
| Conditional expression (13) | −2.84 | −0.77 | −1.88 |
| Conditional expression (14) | 0.52 | 0.35 | 0.60 |
| Conditional expression (15) | 0.21 | 0.12 | 0.28 |
| Conditional expression (16) | −14.95 | −2.69 | −2.29 |
| Conditional expression (17) | 4.59 | 7.40 | 3.76 |
| Conditional expression (18) | −0.91 | −0.81 | −1.01 |
| Conditional expression (19) | 1.08 | 0.99 | 0.94 |
| Conditional expression (20) | 0.48 | 0.36 | 0.24 |
| Conditional expression (21) | −0.59 | −0.51 | −1.01 |

TABLE 25-continued

| | | | |
|---|---|---|---|
| Conditional expression (22) | 1.08 | 1.09 | 1.34 |
| Conditional expression (23) | 2.45 | 2.34 | 2.08 |
| Conditional expression (24) | — | — | 67.00 |
| Conditional expression (25) | — | — | 1.59349 |
| Conditional expression (26) | — | — | 0.699 |
| Conditional expression (27) | — | — | — |
| Conditional expression (28) | — | — | — |
| Conditional expression (29) | — | — | — |
| Conditional expression (30) | — | — | — |

As is obvious from Table 25, Numerical Examples 1 to 7 satisfy Conditional Expressions (1) to (30), and as is evident from the longitudinal aberration diagrams and the lateral aberration diagrams, respective aberrations are relatively well corrected. Moreover, although the number of pieces composing the focusing lens is small, aberration variation caused by a change in an imaging distance is suppressed at both the short focal length end and the long focal length end, and aberration variation at the time of vibration control driving is also satisfactorily corrected.

Even if a lens or a lens group having no substantial power is added to the zoom lens included the scope of claims of the present invention, it is still included in a technical scope of the present invention (it does not avoid the technical scope of the present invention).

The zoom lens of the present embodiment is not limited to ones of the five-group zoom, six-group zoom, seven-group zoom, and eight-group zoom shown in Numerical Examples described above. Moreover, an aspheric surface or a diffractive surface may be used on either surface, and as the aspheric surface, a glass mold aspheric surface or a ground aspheric surface directly formed on a lens surface, a complex aspheric surface lens (hybrid lens) in which a resin layer is applied on a lens surface and an aspheric surface is formed thereon, a plastic aspheric surface in which a lens itself is formed with a resin material, and the like may be used.

Figure 71A:
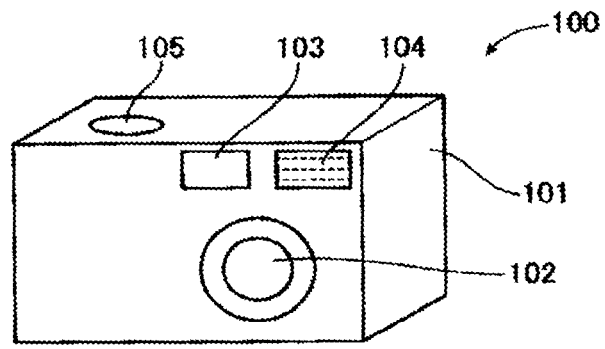
FIGS. 71A and 71B are first diagrams illustrating an example of an imaging apparatus equipped with the zoom lens of the present embodiment.
Figure 71B:
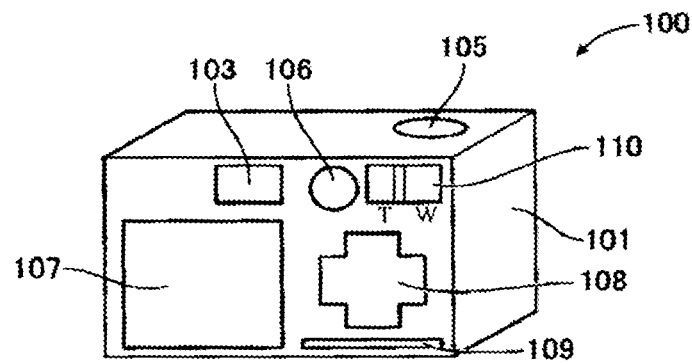
Figure 72:
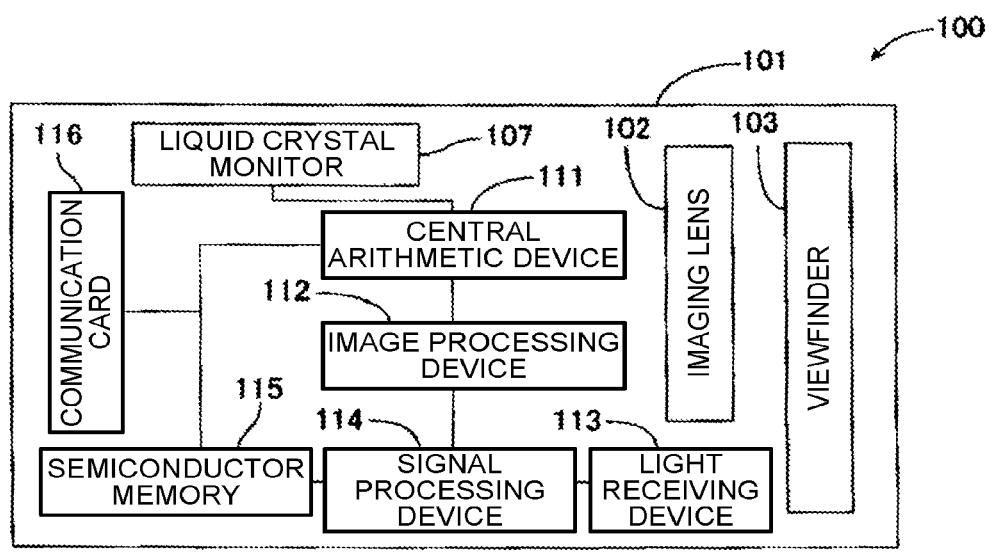
FIG. 72 is a second diagram illustrating an example of an imaging apparatus equipped with the zoom lens of the present embodiment.

Referring to FIGS. 71A 71B, and 72, a digital camera (imaging apparatus) 100 that is equipped with the zoom lens of the present embodiment will be explained.

The digital camera 100 includes a camera body (casing) 101, an imaging lens 102, a viewfinder 103, a flash 104, a shutter button 105, a power button 106, a liquid crystal monitor 107, an operating button 108, a memory card slot 109, and a zoom switch 110.

The camera body 101 houses respective components of the digital camera 100. The imaging lens 102 is, for example, a unit formed by installing the zoom lens of the present embodiment in a lens barrel. The viewfinder 103 is a viewfinder window to determine a subject and a composition. The flash 104 is to emit flash light at shooting at night or shooting in a dark place. The shutter button 105 is a physical switch to perform shooting with the digital camera 100. The power button 106 is a physical switch to switch on and off of the power of the digital camera 100. The liquid crystal monitor 107 displays a captured image by the digital camera 100 or the like. The operating button 108 is a physical switch to set an imaging mode and the like of the digital camera 100. The memory card slot 109 is a slot to insert a memory card (not shown) to store captured images by the digital camera 100 and the like. The zoom switch 110 is a physical switch to change magnification (zooming) between a short focal length end and a long focal length end. By operating the zoom switch 110, intervals between the lens groups of the zoom lens of the present embodiment are changed appropriately.

The digital camera 100 includes, as a functional components inside the camera body 101, a central arithmetic device 111, an image processing device 112, a light receiving device 113, a signal processing device 114, a semiconductor memory 115, and a communication card 116.

The central arithmetic device 111 performs various kinds of arithmetic processing inside the digital camera 100. The image processing device 112 performs various kinds of image processing with respect to a captured image by the digital camera 100. The light receiving device 113 receives light by taking external light used for photometry processing. The signal processing device 114 performs various kinds of signal processing of a shooting instruction signal, an image processing signal, and the like. The semiconductor memory 115 forms a temporary storage area for a captured image by the digital camera 100. The communication card 116 is to enable wireless communication with an external device (not shown), and the like.

The configuration of the digital camera 100 explained herein is only one example, and various design modification is possible (the specific mode of the digital camera 100 has flexibility).

Moreover, the zoom lens of the present embodiment can be applied to, for example, an interchangeable lens, a mobile information terminal device, a video camera, a film-based camera, an optical sensor, a projection optical system (projector), and the like also, other than the digital camera 100 described above.

Figure 73:
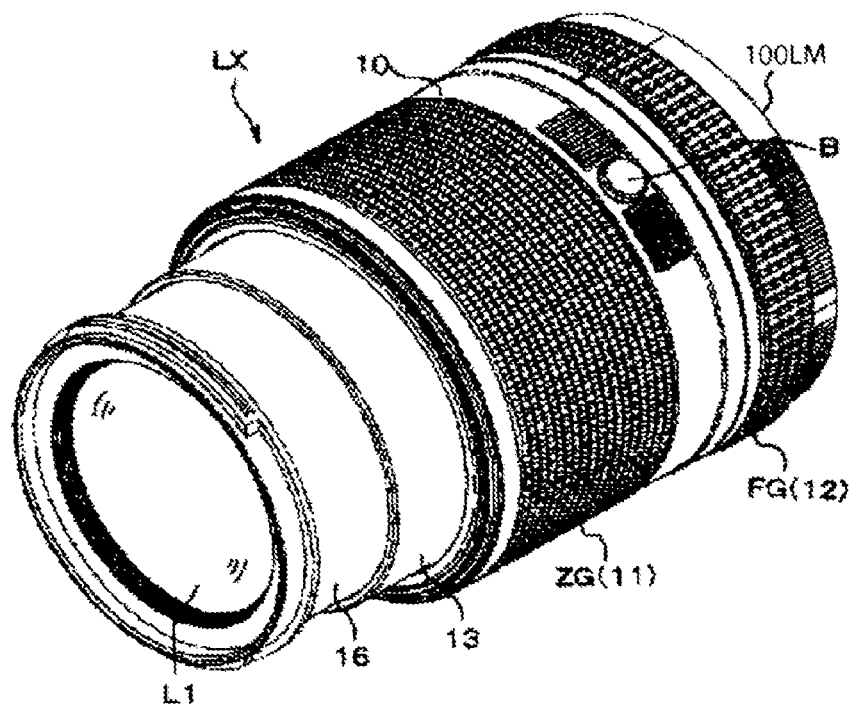
FIG. 73 is a diagram illustrating an example of an external structure of a lens barrel in which the zoom lens according to the present embodiment is mounted.

FIG. 73 is a diagram illustrating an example of an external structure of a lens barrel (imaging apparatus) LX in which the zoom lens according to the present embodiment is mounted. The lens barrel LX is structured as, for example, an interchangeable zoom lens of a single-lens reflex camera. The lens barrel LX includes a fixed barrel 10, and on a rear surface of the fixed barrel 10, a lens mount 100LM is fixed. On a circumferential surface of the fixed barrel 10, a zoom ring 11 is fit in a front side region in an optical axis direction, and a focus ring 12 is fit in a rear side region. On respective circumferential surfaces of the zoom ring 11 and the focus ring 12, rubber rings ZG, FG are fixed, to give a better feeling to the touch when operating it.

The lens barrel Lx is detachable to a camera body not shown by the lens mount 100LM arranged on the fixed barrel 10, and rotating operation of the zoom ring 11 enables to zoom toward a long focal point (telephoto) side and a short focal point (wide angle) side. Moreover, by operating the zoom ring 11 further toward the short focal point side while pressing a collapse button B arranged on a circumferential surface, it can be set to a collapsed mode in which the length of the lens barrel Lx is minimized. While focusing is automatically performed by a motor mounted inside, manual focusing is also possible by rotating the focus ring 12.

Inside the fixed barrel 10, an outer straight-moving barrel 13 and an inner straight-moving barrel (not shown) that are coaxially arranged, keeping a necessary gap therebetween in a barrel radial direction are mounted. These straight-moving barrels are unified at respective rear end portions, and are moved straight along the optical direction together inside the fixed barrel 10 with rotation of the zoom ring 11 by engagement with a straight groove in the optical axis direction arranged in the fixed barrel 10 and a cam groove arranged in the zoom ring 11.

Although not shown, on an outer circumference of the inner straight-moving barrel, a helicoid barrel in which a helicoid groove is formed on its outer circumferential surface is fit. This helicoid barrel is moved together with the inner straight-moving barrel in a barrel axis direction, and is linked to the zoom ring 11, and is moved rotating about the barrel axis on the circumferential surface of the inner straight-moving barrel with rotation of the zoom ring 11. Moreover, between this helicoid barrel and the outer straight-moving barrel 13 in a radial direction, a front straight-moving barrel 16 is fit. This front straight-moving barrel 16 is engaged in the helicoid groove of the helicoid barrel, and is moved in the optical axis direction by rotation of the helicoid barrel. At a front end portion of this front straight-moving barrel 16, the lens L1 is supported. The lens L1 illustrated in FIG. 73 may be a lens (11A, 11B, 11C, 11D, 11E, 11F, 11G) that are positioned on the most object side of the first lens group G1 of the zoom lens of the present embodiment. Furthermore, in the lens barrel LX, a component to exert or support a function of the zoom lens of the present embodiment (for example, an ON/OFF switch for the vibration control) is arranged.

According to an embodiment, a zoom lens, a lens barrel, and an imaging apparatus that are capable of suppressing variations of aberration occurring with a change of an imaging distance can be provided.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

What is claimed is:

1. A zoom lens comprising:
a first lens group having a positive refractive power;
a second lens group having a negative refractive power; and
a rear group, sequentially from an object side, wherein intervals between adjacent lens groups are configured to vary when changing magnification from a short focal length end to a long focal length end,
the rear group includes at least one lens group having a negative refractive power, and at least one lens group having a positive refractive power,
a lens group having a highest negative refractive power among the at least one lens group having the negative refractive power included in the rear group is a focusing lens group GF configured to move toward an image side when focusing from infinity to a close range,
a lens group GFF having a positive refractive power and arranged adjacent to an object side of the focusing lens group GF among the at least one lens group having the positive refractive power included in the rear group includes a positive lens component L1 positioned on a most image side, the positive lens component L1 includes a positive lens L1P, and
a conditional expression (1) is satisfied, $$1.85 < NdL1P \qquad (1)$$

where
NdL1P: a refractive index of the positive lens L1P, and
a conditional expression (8) is satisfied, $$0.1 < TLT/fT < 0.95 \qquad (8)$$

where
TLT: a total lens length when focusing on infinity at a long focal length end; and
fT: a focal length of an entire system when focusing on infinity at a long focal length end.

2. The zoom lens according to claim 1, wherein a conditional expression (2) is satisfied, $$25 < vdL1P \qquad (2)$$

where
vdL1P: an Abbe number of the positive lens L1P.

3. The zoom lens according to claim 1, wherein a conditional expression (3) is satisfied, $$-5 < fGFF/fGF < -0.7 \qquad (3)$$

where
fGFF: a focal length of the lens group GFF having the positive refractive power; and
fGF: a focal length of the focusing lens group GF.

4. The zoom lens according to claim 1, further comprising:
a positive or negative lens component L2 positioned adjacent to an object side of the positive lens component L1, wherein
the lens component L2 comprises a cemented lens of a negative lens L2N and a positive lens L2P, and
a conditional expression (4) is satisfied, $$1.0 < NdL2N/NdL2P < 1.6 \qquad (4)$$

where
NdL2N: a refractive index of the negative lens L2N; and
NdL2P: a refractive index of the positive lens L2P.

5. The zoom lens according to claim 1, further comprising:
a positive or negative lens component L2 positioned adjacent to an object side of the positive lens component L1, wherein
the lens component L2 comprises a cemented lens of a negative lens L2N and a positive lens L2P, and
a conditional expression (5) is satisfied, $$0.2 < vdL2N/vdL2P < 0.7 \qquad (5)$$

where
vdL2P: an Abbe number of the positive lens L2P; and
vdL2N: an Abbe number of the negative lens L2N.

6. The zoom lens according to claim 1, wherein a conditional expression (6) is satisfied, $$0.5 < fL1/fGFF < 5 \qquad (6)$$

where
fL1: a focal length of the positive lens component L1; and
fGFF: a focal length of the lens group GFF having a positive refractive power.

7. The zoom lens according to claim 1, wherein a conditional expression (7) is satisfied, $$0.5 < |fL2|/fL1 < 20 \qquad (7)$$

where fL1: a focal length of the positive lens component L1; and
fL2: a focal length of the lens component L2.

8. The zoom lens according to claim 1, wherein a conditional expression (9) is satisfied, $$0.1<f1/fT<1 \qquad (9)$$

where f1: a focal length of the first lens group; and
fT: a focal length of an entire system when focusing on infinity at a long focal length end.

9. The zoom lens according to claim 1, wherein a conditional expression (10) is satisfied, $$0.3<f2/fGF<3.0 \qquad (10)$$

where f2: a focal length of the second lens group; and
fGF: a focal length of the focusing lens group GF.

10. The zoom lens according to claim 1, wherein a conditional expression (11) is satisfied, $$-8<f1/f2<-2 \qquad (11)$$

where f1: a focal length of the first lens group; and
f2: a focal length of the second lens group.

11. The zoom lens according to claim 1, wherein a position of any one of the first lens group and the second lens group in an optical axis direction is fixed when changing the magnification from the short focal length end to the long focal length end.

12. The zoom lens according to claim 1, wherein the focusing lens group GF includes at least one negative lens, and a conditional expression (12) is satisfied, $$35<vdGFN \qquad (12)$$

where vdGFN: an Abbe number of a negative lens GFN having a highest Abbe number among negative lenses included in the focusing lens group GF.

13. The zoom lens according to claim 1, wherein the focusing lens group GF includes at least one negative lens and at least one positive lens, and a conditional expression (14) is satisfied, $$0.2<vdGFP/vdGFN<0.7 \qquad (14)$$

where vdGFP: an Abbe number of a positive lens GFP having the lowest Abbe number among positive lenses included in the focusing lens group GF; and
vdGFN: an Abbe number of a negative lens GFN having the highest Abbe number among negative lenses included in the focusing lens group GF.

14. The zoom lens according to claim 1, further comprising at least one lens group positioned on an image side relative to the focusing lens group GF.

15. The zoom lens according to claim 1, further comprising at least one lens group positioned on an image side relative to the focusing lens group GF, wherein a conditional expression (15) is satisfied, $$0.1<DGFRT/TLT<0.5 \qquad (15)$$

where

TLT: a total lens length when focusing on infinity at a long focal length end; and
DGFRT: a distance on an optical axis from a refractive surface on a most image side of the lens group GFF having the positive refractive power to a refractive surface of a most object side of a lens group on the image side relative to the focusing lens group GF when focusing on infinity at a long focal length end.

16. The zoom lens according to claim 1, further comprising at least one lens group positioned on an image side relative to the focusing lens group GF, wherein a conditional expression (16) is satisfied, $$|fGFRT|/fGF<-1.5 \qquad (16)$$

where fGFRT: a combined focal length of a lens group on the image side relative to the focusing lens group GF when focusing on infinity at a long focal length end; and
fGF: a focal length of the focusing lens group GF.

17. A lens barrel comprising the zoom lens according to claim 1.

18. An imaging apparatus comprising the zoom lens according to claim 1.

19. A zoom lens comprising:

a first lens group having a positive refractive power;
a second lens group having a negative refractive power; and
a rear group, sequentially from an object side, wherein
intervals between adjacent lens groups are configured to vary when changing magnification from a short focal length end to a long focal length end,
the rear group includes at least one lens group having a negative refractive power, and at least one lens group having a positive refractive power,
a lens group having a highest negative refractive power among the at least one lens group having the negative refractive power included in the rear group is a focusing lens group GF configured to move toward an image side when focusing from infinity to a close range,
a lens group GFF having a positive refractive power and arranged adjacent to an object side of the focusing lens group GF among the at least one lens group having the positive refractive power included in the rear group includes a positive lens component L1 positioned on a most image side,
the positive lens component L1 includes a positive lens L1P, and
a conditional expression (1) is satisfied, $$1.85<NdL1P \qquad (1)$$

where

NdL1P: a refractive index of the positive lens L1P,
wherein
the focusing lens group GF includes at least one negative lens and at least one positive lens, and
a conditional expression (13) is satisfied, $$-10<fGFP/fGFN<-0.5 \qquad (13)$$

where fGFP: a focal length of a positive lens GFP having a lowest Abbe number among positive lenses included in the focusing lens group GF; and
fGFN: a focal length of a negative lens GFN having a highest Abbe number among negative lenses included in the focusing lens GF.

20. A zoom lens comprising:

a first lens group having a positive refractive power;
a second lens group having a negative refractive power; and
a rear group, sequentially from an object side, wherein
intervals between adjacent lens groups are configured to vary when changing magnification from a short focal length end to a long focal length end, the rear group includes at least one lens group having a negative refractive power, and at least one lens group having a positive refractive power, a lens group having a highest negative refractive power among the at least one lens group having the negative refractive power included in the rear group is a focusing lens group GF configured to move toward an image side when focusing from infinity to a close range, a lens group GFF having a positive refractive power and arranged adjacent to an object side of the focusing lens group GF among the at least one lens group having the positive refractive power included in the rear group includes a positive lens component L1 positioned on a most image side, the positive lens component L1 includes a positive lens L1P, and a conditional expression (1) is satisfied, $$1.85 < NdL1P \quad (1)$$

where
NdL1P: a refractive index of the positive lens L1P, and
a conditional expression (17') is satisfied, $$3.5 < |(1-M\_GFT^2) \times M\_GFRT^2| \quad (17')$$

where
M_GFT: lateral magnification of the focusing lens group GF when focusing on infinity at a long focal length end, and
M_GFRT: combined lateral magnification of all of the lens groups arranged on the image side relative to the focusing lens group GF when focusing on infinity at a long focal length end.

\* \* \* \* \*